US012598622B2

(12) United States Patent
Liu et al.

(10) Patent No.: US 12,598,622 B2
(45) Date of Patent: Apr. 7, 2026

(54) BWP DETERMINING METHOD, APPARATUS, AND SYSTEM

(71) Applicant: HUAWEI TECHNOLOGIES CO., LTD., Shenzhen (CN)

(72) Inventors: Nannan Liu, Beijing (CN); Junren Chang, Beijing (CN); Xiangdong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 480 days.

(21) Appl. No.: 18/161,470

(22) Filed: Jan. 30, 2023

(65) Prior Publication Data

US 2023/0180263 A1     Jun. 8, 2023

Related U.S. Application Data

(63) Continuation of application No. PCT/CN2021/109208, filed on Jul. 29, 2021.

(30) Foreign Application Priority Data

Jul. 31, 2020     (CN) ......................... 202010762170.9

(51) Int. Cl.
*H04W 72/0453*     (2023.01)
*H04L 5/00*     (2006.01)
(Continued)

(52) U.S. Cl.
CPC ......... *H04W 72/232* (2023.01); *H04L 5/0092* (2013.01); *H04W 72/0457* (2023.01); *H04W 72/12* (2013.01)

(58) Field of Classification Search
CPC ..... H04W 76/11; H04W 76/20; H04W 76/27; H04W 76/14; H04W 28/0268;
(Continued)

(56) References Cited

U.S. PATENT DOCUMENTS

| 11,109,397 B2 * | 8/2021 | Zhou | ...................... H04W 72/23 |
| 11,690,081 B2 * | 6/2023 | Takeda | .................. H04L 5/0096 |
| | | | 370/329 |

(Continued)

FOREIGN PATENT DOCUMENTS

| CN | 108633059 A | 10/2018 |
| CN | 108811125 A | 11/2018 |

(Continued)

OTHER PUBLICATIONS

Chinese First Office Action issued in corresponding Chinese Application No. 202010762170.9, dated Apr. 20, 2024, pp. 1-13.

(Continued)

*Primary Examiner* — Faruk Hamza
*Assistant Examiner* — Syed Ahmed
(74) *Attorney, Agent, or Firm* — HAUPTMAN HAM, LLP

(57) ABSTRACT

A Bandwidth Part (BWP) determining method, an apparatus, and a system. A terminal device obtains first information and second information. The terminal device determines, based on the first information and the second information, that the terminal device operates on a first BWP and a second BWP. The terminal device operates on two or more BWPs to improve the efficiency of communication between the terminal device and a network device.

22 Claims, 22 Drawing Sheets

First bandwidth part (BWP)
(Initial BWP or a BWP corresponding to traffic with a highest priority)

Second BWP

Third BWP

Maximum bandwidth on which a terminal device can operate

(51) Int. Cl.

| | |
|---|---|
| *H04W 72/0457* | (2023.01) |
| *H04W 72/12* | (2023.01) |
| *H04W 72/232* | (2023.01) |

(58) Field of Classification Search

CPC ......... H04W 28/0967; H04W 28/0875; H04W 28/0252; H04W 92/18; H04W 72/12; H04W 72/232; H04W 72/0453; H04W 72/0457; H04W 72/535; H04L 5/0005; H04L 5/0044; H04L 5/0092; H04L 5/0098

USPC ........................................................ 370/329

See application file for complete search history.

(56) References Cited

U.S. PATENT DOCUMENTS

| | | | |
|---|---|---|---|
| 2019/0103953 A1* | 4/2019 | Liao ...................... | H04W 72/23 |
| 2021/0212025 A1* | 7/2021 | Selvanesan ........... | H04W 76/14 |
| 2022/0386352 A1* | 12/2022 | Shubhi .................. | H04L 5/0053 |
| 2023/0023919 A1* | 1/2023 | Qi .......................... | H04W 72/30 |
| 2023/0029998 A1* | 2/2023 | Narayanan Thangaraj ................. H04W 4/06 |
| 2025/0016810 A1* | 1/2025 | Selvanesan ............. | H04L 5/006 |

FOREIGN PATENT DOCUMENTS

| | | | | |
|---|---|---|---|---|
| CN | 109803326 | A | 5/2019 | |
| CN | 110546996 | A | 12/2019 | |
| CN | 110958179 | A | 4/2020 | |
| CN | 111148237 | A | 5/2020 | |
| KR | 20200073118 | A | * 6/2020 | ............ H04W 48/12 |
| WO | 2019096169 | A1 | 5/2019 | |
| WO | 2020143482 | A1 | 7/2020 | |
| WO | 2021086593 | A1 | 5/2021 | |

OTHER PUBLICATIONS

CATT:Further discussion for SIbroadcast in non-initial BWP 3GPP Draft; R2-1806718 Further Discussionfor SI Broadcast in Non-Initial BWP 3rdgeneration Partnership Project (3GPP) Mobile Competence Centre;650 Route Deslucioles;F-06921 Sophia-Antipolisivol. RANMay 25, 2018WC2No. BusanKorea; May 21-May 20, 2018 (May 20, 2018)XP051443187.

Extended European Search Report issued in corresponding European Application No. 21850442.1, dated Nov. 22, 2023, pp. 1-12.

Motorola Mobility, Lenovo, Remaining details on radio link monitoring. 3GPP TSG RAN WG1 Meeting #92, Athens, Greece, Feb. 26-Mar. 2, 2018, R1-1802677, 4 pages.

3rd Generation Partnership Project;Technical Specification Group Radio Access Network;NR;Physical layer procedures for control(Release 16),3GPP TS 38.213 V16.2.0 (Jun. 2020),total:176pages.

Catt et al., "Corrections to BWP operation",3GPP TSG RAN WG1 Meeting #92bis , Sanya, China, Apr. 16-20, 2018,R1-1803761,total:5pages.

Huawei, HiSilicon et al.,"Resource configuration and group scheduling for RRC_Connected UEs",3GPP TSG RAN WG1 Meeting #102-e,E-meeting, Aug. 17-28, 2020,R1-2005249,total:5pages.

Moderator (BBC) et al.,"Feature lead summary # 6 on RAN basic functions for broadcast/multicast for UEs in RRC_IDLE/ RRC_Inactive states", 3GPP TSG RAN WG1 #104-e e-Meeting, Jan. 25-Feb. 5, 2021, R1-2102180,total:95pages.

International Search Report issued in corresponding International Application No. PCT/CN2021/109208, dated Oct. 22, 2021, pp. 1-9.

* cited by examiner

A terminal device obtains first information and second information                    ⟋⟋ 201

The terminal device determines, based on the first information and the second information, that the terminal device operates on a first BWP and a second BWP                    ⟋⟋ 202

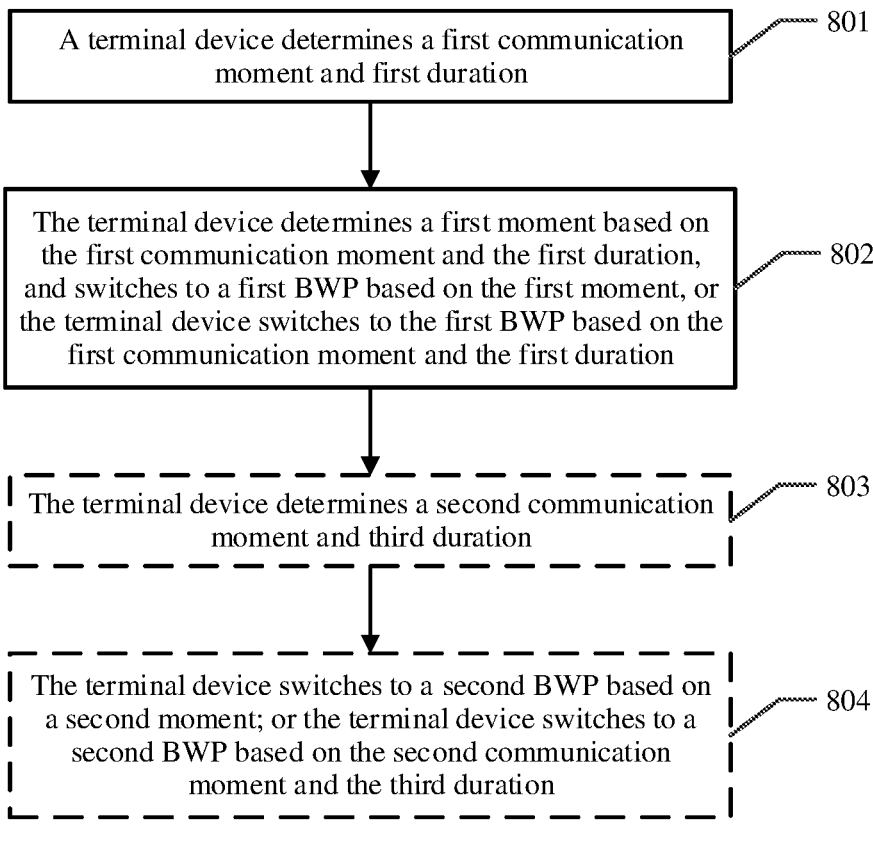

A terminal device determines a first communication moment and first duration ⌐⟋ 801

The terminal device determines a first moment based on the first communication moment and the first duration, and switches to a first BWP based on the first moment, or the terminal device switches to the first BWP based on the first communication moment and the first duration ⌐⟋ 802

The terminal device determines a second communication moment and third duration ⌐⟋ 803

The terminal device switches to a second BWP based on a second moment; or the terminal device switches to a second BWP based on the second communication moment and the third duration ⌐⟋ 804

FIG. 8

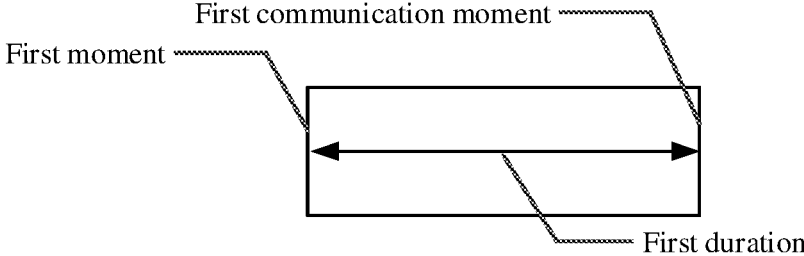

First communication moment

First moment

First duration

FIG. 8a

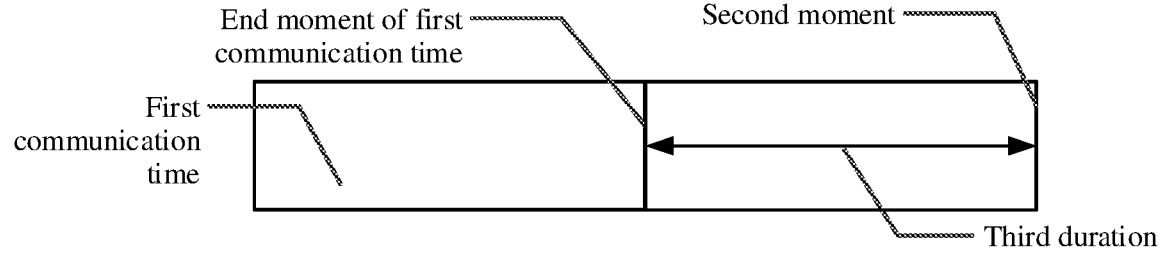

End moment of first communication time

Second moment

First communication time

Third duration

FIG. 10b

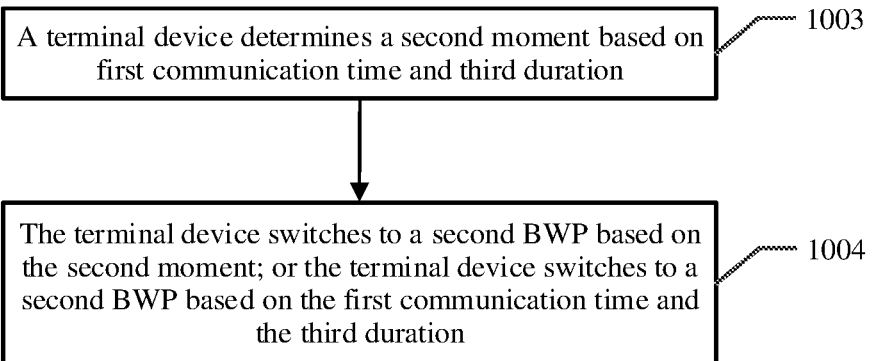

A terminal device determines a second moment based on first communication time and third duration — 1003

The terminal device switches to a second BWP based on the second moment; or the terminal device switches to a second BWP based on the first communication time and the third duration — 1004

FIG. 10c

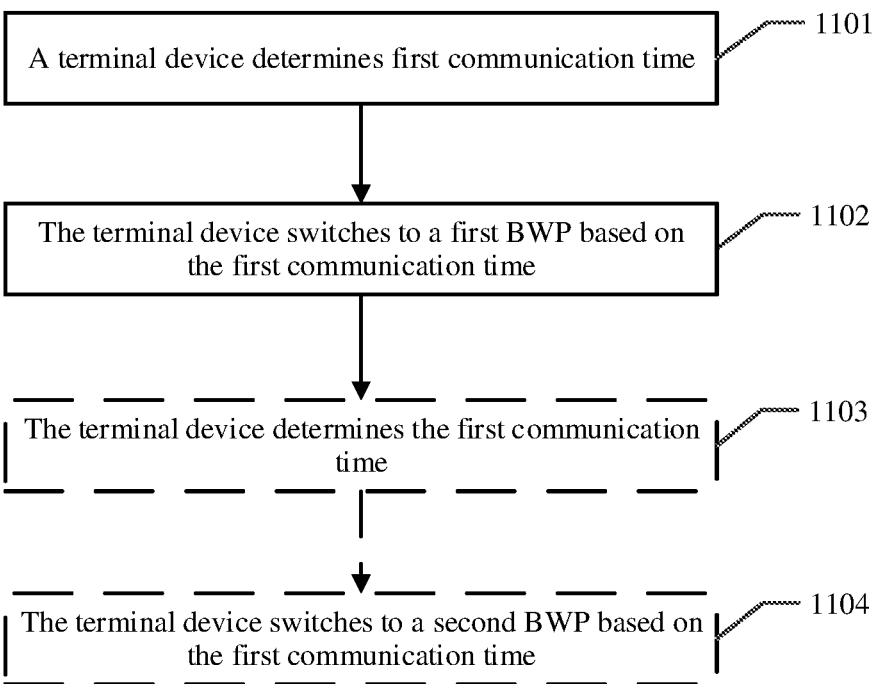

A terminal device determines first communication time — 1101

The terminal device switches to a first BWP based on the first communication time — 1102

The terminal device determines the first communication time — 1103

The terminal device switches to a second BWP based on the first communication time — 1104

FIG. 11

BWP DETERMINING METHOD, APPARATUS, AND SYSTEM

CROSS-REFERENCE TO RELATED APPLICATIONS

This application is a continuation of International Application No. PCT/CN2021/109208, filed on Jul. 29, 2021, which claims priority to Chinese Patent Application No. 202010762170.9, filed on Jul. 31, 2020. The disclosures of the aforementioned applications are hereby incorporated by reference in their entireties.

TECHNICAL FIELD

Embodiments of this application relate to the communication field, and in particular, to a BWP determining method, an apparatus, and a system.

BACKGROUND

Multimedia broadcast multicast service (multimedia broadcast multicast service, MBMS) or multicast and broadcast service (multicast and broadcast service, or multicast/broadcast service, or multicast-broadcast service, MBS) can effectively use communication resources, and provide a point-to-multipoint service for sending data from one data source to multiple users in a communication network. This implements resource sharing and improves resource utilization, especially air interface resources. Generally, in an MBMS or MBS scenario, information may be broadcast to all users, or may be sent to a group of charged subscribers for viewing. This may help operators develop a plurality of commercial applications such as multimedia advertisements, free and paid TV channels, and multimedia message group sending.

New radio (new radio, NR) supports a bandwidth part (bandwidth part, BWP). After groupcast is introduced in NR, there may be a correspondence between a BWP and a transmission mode. For example, different groupcasts may be separately transmitted on respective corresponding BWPs, or unicast and groupcast are separately transmitted on corresponding BWPs. In a conventional solution, the terminal device operates on only one BWP, and can perform transmission (for example, sending or receiving) in only one transmission mode, and communication efficiency is low.

SUMMARY

Embodiments of this application provide a BWP determining method, an apparatus, and a system. In solutions provided in embodiments of this application, a terminal device may operate on two or more BWPs. This improves efficiency of communication between the terminal device and a network device.

A first aspect of this application provides a communication method. In the method, a terminal device obtains first information and second information, where the first information indicates information about a first bandwidth part BWP, and the second information indicates information about a second BWP; and the terminal device determines, based on the first information and the second information, that the terminal device operates on the first BWP and the second BWP.

The terminal device obtains the first information and the second information. The terminal device determines, based on the first information and the second information, that the terminal device operates on the first BWP and the second BWP. In solutions provided in embodiments of this application, the terminal device may operate on two or more BWPs. This improves efficiency of communication between the terminal device and a network device. For example, the terminal device may operate on two or more BWPs (for example, a BWP corresponding to unicast and a BWP corresponding to groupcast, a BWP corresponding to first groupcast and a BWP corresponding to second groupcast, or an initial BWP and a BWP corresponding to groupcast), and may perform transmission in two or more transmission modes (for example, unicast and groupcast transmission, first groupcast and second groupcast transmission, or transmission and groupcast transmission on the initial BWP). For example, the terminal device may operate on a BWP corresponding to unicast and a BWP corresponding to groupcast. The terminal device may receive both unicast and groupcast, or the terminal device may send both unicast and groupcast. This avoids a case in which the terminal device can operate only on one BWP (or can perform transmission in only one transmission mode) and cannot receive data and/or control signals transmitted on another BWP (or cannot learn of a transmission status of the another BWP), and cannot receive data. This helps improve data transmission reliability. This also avoids a case in which the terminal device misses data receiving or increases a data receiving delay because the terminal device cannot learn of a transmission status of another BWP. This helps shorten a transmission delay. This avoids frequent switching between different BWPs by the terminal device to perform transmission in different transmission modes. This helps save energy of the terminal device. A condition for determining whether the terminal device can operate on two or more BWPs is defined, so that the terminal device and/or the network device can determine, based on the determining condition, whether the terminal device can operate on the two or more BWPs. In addition, when the terminal device cannot operate on two or more BWPs, a condition for determining a BWP or BWPs on which the terminal device operates is defined. This helps the terminal device and the network device align the BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability.

In a possible implementation of the first aspect, a bandwidth formed by an outer boundary of the first BWP and an outer boundary of the second BWP is less than or equal to a channel bandwidth supported by the terminal device.

In this possible implementation, the bandwidth formed by an outer boundary of the first BWP and an outer boundary of the second BWP is less than or equal to the channel bandwidth supported by the terminal device, and a bandwidth condition between the first BWP and the second BWP and the bandwidth supported by the terminal device when the terminal device operates on the first BWP and the second BWP is provided.

In a possible implementation of the first aspect, the channel bandwidth supported by the terminal device is less than or equal to a carrier bandwidth.

In this possible implementation, the channel bandwidth supported by the terminal device is less than or equal to the carrier bandwidth. A bandwidth condition between a carrier bandwidth and a bandwidth supported by the terminal device when the terminal device operates on the first BWP and the second BWP is provided.

In a possible implementation of the first aspect, a first subcarrier spacing SCS corresponding to the first BWP is the same as a second SCS corresponding to the second BWP.

In this possible implementation, the SCS of the first BWP is the same as that of the second BWP, and a condition for the SCS of the first BWP and the second BWP when the terminal device operates on the first BWP and the second BWP is provided.

In a possible implementation of the first aspect, the terminal device determines a first bandwidth, where the first bandwidth is greater than or equal to the bandwidth formed by the outer boundary of the first BWP and the outer boundary of the second BWP.

In this possible implementation, after determining the first bandwidth, the terminal device may use the first bandwidth to operate on the first BWP and the second BWP, and use the first bandwidth to operate on both the first BWP and the second BWP. This improves communication efficiency of the terminal device.

In a possible implementation of the first aspect, the first bandwidth is less than or equal to the carrier bandwidth.

In this possible implementation, a preferred implementation of the first bandwidth is provided.

In a possible implementation of the first aspect, that the terminal device operates on the first BWP and the second BWP includes: The terminal device activates the first BWP and/or the second BWP.

In this possible implementation, a preferred implementation in which the terminal device operates on the first BWP and the second BWP is provided.

In a possible implementation of the first aspect, that the terminal device operates on the first BWP and the second BWP includes: The terminal device receives, on the first BWP and the second BWP, data from a network device.

In this possible implementation, a preferred implementation in which the terminal device operates on the first BWP and the second BWP is provided.

A second aspect of this application provides a communication method. In the method, a network device sends first information and second information to a terminal device. The first information indicates information about a first bandwidth part BWP. The second information indicates information about a second BWP. The first information and the second information indicate the terminal device to determine, based on the first information and the second information, that the terminal device operates on the first BWP and the second BWP.

The network device sends the first information and the second information to the terminal device, so that the terminal device may obtain the first information and the second information, and the terminal device determines, based on the first information and the second information, that the terminal device operates on the first BWP and the second BWP. In solutions provided in embodiments of this application, the network device sends the first information and the second information to the terminal device, so that the terminal device may determine that the terminal device can operate on two or more BWPs. This improves efficiency of communication between the terminal device and the network device.

In a possible implementation of the second aspect, a bandwidth formed by an outer boundary of the first BWP and an outer boundary of the second BWP is less than or equal to a channel bandwidth supported by the terminal device.

In a possible implementation of the second aspect, the channel bandwidth supported by the terminal device is less than or equal to a carrier bandwidth.

In a possible implementation of the second aspect, a first subcarrier spacing SCS corresponding to the first BWP is the same as a second SCS corresponding to the second BWP.

A third aspect of this application provides a terminal device, including:

an obtaining unit, configured to obtain first information and second information, where the first information indicates information about a first bandwidth part BWP, and the second information indicates information about a second BWP; and a processing unit, configured to determine, based on the first information and the second information, that the terminal device operates on the first BWP and the second BWP.

In a possible implementation of the third aspect, a bandwidth formed by an outer boundary of the first BWP and an outer boundary of the second BWP is less than or equal to a channel bandwidth supported by the terminal device.

In a possible implementation of the third aspect, the channel bandwidth supported by the terminal device is less than or equal to a carrier bandwidth.

In a possible implementation of the third aspect, a first subcarrier spacing SCS corresponding to the first BWP is the same as a second SCS corresponding to the second BWP.

In a possible implementation of the third aspect, the processing unit is configured to determine a first bandwidth, where the first bandwidth is greater than or equal to the bandwidth formed by the outer boundary of the first BWP and the outer boundary of the second BWP.

In a possible implementation of the third aspect, the first bandwidth is less than or equal to the carrier bandwidth.

In a possible implementation of the third aspect, the processing unit is configured to activate the first BWP and/or the second BWP.

In a possible implementation of the third aspect, the processing unit is configured to receive, on the first BWP and the second BWP, data from a network device.

A fourth aspect of this application provides a network device, including:

a sending unit, configured to send first information and second information to a terminal device, where the first information indicates information about a first bandwidth part BWP, and the second information indicates information about a second BWP; and the first information and the second information indicate the terminal device to determine, based on the first information and the second information, that the terminal device operates on the first BWP and the second BWP.

In a possible implementation of the fourth aspect, a bandwidth formed by an outer boundary of the first BWP and an outer boundary of the second BWP is less than or equal to a channel bandwidth supported by the terminal device.

In a possible implementation of the fourth aspect, the channel bandwidth supported by the terminal device is less than or equal to a carrier bandwidth.

In a possible implementation of the fourth aspect, a first subcarrier spacing SCS corresponding to the first BWP is the same as a second SCS corresponding to the second BWP.

A fifth aspect of this application provides a communication apparatus, including a processor. The processor is coupled to a memory. The memory is configured to store a computer program or instructions. The processor is configured to execute the computer program or instructions in the memory, and a computer is enabled to perform the method in any one of the first aspect or the possible implementations of the first aspect, or a computer is enabled to perform the method in any one of the second aspect or the possible implementations of the second aspect.

A sixth aspect of this application provides a computer-readable storage medium. The computer-readable storage medium is configured to store a computer program. When the computer program is run on a computer, the computer is enabled to perform the method in any one of the first aspect or the possible implementations of the first aspect, or a computer is enabled to perform the method in any one of the second aspect or the possible implementations of the second aspect.

A seventh aspect of this application provides a chip, including a processor and a communication interface. The processor is configured to read instructions to perform the method in any one of the first aspect or the possible implementations of the first aspect, or perform the method in any one of the second aspect or the possible implementations of the second aspect.

An eighth aspect of this application provides a network apparatus, including a processor. The processor is connected to a memory. The memory is configured to store a computer program. The processor is configured to execute the computer program stored in the memory, and the apparatus is enabled to perform the method in any one of the first aspect or the possible implementations of the first aspect, or the method in any one of the second aspect or the possible implementations of the second aspect.

A ninth aspect of this application provides a communication apparatus, including the communication apparatus in any one of the third aspect or the possible implementations of the third aspect, and the communication apparatus in any one of the fourth aspect or the possible implementations of the fourth aspect.

A tenth aspect of this application provides a communication method. In the method, a terminal device determines a first communication moment and first duration; and the terminal device determines a first moment based on the first communication moment and the first duration, and switches to a first BWP based on the first moment.

In a possible implementation of the tenth aspect, in the method, that the terminal device switches to a first BWP based on the first moment includes: The terminal device switches to the first BWP at the first moment or before the first moment.

In a possible implementation of the tenth aspect, in the method, the terminal device receives/monitors a fourth message at the first communication moment or after the first communication moment.

In a possible implementation of the tenth aspect, in the method, the first communication moment includes any one or more of the following: a start moment of a PDCCH monitoring occasion for a paging, a start moment of a PDCCH monitoring occasion for system information, a start moment of a PDCCH monitoring occasion for a SIB1, a start moment of a PDCCH monitoring occasion for an SI message, a start moment of a resource for transmitting a paging message, a start moment of a resource for transmitting system information, and a start moment of a paging occasion.

In a possible implementation of the tenth aspect, in the method, the fourth message includes any one or more of the following: DCI scrambled by a first RNTI, DCI scrambled by a second RNTI, a paging, a paging message, system information, a system information change notification, a PWS notification, and a short message.

In a possible implementation of the tenth aspect, the method further includes: The terminal device determines a second communication moment and third duration; and the terminal device determines a second moment based on the second communication moment and the third duration, and switches to a second BWP based on the second moment.

In a possible implementation of the tenth aspect, in the method, that the terminal device switches to a first BWP based on the second moment includes: The terminal device switches to the second BWP at the second moment or after the second moment.

In a possible implementation of the tenth aspect, in the method, the second communication moment includes any one or more of the following: an end moment of the PDCCH monitoring occasion for the paging, an end moment of the PDCCH monitoring occasion for the system information, an end moment of the PDCCH monitoring occasion for the SIB1, an end moment of the PDCCH monitoring occasion for the SI message, an end moment of the resource for transmitting the paging message, an end moment of the resource for transmitting the system information, and an end moment of the paging occasion.

In a possible implementation of the tenth aspect, the method further includes: The first RNTI is used for any one or more of the following: a paging, a system information change notification, and a PWS notification.

In a possible implementation of the tenth aspect, the method further includes: The second RNTI is used to broadcast the system information.

In a possible implementation of the tenth aspect, the method further includes: The first BWP is an initial BWP.

In a possible implementation of the tenth aspect, the method further includes: The second BWP is a BWP corresponding to groupcast.

An eleventh aspect of this application provides a communication method. In the method, a terminal device determines a first communication moment; and the terminal device switches to a first BWP based on the first communication moment.

In a possible implementation of the eleventh aspect, in the method, that the terminal device switches to a first BWP based on the first communication moment includes: The terminal device switches to the first BWP at the first communication moment or before the first communication moment.

In a possible implementation of the eleventh aspect, the method further includes: The terminal device receives/monitors a fourth message at the first communication moment or after the first communication moment.

In a possible implementation of the eleventh aspect, in the method, the first communication moment includes any one or more of the following: a start moment of a PDCCH monitoring occasion for a paging, a start moment of a PDCCH monitoring occasion for system information, a start moment of a PDCCH monitoring occasion for a SIB1, a start moment of a PDCCH monitoring occasion for an SI message, a start moment of a resource for transmitting a paging message, a start moment of a resource for transmitting system information, and a start moment of a paging occasion.

In a possible implementation of the eleventh aspect, in the method, the fourth message includes any one or more of the following:

7

DCI scrambled by a first RNTI, DCI scrambled by a second RNTI, a paging, a paging message, system information, a system information change notification, a PWS notification, and a short message.

In a possible implementation of the eleventh aspect, the method further includes: The terminal device determines a second communication moment, and the terminal device switches to a second BWP based on the second communication moment.

In a possible implementation of the eleventh aspect, in the method, that the terminal device switches to a first BWP based on the second communication moment includes: The terminal device switches to the second BWP at the second communication moment or after the second communication moment.

In a possible implementation of the eleventh aspect, in the method, the second communication moment includes any one or more of the following: an end moment of the PDCCH monitoring occasion for the paging, an end moment of the PDCCH monitoring occasion for the system information, an end moment of the PDCCH monitoring occasion for the SIB 1, an end moment of the PDCCH monitoring occasion for the SI message, an end moment of the resource for transmitting the paging message, an end moment of the resource for transmitting the system information, and an end moment of the paging occasion.

In a possible implementation of the eleventh aspect, the method further includes: The first RNTI is used for any one or more of the following: a paging, a system information change notification, and a PWS notification.

In a possible implementation of the eleventh aspect, the method further includes: The second RNTI is used to broadcast the system information.

In a possible implementation of the eleventh aspect, the method further includes: The first BWP is an initial BWP.

In a possible implementation of the eleventh aspect, the method further includes: The second BWP is a BWP corresponding to groupcast.

A twelfth aspect of this application provides a communication method. In the method, a terminal device determines first communication time and first duration; and the terminal device determines a first moment based on the first communication time and the first duration, and switches to a first BWP based on the first moment.

In a possible implementation of the twelfth aspect, in the method, that the terminal device switches to a first BWP based on the first moment includes: The terminal device switches to the first BWP at the first moment or before the first moment.

In a possible implementation of the twelfth aspect, the method further includes: The terminal device receives/monitors the fourth message at the first communication time.

In a possible implementation of the twelfth aspect, in the method, the first communication time includes any one or more of the following: a monitoring occasion of a paging PDCCH, a monitoring occasion of a PDCCH for system information, a PDCCH monitoring occasion for a SIB1, a PDCCH monitoring occasion for an SI message, a time domain location of a resource for transmitting a paging message, a time domain location of a resource for transmitting system information, and a paging occasion.

In a possible implementation of the twelfth aspect, in the method, the fourth message includes any one or more of the following: DCI scrambled by a first RNTI, DCI scrambled by a second RNTI, a paging, a paging message, system information, a system information change notification, a PWS notification, and a short message.

In a possible implementation of the twelfth aspect, the method further includes: The terminal device determines third duration; and the terminal device determines a second moment based on the first communication time and the third duration, and switches to a second BWP based on the second moment.

In a possible implementation of the twelfth aspect, in the method, that the terminal device switches to a first BWP based on the second moment includes: The terminal device switches to the second BWP at the second moment or after the second moment.

In a possible implementation of the twelfth aspect, the method further includes: The first RNTI is used for any one or more of the following: a paging, a system information change notification, and a PWS notification.

In a possible implementation of the twelfth aspect, the method further includes: The second RNTI is used to broadcast the system information.

In a possible implementation of the twelfth aspect, the method further includes: The first BWP is an initial BWP.

In a possible implementation of the twelfth aspect, the method further includes: The second BWP is a BWP corresponding to groupcast.

A thirteenth aspect of this application provides a communication method. In the method, a terminal device determines first communication time; and the terminal device switches to a first BWP based on the first communication time.

In a possible implementation of the thirteenth aspect, in the method, that the terminal device switches to a first BWP based on the first communication time includes: The terminal device switches to the first BWP at a start moment of the first communication time or before the first communication time.

In a possible implementation of the thirteenth aspect, the method further includes: The terminal device receives/monitors the fourth message at the first communication time.

In a possible implementation of the thirteenth aspect, in the method, the first communication time includes any one or more of the following: a monitoring occasion of a paging PDCCH, a monitoring occasion of a PDCCH for system information, a PDCCH monitoring occasion for a SIB1, a PDCCH monitoring occasion for an SI message, a time domain location of a resource for transmitting a paging message, a time domain location of a resource for transmitting system information, and a paging occasion.

In a possible implementation of the thirteenth aspect, in the method, the fourth message includes any one or more of the following: DCI scrambled by a first RNTI, DCI scrambled by a second RNTI, a paging, a paging message, system information, a system information change notification, a PWS notification, and a short message.

In a possible implementation of the thirteenth aspect, the method further includes: The terminal device switches to a second BWP based on the first communication time.

In a possible implementation of the thirteenth aspect, in the method, that the terminal device switches to a first BWP based on the first communication time includes: The terminal device switches to the second BWP at an end moment of the first communication time or after the first communication time.

In a possible implementation of the thirteenth aspect, the method further includes: The first RNTI is used for any one or more of the following: a paging, a system information change notification, and a PWS notification.

In a possible implementation of the thirteenth aspect, the method further includes: The second RNTI is used to broadcast the system information.

In a possible implementation of the thirteenth aspect, the method further includes: The first BWP is an initial BWP.

In a possible implementation of the thirteenth aspect, the method further includes: The second BWP is a BWP corresponding to groupcast.

A fourteenth aspect of this application provides a communication method. In the method, a terminal device obtains second information, where the second information indicates information about a second BWP; and the terminal device determines, based on the second information, that the terminal device switches to the second BWP.

In a possible implementation of the fourteenth aspect, the method further includes: A bandwidth of the second BWP is less than or equal to a channel bandwidth supported by the terminal device.

In a possible implementation of the fourteenth aspect, in the method, the channel bandwidth supported by the terminal device is less than or equal to a carrier bandwidth.

A fifteenth aspect of this application provides a communication method. In the method, a terminal device obtains first information and second information, where the first information indicates information about a first bandwidth part BWP, and the second information indicates information about a second BWP; and the terminal device determines, based on the first information and the second information, that the terminal device switches to the second BWP.

In a possible implementation of the fifteenth aspect, in the method, a bandwidth formed by an outer boundary of the first BWP and an outer boundary of the second BWP is less than or equal to a channel bandwidth supported by the terminal device.

In a possible implementation of the fifteenth aspect, in the method, the channel bandwidth supported by the terminal device is less than or equal to a carrier bandwidth.

In a possible implementation of the fifteenth aspect, in the method, a first subcarrier spacing SCS corresponding to the first BWP is the same as a second SCS corresponding to the second BWP.

A sixteenth aspect of this application provides a communication method. In the method, a terminal device obtains second information, where the second information indicates information about a second BWP; and the terminal device performs cell selection or cell reselection based on the second information.

In a possible implementation of the sixteenth aspect, the method further includes: A bandwidth of the second BWP is less than or equal to a channel bandwidth supported by the terminal device.

In a possible implementation of the sixteenth aspect, the method further includes: The channel bandwidth supported by the terminal device is less than or equal to a carrier bandwidth.

A seventeenth aspect of this application provides a communication method. In the method, a terminal device obtains first information and second information, where the first information indicates information about a first bandwidth part BWP, and the second information indicates information about a second BWP; and the terminal device performs cell selection or cell reselection based on the first information and the second information.

In a possible implementation of the seventeenth aspect, in the method, a bandwidth formed by an outer boundary of the first BWP and an outer boundary of the second BWP is less than or equal to a channel bandwidth supported by the terminal device.

In a possible implementation of the seventeenth aspect, in the method, the channel bandwidth supported by the terminal device is less than or equal to a carrier bandwidth.

In a possible implementation of the seventeenth aspect, in the method, a first subcarrier spacing SCS corresponding to the first BWP is the same as a second SCS corresponding to the second BWP.

An eighteenth aspect of this application provides a communication method. In the method, a terminal device obtains second information, where the second information indicates information about a second BWP; and the terminal device monitors, based on the second information, DCI scrambled by a groupcast RNTI.

In a possible implementation of the eighteenth aspect, the method further includes: A bandwidth of the second BWP is less than or equal to a channel bandwidth supported by the terminal device.

In a possible implementation of the eighteenth aspect, the method further includes: The channel bandwidth supported by the terminal device is less than or equal to a carrier bandwidth.

A nineteenth aspect of this application provides a communication method. In the method, a terminal device obtains first information and second information, where the first information indicates information about a first bandwidth part BWP, and the second information indicates information about a second BWP; and the terminal device monitors, based on the first information and the second information, DCI scrambled by a groupcast RNTI.

In a possible implementation of the nineteenth aspect, in the method, a bandwidth formed by an outer boundary of the first BWP and an outer boundary of the second BWP is less than or equal to a channel bandwidth supported by the terminal device.

In a possible implementation of the nineteenth aspect, in the method, the channel bandwidth supported by the terminal device is less than or equal to a carrier bandwidth.

In a possible implementation of the nineteenth aspect, in the method, a first subcarrier spacing SCS corresponding to the first BWP is the same as a second SCS corresponding to the second BWP.

A twentieth aspect of this application provides a communication method. In the method, a terminal device obtains second information, where the second information indicates information about a second BWP; and the terminal device sends seventh information to a network device based on the second information, where the seventh information indicates a second groupcast.

In a possible implementation of the twentieth aspect, the method further includes: A bandwidth of the second BWP is less than or equal to a channel bandwidth supported by the terminal device.

In a possible implementation of the twentieth aspect, the method further includes: The channel bandwidth supported by the terminal device is less than or equal to a carrier bandwidth.

A twenty-first aspect of this application provides a communication method. In the method, a terminal device obtains first information and second information, where the first information indicates information about a first bandwidth part BWP, and the second information indicates information about a second BWP; and the terminal device sends seventh information to a network device based on the first information and the second information, where the seventh information indicates a second groupcast.

In a possible implementation of the twenty-first aspect, in the method, a bandwidth formed by an outer boundary of the first BWP and an outer boundary of the second BWP is less than or equal to a channel bandwidth supported by the terminal device.

In a possible implementation of the twenty-first aspect, in the method, the channel bandwidth supported by the terminal device is less than or equal to a carrier bandwidth.

In a possible implementation of the twenty-first aspect, in the method, a first subcarrier spacing SCS corresponding to the first BWP is the same as a second SCS corresponding to the second BWP.

According to the foregoing technical solutions, it can be learned that embodiments of this application have the following advantages:

An embodiment of this application provides a communication method. A terminal device obtains first information and second information. The terminal device determines, based on the first information and the second information, that the terminal device operates on a first BWP and a second BWP. In solutions provided in embodiments of this application, the terminal device may operate on two or more BWPs. This improves efficiency of communication between the terminal device and a network device.

BRIEF DESCRIPTION OF DRAWINGS

FIG. 8 is a schematic diagram of another embodiment of a communication method according to an embodiment of this application;

FIG. 8a is a schematic diagram of another embodiment of a communication method according to an embodiment of this application;

FIG. 10b is a schematic diagram of another embodiment of a communication method according to an embodiment of this application;

FIG. 10c is a schematic diagram of another embodiment of a communication method according to an embodiment of this application;

FIG. 11 is a schematic diagram of another embodiment of a communication method according to an embodiment of this application;

DESCRIPTION OF EMBODIMENTS

Figures 1, 2:
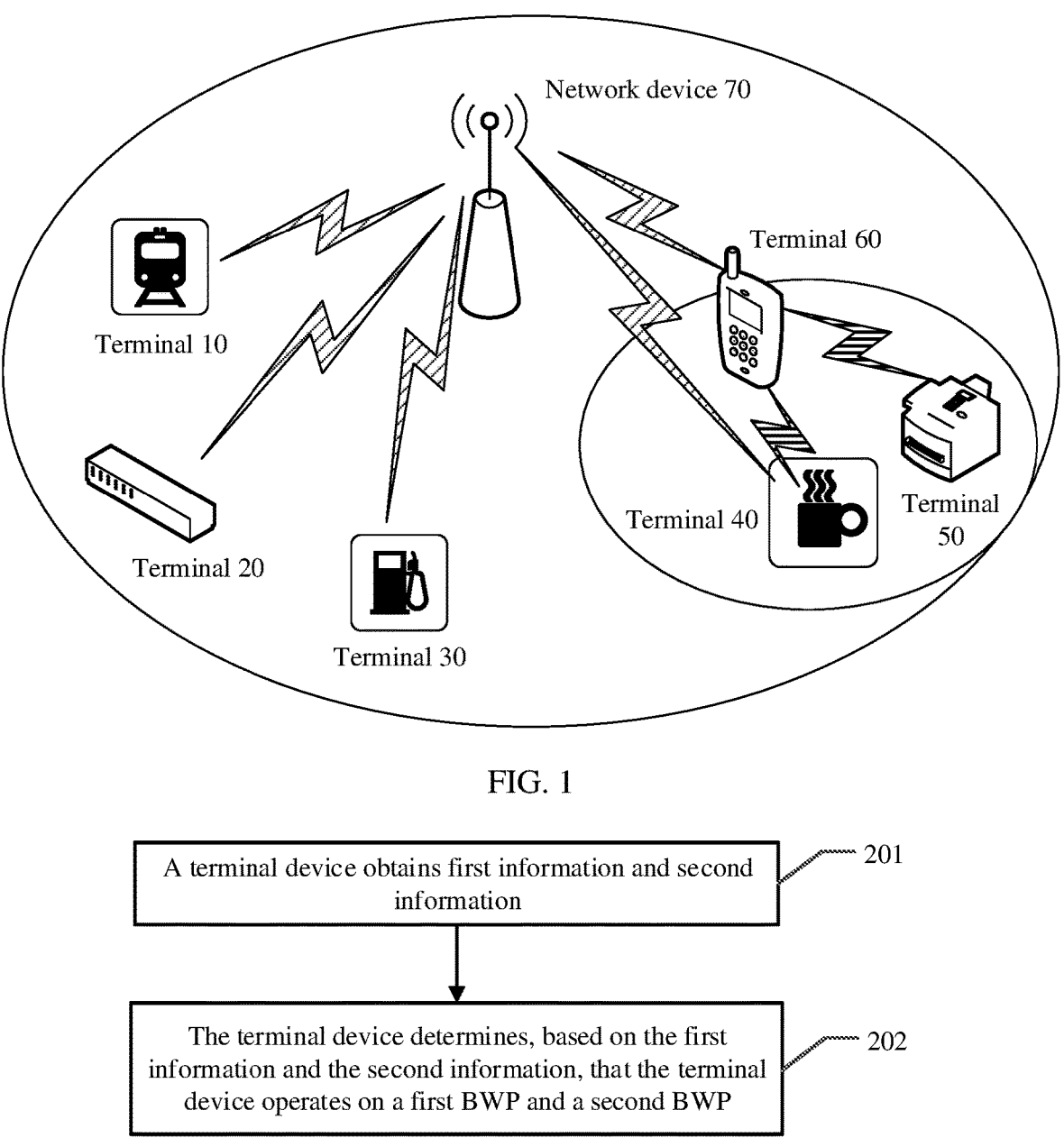
FIG. 1 is a schematic diagram of an application scenario of a communication system according to an embodiment of this application.
FIG. 2 is a schematic diagram of an embodiment of a BWP determining method according to an embodiment of this application.

The following describes embodiments of this application with reference to accompanying drawings. A person of ordinary skill in the art may learn that, with development of technologies and emergence of new scenarios, technical solutions provided in embodiments of this application are also applicable to similar technical problems.

In the description, claims, and accompanying drawings of this application, the terms "first", "second", and the like are intended to distinguish between similar objects but do not necessarily indicate a specific order or sequence. It should be understood that the data termed in such a way are inter- changeable in proper circumstances so that embodiments described herein can be implemented in other orders than the order illustrated or described herein.

In embodiments of this application, the word "example" or "for example" is used to represent giving an example, an illustration, or a description. Any embodiment or design scheme described as "example" or "for example" in embodi- ments of this application should not be explained as being more preferred or having more advantages than another embodiment or design scheme. Exactly, use of the word such as "example" or "for example" is intended to present a relative concept in a specific manner for ease of understand- ing.

The term "and/or" in this application describes only an association relationship of associated objects and represents that three relationships may exist. For example, A and/or B may represent the following three cases: Only A exists, both A and B exist, and only B exists, where A and B may be singular or plural. In addition, in descriptions of this appli- cation, unless otherwise specified, "a plurality of" means two or more than two. At least one of the following items (pieces) or a similar expression thereof refers to any com- bination of these items, including any combination of sin- gular items (pieces) or plural items (pieces). For example, at least one item (piece) of a, b, or c may indicate: a, b, c, a and b, a and c, b and c, or a, b, and c, where a, b, and c may be singular or plural.

The technical solutions in embodiments of this applica- tion may be applied to various communication systems, for example, a long term evolution (long term evolution, LTE) system, an LTE frequency division duplex (frequency divi- sion duplex, FDD) system, an LTE time division duplex (time division duplex, TDD) system, a fifth generation (5th generation, 5G) system or a new radio (new radio, NR) system, and a future mobile communication system.

The method provided in embodiments of this application may be applied to but is not limited to the following fields: multimedia broadcast multicast services (Multimedia Broadcast Multicast Service, MBMS), single-cell point-to- multipoint (Single-cell point-to-multipoint, SC-PTM), mul- ticast and broadcast services (Multicast and Broadcast Ser- vices, Multicast/Broadcast Services, or Multicast-Broadcast Services, MB S), a multimedia broadcast multicast service single frequency network (Multimedia Broadcast multicast service Single Frequency Network, MBSFN), dual-channel intelligent unicast (Dual-channel intelligent unicast, DC- IU), broadcast (Broadcast), multicast (Multicast), multicast broadcast (Multicast Broadcast), groupcast (Groupcast), vehicle to everything (vehicle to everything, V2X), public safety (public safety), mission critical (mission critical), transparent IPv4/IPv6 multicast delivery (transparent IPv4/ IPv6 multicast delivery), IPTV, software delivery over wire- less (software delivery over wireless), group communica- tions (group communications), internet of things (Internet of things, IoT), television video (TV Video), television (TV), linear television (linear TV), live broadcast (Live), and radio services (radio services).

A terminal device in embodiments of this application may refer to a device that has a wireless transceiver function, and may be referred to as a terminal (terminal), user equipment (user equipment, UE), a mobile station (mobile station, MS), a mobile terminal (mobile terminal, MT), a vehicle-mounted terminal device, a remote station, a remote terminal device, a terminal, or the like. A specific form of the terminal device may be a mobile phone (mobile phone), a cellular phone, a cordless phone, a session initiation protocol (session initia- tion protocol, SIP) phone, a wearable device, a tablet com- puter (pad), a desktop computer, a notebook computer, an all-in-one machine, a vehicle-mounted terminal device, a wireless local loop (wireless local loop, WLL) station, a personal digital assistant (personal digital assistant, PDA), or the like. The terminal device may be used in the following scenario: virtual reality (virtual reality, VR), augmented reality (augmented reality, AR), industrial control (industrial control), self driving (self driving), remote medical surgery (remote medical surgery), a smart grid (smart grid), trans- portation safety (transportation safety), a smart city (smart city), a smart home (smart home), or the like. The terminal device may be fixed or movable. It should be noted that the terminal device may support at least one wireless commu- nication technology, such as LTE, NR, or wideband code division multiple access (wideband code division multiple access, WCDMA).

A network device in embodiments of this application may be a device that provides a wireless communication function for the terminal device, and may also be referred to as a radio access network (radio access network, RAN) device or the like. The network device includes but is not limited to: a next-generation NodeB (next generation NodeB, gNB) in 5G, an evolved NodeB (evolved NodeB, eNB), a baseband unit (baseband unit, BBU), a transmit and receive point (transmitting and receiving point, TRP), a transmit point (transmitting point, TP), a relay station, an access point, and the like. The network device may alternatively be a radio controller, a centralized unit (centralized unit, CU), a dis- tributed unit (distributed unit, DU), or the like in a cloud radio access network (cloud radio access network, CRAN) scenario. The network device may support at least one wireless communication technology, such as LTE, NR, or WCDMA.

In some deployments, the gNB may include a centralized unit CU and a DU. The gNB may further include an active antenna unit (active antenna unit, AAU). The CU imple- ments some functions of the gNB, and the DU implements some functions of the gNB. For example, the CU is respon- sible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes informa- tion at the PHY layer, or is changed from information at the PHY layer. Therefore, in this architecture, higher-layer sig- naling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (core network, CN). This is not limited in this application.

In embodiments of this application, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more types of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. For example, the computer-readable medium may include but is not limited to: a magnetic storage component (for example, a hard disk, a floppy disk or a magnetic tape), an optical disc (for example, a compact disc (compact disc, CD), a digital versatile disc (digital versatile disc, DVD), a smart card and a flash memory component (for example, erasable programmable read-only memory (erasable programmable read-only memory, EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry instructions and/or data.

It may be understood that the network device and the terminal device may be deployed on land, including indoor or outdoor and handheld or vehicle-mounted devices, or may be deployed on water, or may be deployed on an airplane, a balloon, or a satellite in the air. An application scenario of the network device and the terminal device is not limited in embodiments of this application.

FIG. 1 is a schematic diagram of a possible communication system to which this application is applicable.

The communication system in FIG. 1 may include a terminal (for example, a terminal 10, a terminal 20, a terminal 30, a terminal 40, a terminal 50, and a terminal 60) and a network device 70. The terminal 10, the terminal 20, the terminal 30, the terminal 40, and the terminal 60 in FIG. 1 may perform uplink and downlink transmission with the network device 70. For example, the network device 70 may send downlink signals/data to the terminal 10, the terminal 20, the terminal 30, the terminal 40, and the terminal 60, and may receive uplink signals/data sent by the terminal 10, the terminal 20, the terminal 30, the terminal 40, and the terminal 60. In addition, the communication system in FIG. 1 may also include a terminal. For example, the terminal 40, the terminal 50, and the terminal 60 may also be considered as a communication system. The terminal 60 may send signals/data to the terminal 40 and the terminal 50, or may receive signals/data sent by the terminal 40 and the terminal 50. In other words, embodiments of this application may be applicable to downlink transmission, uplink transmission, and sidelink transmission.

A wireless communication link used by the terminal to send data (namely, uplink data) or uplink control information to the network device may be referred to as an uplink (uplink, UL). A wireless communication link used by the network device to send data (namely, downlink data) or control information to the terminal may be referred to as a downlink (downlink, DL). A communication link for direct communication between terminals may be referred to as a sidelink (sidelink, SL). Data transmitted between terminals may be referred to as SL data.

A signal/data transmission direction is not limited in this embodiment of this application.

The technical solutions in embodiments of this application may be performed by two communication apparatuses. The two communication apparatuses are described by using a terminal device and a network device as an example. Alternatively, the two communication apparatuses may be communication apparatuses that can support a function required for implementing the method, for example, a first device and a second device. The terminal device is replaced with the first device, and the network device is replaced with the second device.

It should be noted that, in this embodiment of this application, the terminal device is used as an example to describe a specific implementation process. In actual application, embodiments of this application may alternatively be performed by a MAC entity and/or a PHY layer of the terminal device. This is not limited in this application.

The following describes some terms in embodiments of this application, to facilitate understanding of a person skilled in the art.

1. Groupcast and Unicast

Groupcast may include any one or more of the following: broadcast in MBMS or MBS, groupcast in MBMS or MBS, multicast in MBMS or MBS, groupcast in V2X, multicast in V2X, broadcast in V2X, multicast, broadcast, multicast, groupcast, and broadcast. For example, in groupcast, a network device sends data 1, and a plurality of terminal devices may receive the data 1. Optionally, groupcast may be understood as groupcast transmission.

Unicast may include any one or more of the following: unicast in V2X, and unicast. Optionally, unicast may be understood as unicast transmission.

For example, groupcast may be understood as: A second device sends one piece of data 1 once, and a plurality of first devices may receive the data 1. For example, unicast may be understood as: If the second device needs to send one piece of data 1 to a plurality of first devices, the second device needs to separately send the data 1 to each first device.

2. Activation and Deactivation

Optionally, in this application, for an activated BWP, a terminal device may perform any one or more of the following: transmitting on a UL-SCH, transmitting on a RACH, monitoring a PDCCH, transmitting a PUCCH, reporting CSI, transmitting an SRS, receiving a DL-SCH, transmitting a PSBCH, transmitting a PSCCH, transmitting an SL-SCH, transmitting a PSFCH, receiving a PSFCH, receiving a PSBCH, receiving a PSCCH, and receiving an SL-SCH.

Optionally, in this application, for a deactivated BWP, a terminal device may perform any one or more of the following: not transmitting on a UL-SCH, not transmitting on a RACH, not monitoring a PDCCH, not transmitting a PUCCH, not transmitting an SRS, not receiving a DL-SCH, not transmitting a PSBCH, not transmitting a PSCCH, not transmitting an SL-SCH, not transmitting a PSFCH, not receiving a PSFCH, not receiving a PSBCH, not transmitting a PSCCH, and not receiving an SL-SCH.

3. Radio Network Temporary Identifier (Radio Network Temporary Identifier, RNTI)

A. Groupcast RNTI

The groupcast RNTI may be used for any one or more of the following: scheduling a dynamic resource, scheduling a retransmission resource of a dynamic resource, activating a configuration resource, reactivating a configuration resource, deactivating a configuration resource, scheduling a retransmission resource of a configuration resource, groupcast, scheduling groupcast, configuring and scheduling groupcast transmission, activation, deactivation, reactivation, retransmission, and dynamically scheduling groupcast transmission.

For example, the groupcast RNTI may include any one or more of the following: a group-RNTI (for example, group-RNTI, G-RNTI), a group-configured scheduling-RNTI (for example, group-configured scheduling-RNTI, G-CS-RNTI), a group-cell-RNTI (for example, group-cell-RNTI, G-C-RNTI), and a multicast-RNTI (for example, multicast-RNTI, M-RNTI), a multicast-configured scheduling-RNTI (for example, multicast-configured scheduling-RNTI, M-CS-RNTI), and a multicast-cell-RNTI (for example, multicast-cell-RNTI, M-C-RNTI).

4. Miscellaneous

Optionally, in this application, a frequency may be understood as/replaced with a frequency.

Optionally, in this application, obtaining may be understood as/replaced with determining.

Optionally, in this application, monitoring may be understood as/replaced with search.

Optionally, in this application, a bandwidth part may be understood as/replaced with a bandwidth portion.

Optionally, receiving may include: going to receive and needing to receive.

Optionally, monitoring may include going to monitor and needing to monitor.

Optionally, in this application, a PDCCH and DCI may be interchangeably used.

It should be noted that a BWP is used for description in this specification, but a name of the BWP is not limited to the BWP, or may be another name. For example, the BWP may be understood as a subset of a cell bandwidth. For example, the BWP may be understood as a portion of a cell bandwidth. Alternatively, the cell bandwidth includes the BWP. For example, the BWP may alternatively be equal to the cell bandwidth. Optionally, a monitoring occasion may be a monitoring opportunity or a monitoring occasion. Optionally, monitoring may be listening to. Optionally, a paging occasion may be a paging occasion or opportunity.

Optionally, transmission includes sending and/or receiving.

It should be noted that, in this application, switching to a first BWP, or activating a first BWP, or operating on a first BWP is not limited to that a terminal device operates only on the first BWP. Similarly, switching to a second BWP, or activating a second BWP, or operating on a second BWP is not limited to that a terminal device operates only on the second BWP. Similarly, switching to a first BWP and a second BWP, or activating a first BWP and a second BWP, or operating on a first BWP and a second BWP is not limited to that a terminal device operates only on the first BWP and the second BWP.

NR supports a BWP. After groupcast is introduced in NR, there may be a correspondence between a BWP and a transmission mode. For example, different groupcasts may be separately transmitted on respective corresponding BWPs, or unicast and groupcast are separately transmitted on corresponding BWPs. In a conventional solution, the terminal device operates on only one BWP, and can perform transmission in only one transmission mode, and communication efficiency is low.

To resolve the foregoing problem, embodiments of this application provide a communication method and a related device, to improve efficiency of communication between the terminal device and a network device.

FIG. 2 is a schematic flowchart of an embodiment of a communication method according to an embodiment of this application.

As shown in FIG. 2, an embodiment of the communication method in this embodiment of this application includes step 201 to step 202.

201: A terminal device obtains first information and second information.

In this embodiment of this application, the first information indicates information about a first BWP, and the second information indicates information about a second BWP.

In this application, the information of the first BWP may include any one or more of the following: a bandwidth of the first BWP, a location of the first BWP, a first subcarrier spacing (subcarrier spacing, SCS) corresponding to the first BWP, and an identifier (identifier, ID) of the first BWP. The information of the first BWP may further include other content. This is not limited in this application.

For example, the location of the first BWP may include a frequency domain location of the first BWP.

For example, the frequency domain location of the first BWP may include any one or more of the following: a center frequency of the first BWP, a start frequency of the first BWP (for example, a lower boundary/left boundary of the first BWP), and a terminated/end frequency of the first BWP (for example, an upper boundary/right boundary of the first BWP).

Similarly, in this application, the information of the second BWP may include any one or more of the following: a bandwidth of the second BWP, a location of the second BWP, a second SCS corresponding to the second BWP, and an ID of the second BWP. The information of the second BWP may further include other content. This is not limited in this application.

For example, the location of the second BWP may include a frequency domain location of the second BWP.

For example, the frequency domain location of the second BWP may include any one or more of the following: a center frequency of the second BWP, a start frequency of the second BWP (for example, a lower boundary/left boundary of the second BWP), and a terminated/end frequency of the second BWP (for example, an upper boundary/right boundary of the second BWP).

In this embodiment of this application, a manner in which the terminal device obtains the first information may include any one or more of the following:

(1) The terminal device receives a first message sent by a network device, where the first message includes the first information.

For example, the first message may be any one or more of the following: an RRC message (for example, RRC dedicated signaling), an RLC message (for example, an RLC PDU), a MAC message (for example, a MAC CE), a PHY message (for example, DCI or a PDCCH), and a broadcast/groupcast message (for example, system information, a SIB1, a SIB2, a SIB3, a SIB4, a SIB5, RRC broadcast/groupcast information, an MCCH message, or a message similar to an MCCH message, an SC-MCCH message, or a message similar to an MCCH message).

(2) The terminal device determines the first information based on a preconfiguration, definition in a protocol, or information stored in the terminal device before delivery.

In this embodiment of this application, a manner in which the terminal device obtains the second information may include any one or more of the following:

(1) The terminal device receives a second message sent by the network device, where the second message includes the second information.

For example, the second message may be any one or more of the following: an RRC message (for example, RRC dedicated signaling), an RLC message (for example, an RLC PDU), a MAC message (for example, a MAC CE), a PHY message (for example, DCI or a PDCCH), and a broadcast/groupcast message (for example, system information, a SIB1, a SIB2, a SIB3, a SIB4, a SIB5, RRC broadcast/groupcast information, an MCCH message, or a message similar to an MCCH message, an SC-MCCH message, or a message similar to an MCCH message).

(2) The terminal device determines the second information based on a preconfiguration, definition in a protocol, or information stored in the terminal device before delivery.

It should be noted that the first message and the second message may be a same message, or may be different messages. This is not limited in this application.

It should be noted that the first BWP and the second BWP may be downlink BWPs, or may be uplink BWPs.

Optionally, this application may include any one or more of the following:

(1) The terminal device determines a boundary of the first BWP.

For example, the terminal device determines the boundary of the first BWP based on the first information.

(2) The terminal device determines a boundary of the second BWP.

For example, the terminal device determines the boundary of the second BWP based on the second information.

(3) The terminal device determines a relationship between the first BWP and the second BWP.

For example, the terminal device determines the relationship between the first BWP and the second BWP based on the first information and the second information.

(4) The terminal device determines an outer boundary of the first BWP and an outer boundary of the second BWP.

For example, the terminal device determines the outer boundary of the first BWP and the outer boundary of the second BWP based on the first information and the second information.

In this application, the outer boundary of the first BWP and the outer boundary of the second BWP may be understood as an outer boundary formed by the first BWP and the second BWP.

(5) The terminal device determines a bandwidth formed by the outer boundary of the first BWP and the outer boundary of the second BWP.

For example, the terminal device determines, based on the first information and the second information, the bandwidth formed by the outer boundary of the first BWP and the outer boundary of the second BWP.

In this embodiment of this application, the relationship between the first BWP and the second BWP may be any one or more of the following:

(1) Inclusion relationship: The first BWP includes the second BWP, or the second BWP includes the first BWP.

In this application, a boundary of the first BWP is a first boundary and a second boundary, and the first boundary is less than the second boundary. A boundary of the second BWP is a third boundary and a fourth boundary, and the third boundary is less than the fourth boundary. Optionally, the first boundary/the third boundary may be referred to as a left boundary or a lower boundary. Optionally, the second boundary/the fourth boundary may be referred to as a right boundary or an upper boundary.

That the first BWP includes the second BWP may be understood as follows: The first boundary is less than or equal to the third boundary, and the second boundary is greater than or equal to the fourth boundary.

In this case, the outer boundary of the first BWP and the outer boundary of the second BWP may be the first boundary and the second boundary. The first boundary is less than the second boundary.

In this case, the bandwidth formed by the outer boundary of the first BWP and the outer boundary of the second BWP may be obtained by subtracting the first boundary from the second boundary.

That the second BWP includes the first BWP may be understood as: The third boundary is less than or equal to the first boundary, and the fourth boundary is greater than or equal to the second boundary.

In this case, the outer boundary of the first BWP and the outer boundary of the second BWP may be the third boundary and the fourth boundary, and the third boundary is less than the fourth boundary.

In this case, the bandwidth formed by the outer boundary of the first BWP and the outer boundary of the second BWP may be obtained by subtracting the third boundary from the fourth boundary.

It may be understood that the inclusion relationship may include an equal relationship.

That the first BWP is equal to the second BWP may be understood as follows: The first boundary is equal to the third boundary, and the second boundary is equal to the fourth boundary.

In this case, the outer boundary of the first BWP and the outer boundary of the second BWP may be the first boundary/the third boundary and the second boundary/the fourth boundary, and the first boundary/the third boundary is less than the second boundary/the fourth boundary.

In this case, the bandwidth formed by the outer boundary of the first BWP and the outer boundary of the second BWP may be obtained by subtracting the second boundary/the fourth boundary from the first boundary/the third boundary.

Figure 3A:
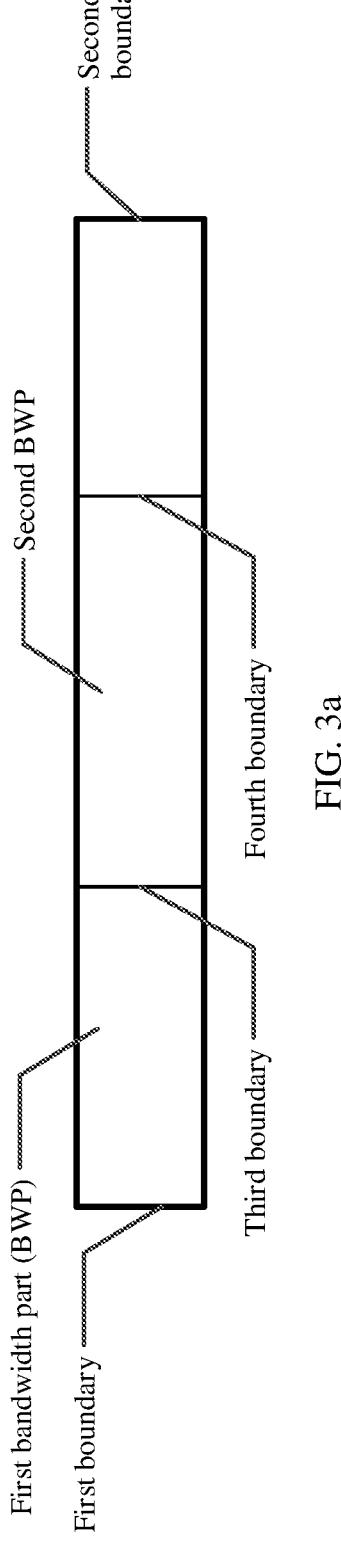
FIG. 3a is a schematic diagram of another embodiment of a BWP determining method according to an embodiment of this application.
Figure 3B:
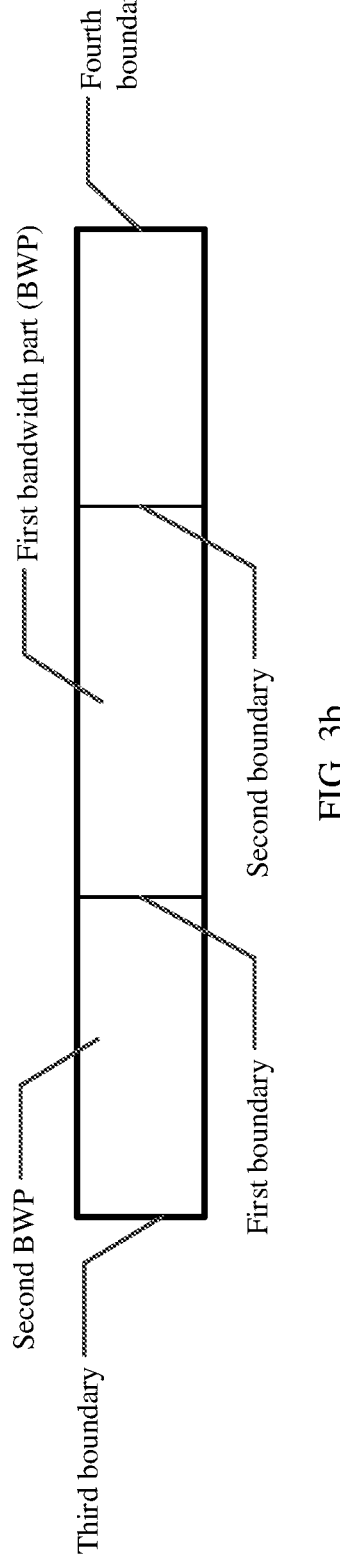
FIG. 3b is a schematic diagram of another embodiment of a BWP determining method according to an embodiment of this application.
Figure 3C:
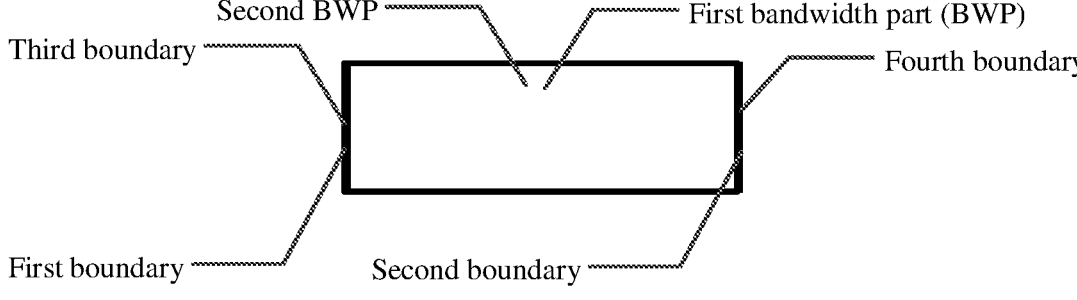
FIG. 3c is a schematic diagram of another embodiment of a BWP determining method according to an embodiment of this application.

For example, FIG. 3a is a schematic diagram in which the first BWP includes the second BWP. FIG. 3b is a schematic diagram in which the second BWP includes the first BWP. FIG. 3*c* is a schematic diagram in which the first BWP is equal to the second BWP.

(2) Intersection relationship: The first BWP intersects the second BWP.

That the first BWP intersects the second BWP may be understood as any one of the following:

(a) The third boundary is greater than the first boundary and less than the second boundary, and the fourth boundary is greater than the second boundary.

In this case, the outer boundary of the first BWP and the outer boundary of the second BWP may be the first boundary and the fourth boundary, and the fourth boundary is greater than the first boundary.

In this case, the bandwidth formed by the outer boundary of the first BWP and the outer boundary of the second BWP may be obtained by subtracting the first boundary from the fourth boundary.

(b) The first boundary is greater than the third boundary and less than the fourth boundary, and the second boundary is greater than the fourth boundary.

In this case, the outer boundary of the first BWP and the outer boundary of the second BWP may be the third boundary and the second boundary, and the second boundary is greater than the third boundary.

In this case, the bandwidth formed by the outer boundary of the first BWP and the outer boundary of the second BWP may be obtained by subtracting the third boundary from the second boundary.

Figure 4A:
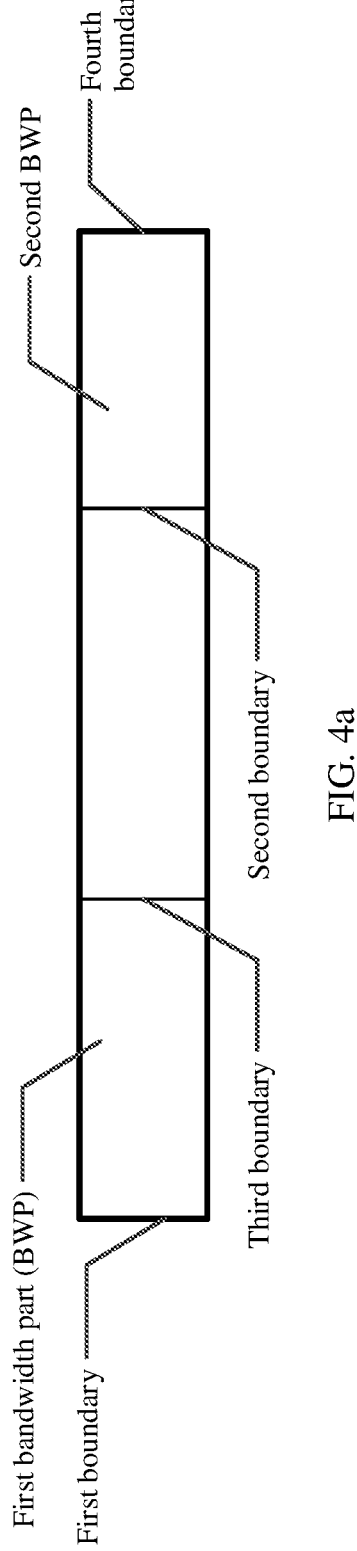
FIG. 4a is a schematic diagram of another embodiment of a BWP determining method according to an embodiment of this application.
Figure 4B:
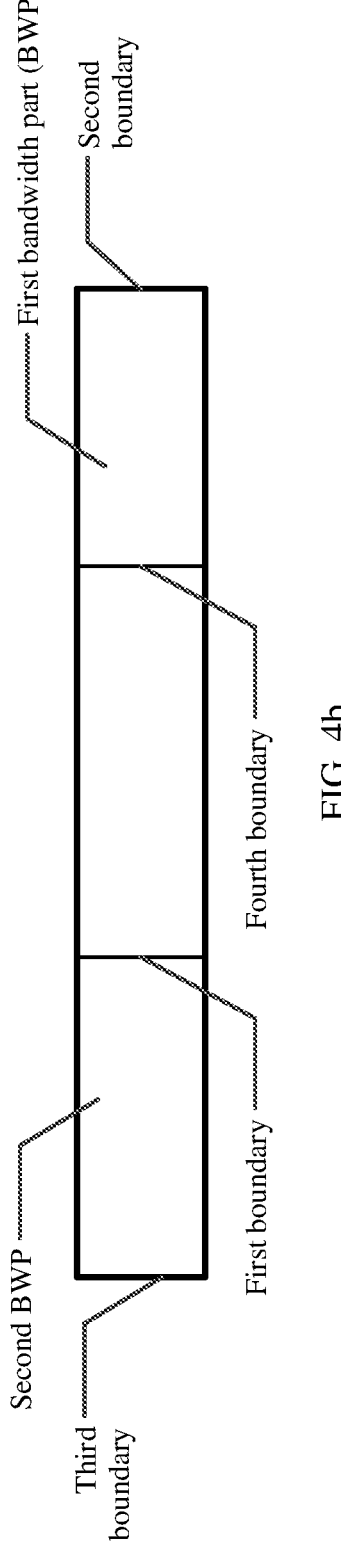
FIG. 4b is a schematic diagram of another embodiment of a BWP determining method according to an embodiment of this application.

For example, FIG. 4*a* and FIG. 4*b* are schematic diagrams in which the first BWP intersects the second BWP.

(3) No intersection relationship: The first BWP does not intersect the second BWP.

That the first BWP does not intersect the second BWP may be understood as any one of the following:

(a) The third boundary is greater than or equal to the second boundary.

In this case, the outer boundary of the first BWP and the outer boundary of the second BWP may be the first boundary and the fourth boundary, and the fourth boundary is greater than the first boundary.

In this case, the bandwidth formed by the outer boundary of the first BWP and the outer boundary of the second BWP may be obtained by subtracting the first boundary from the fourth boundary.

(b) The first boundary is greater than or equal to the fourth boundary.

In this case, the outer boundary of the first BWP and the outer boundary of the second BWP may be the third boundary and the second boundary, and the second boundary is greater than the third boundary.

In this case, the bandwidth formed by the outer boundary of the first BWP and the outer boundary of the second BWP may be obtained by subtracting the third boundary from the second boundary.

Figure 5A:
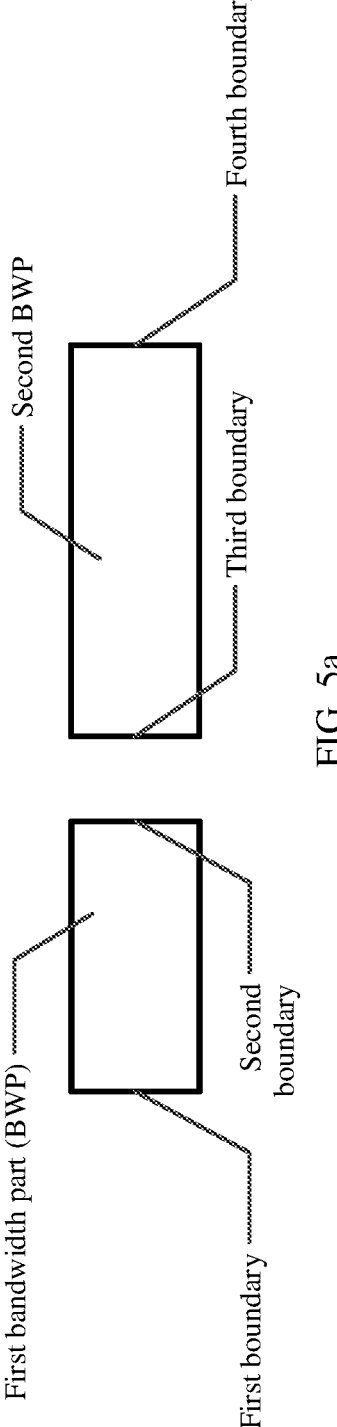
FIG. 5a is a schematic diagram of another embodiment of a BWP determining method according to an embodiment of this application.
Figure 5B:
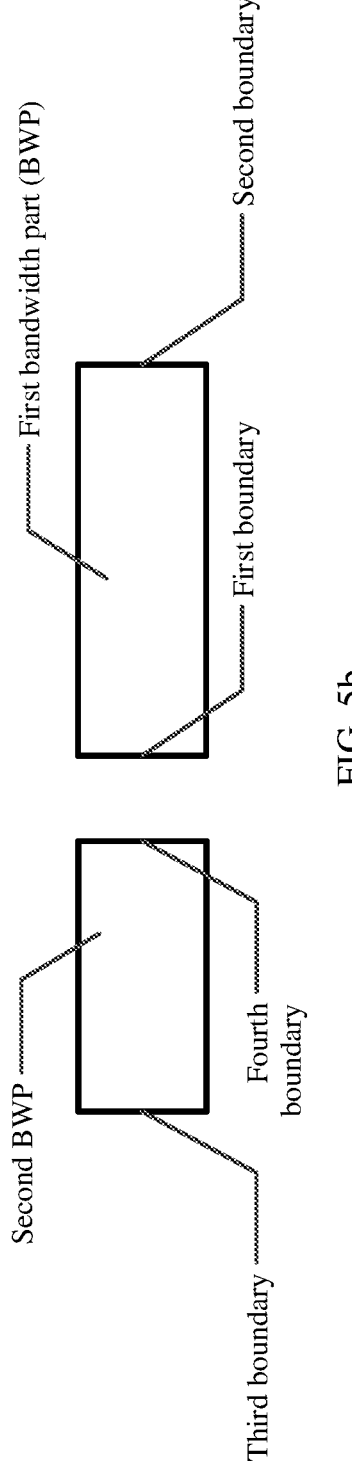
FIG. 5b is a schematic diagram of another embodiment of a BWP determining method according to an embodiment of this application.

For example, FIG. 5*a* and FIG. 5*b* are schematic diagrams in which the first BWP does not intersect the second BWP.

It may be understood that, in this application, the boundary of the first BWP is the first boundary and the second boundary. The boundary of the second BWP is the third boundary and the fourth boundary. The outer boundary of the first BWP and the outer boundary of the second BWP may be "a smallest value (for example, a smallest value in the first boundary, the second boundary, the third boundary, and the fourth boundary) of the boundaries of the first BWP and the second BWP" and "a largest value (for example, a largest value in the first boundary, the second boundary, the third boundary, and the fourth boundary) of the boundaries of the first BWP and the second BWP". The bandwidth formed by the outer boundary of the first BWP and the outer boundary of the second BWP may be obtained by subtracting "the smallest value (for example, the smallest value in the first boundary, the second boundary, the third boundary, and the fourth boundary) of the boundaries of the first BWP and the second BWP" from "the largest value (for example, the largest value in the first boundary, the second boundary, the third boundary, and the fourth boundary) of the boundaries of the first BWP and the second BWP".

The largest value/the smallest value in the boundaries of the first BWP and the second BWP is understood as a largest value/a smallest value in the boundary of the first BWP and the boundary of the second BWP.

202: The terminal device determines, based on the first information and the second information, that the terminal device operates on the first BWP and the second BWP, or the terminal device determines, based on the first information and the second information, that the terminal device does not operate on the first BWP and the second BWP.

"The terminal device operates on the first BWP and the second BWP" may be understood as: The terminal device can operate on the first BWP and the second BWP.

"The terminal device does not operate on the first BWP and the second BWP" may be understood as: The terminal device cannot operate on the first BWP and the second BWP.

"The terminal device determines, based on the first information and the second information, that the terminal device operates on the first BWP and the second BWP" may include: When a first condition related to the first information and the second information is met, the terminal device operates on the first BWP and the second BWP.

"A first condition related to the first information and the second information" may be referred to as a first condition.

The first condition may include any one or more of the following:

Condition 1: The bandwidth formed by the outer boundary of the first BWP and the outer boundary of the second BWP is less than or equal to a channel bandwidth supported by the terminal device.

It may be understood that the channel bandwidth supported by the terminal device may be understood as a channel bandwidth supported by the terminal device (for example, a first channel bandwidth supported by the terminal device).

The channel bandwidth supported by the terminal device may include any one or more of the following: a downlink channel bandwidth supported by the terminal device (for example, a downlink first channel bandwidth supported by the terminal device) or an uplink channel bandwidth supported by the terminal device (for example, an uplink first channel bandwidth supported by the terminal device).

For example, the first BWP and the second BWP are downlink BWPs, and the condition 1 is that the bandwidth formed by the outer boundary of the first BWP and the outer boundary of the second BWP is less than or equal to the downlink channel bandwidth supported by the terminal device.

For example, the first BWP and the second BWP are uplink BWPs, and the condition 1 is that the bandwidth formed by the outer boundary of the first BWP and the outer boundary of the second BWP is less than or equal to the uplink channel bandwidth supported by the terminal device.

For example, in FIG. 5*a*, the bandwidth formed by the outer boundary of the first BWP and the outer boundary of the second BWP may be understood as a bandwidth between the first boundary and the fourth boundary. In other words, the channel bandwidth supported by the terminal device may cover a bandwidth part between the first boundary and the fourth boundary in frequency domain, and the terminal device is capable of operating on both the first BWP and the second BWP. Instead of operating on one BWP, in this case, the terminal device operates in a wider frequency domain range, so that the terminal device can receive a larger traffic volume of transmitted data, or transmit traffic having a high bandwidth requirement. This improves a communication capability of the terminal device, and improves communication efficiency of a system.

Optionally, the channel bandwidth supported by the terminal device may include any one or more of the following: a maximum transmission bandwidth configuration of the channel bandwidth supported by the terminal device, a transmission bandwidth configuration of the channel bandwidth supported by the terminal device, a maximum transmission bandwidth of the channel bandwidth supported by the terminal device, or a transmission bandwidth of the channel bandwidth supported by the terminal device.

Optionally, the downlink channel bandwidth supported by the terminal device may include any one or more of the following: a maximum transmission bandwidth configuration of the downlink channel bandwidth supported by the terminal device, a transmission bandwidth configuration of the downlink channel bandwidth supported by the terminal device, a maximum transmission bandwidth of the downlink channel bandwidth supported by the terminal device, or a transmission bandwidth of the downlink channel bandwidth supported by the terminal device.

Optionally, the uplink channel bandwidth supported by the terminal device may include any one or more of the following: a maximum transmission bandwidth configuration of the uplink channel bandwidth supported by the terminal device, a transmission bandwidth configuration of the uplink channel bandwidth supported by the terminal device, a maximum transmission bandwidth of the uplink channel bandwidth supported by the terminal device, or a transmission bandwidth of the uplink channel bandwidth supported by the terminal device.

For example, the condition 1 is that the bandwidth formed by the outer boundary of the first BWP and the outer boundary of the second BWP is less than or equal to the maximum transmission bandwidth of the channel bandwidth supported by the terminal device.

For example, the first BWP and the second BWP are downlink BWPs, and the condition 1 is that the bandwidth formed by the outer boundary of the first BWP and the outer boundary of the second BWP is less than or equal to the maximum transmission bandwidth of the downlink channel bandwidth supported by the terminal device.

For example, the first BWP and the second BWP are uplink BWPs, and the condition 1 is that the bandwidth formed by the outer boundary of the first BWP and the outer boundary of the second BWP is less than or equal to the maximum transmission bandwidth of the uplink channel bandwidth supported by the terminal device.

The bandwidth formed by the outer boundary of the first BWP and the outer boundary of the second BWP is less than or equal to the channel bandwidth supported by the terminal device, and the terminal device operates on the first BWP and the second BWP.

For example, the first BWP and the second BWP are downlink BWPs. The downlink channel bandwidth supported by the terminal device is 100 MHz, 80 MHz, 40 MHz, or 20 MHz. The bandwidth formed by the outer boundary of the first BWP and the outer boundary of the second BWP is 40 MHz. If the downlink channel bandwidth (for example, 40 MHz, 80 MHz, or 100 MHz) supported by the terminal device is greater than or equal to the bandwidth (40 MHz) formed by the outer boundary of the first BWP and the outer boundary of the second BWP, the terminal device operates on the first BWP and the second BWP.

Optionally, that the bandwidth formed by the outer boundary of the first BWP and the outer boundary of the second BWP is less than or equal to a channel bandwidth supported by the terminal device may include: The channel bandwidth supported by the terminal device includes the bandwidth formed by the outer boundary of the first BWP and the outer boundary of the second BWP.

Condition 2: The channel bandwidth supported by the terminal device is less than or equal to a carrier bandwidth.

For example, the condition 2 is that the channel bandwidth supported by the terminal device is less than or equal to the carrier bandwidth.

For example, the first BWP and the second BWP are downlink BWPs, and the condition 2 is that the downlink channel bandwidth supported by the terminal device is less than or equal to the carrier bandwidth.

For example, the first BWP and the second BWP are uplink BWPs, and the condition 2 is that the uplink channel bandwidth supported by the terminal device is less than or equal to the carrier bandwidth.

For example, the condition 2 is that the maximum transmission bandwidth of the channel bandwidth supported by the terminal device is less than or equal to the carrier bandwidth.

For example, the first BWP and the second BWP are downlink BWPs, and the condition 2 is that the maximum transmission bandwidth of the downlink channel bandwidth supported by the terminal device is less than or equal to the carrier bandwidth.

For example, the first BWP and the second BWP are uplink BWPs, and the condition 2 is that the maximum transmission bandwidth of the uplink channel bandwidth supported by the terminal device is less than or equal to the carrier bandwidth.

The terminal device obtains third information, where the third information indicates the carrier bandwidth.

Optionally, this application further includes any one or more of the following:

(1) The terminal device determines the carrier bandwidth.

For example, the terminal device determines the carrier bandwidth based on the third information.

In this embodiment of this application, a manner in which the terminal device obtains the third information may include any one or more of the following:

(1) The terminal device receives a third message sent by the network device, where the second message includes the third information.

For example, the third message may be any one or more of the following: an RRC message (for example, RRC dedicated signaling), an RLC message (for example, an RLC PDU), a MAC message (for example, a MAC CE), a PHY message (for example, DCI or a PDCCH), a broadcast/groupcast message (for example, system information, a SIB1, a SIB1, a SIB2, a SIBS, a SIB4, a SIBS, RRC broadcast/groupcast information, an MCCH message, or a message similar to an MCCH message, an SC-MCCH message, or a message similar to an MCCH message).

(2) The terminal device determines the third information based on a preconfiguration, definition in a protocol, or information stored in the terminal device before delivery.

It should be noted that the first message, the second message, and the third message may be a same message, or may be different messages. This is not limited in this application.

In this application, optionally, the carrier bandwidth may include a carrier bandwidth for an SCS. For example, the carrier bandwidth is a carrier bandwidth of the first SCS corresponding to the first BWP, a carrier bandwidth of the second SCS corresponding to the second BWP, or a carrier bandwidth of a third SCS. The third SCS is a larger value or a smaller value between the first SCS and the second SCS.

In this application, optionally, the carrier bandwidth may be understood as a cell bandwidth.

Optionally, that the channel bandwidth supported by the terminal device is less than or equal to a carrier bandwidth may include: The carrier bandwidth includes the channel bandwidth supported by the terminal device.

Optionally, if the condition 1 and the condition 2 are met, the terminal device operates on the first BWP and the second BWP.

If the channel bandwidth supported by the terminal device is greater than or equal to the bandwidth formed by the outer boundary of the first BWP and the outer boundary of the second BWP, and is less than or equal to the carrier bandwidth, the terminal device operates on the first BWP and the second BWP.

For example, the first BWP and the second BWP are downlink BWPs. The downlink channel bandwidth supported by the terminal device is 100 MHz, 80 MHz, 40 MHz, or 20 MHz. The carrier bandwidth is 90 MHz. The bandwidth formed by the outer boundary of the first BWP and the outer boundary of the second BWP is 40 MHz. If the downlink channel bandwidth (for example, 40 MHz or 80 MHz) supported by the terminal device is greater than or equal to the bandwidth (40 MHz) formed by the outer boundary of the first BWP and the outer boundary of the second BWP, and is less than or equal to the carrier bandwidth (90 MHz), the terminal device operates on the first BWP and the second BWP.

For example, the first BWP and the second BWP are downlink BWPs. The downlink channel bandwidth supported by the terminal device is 100 MHz, 80 MHz, 40 MHz, or 20 MHz. The carrier bandwidth is 90 MHz. The bandwidth formed by the outer boundary of the first BWP and the outer boundary of the second BWP is 90 MHz. The downlink channel bandwidth supported by the terminal device cannot be greater than or equal to the bandwidth (90 MHz) formed by the outer boundary of the first BWP and the outer boundary of the second BWP and less than or equal to the carrier bandwidth (90 MHz), and the terminal device does not operate on the first BWP and the second BWP.

In this embodiment of this application, the terminal device determines, in no time sequence, whether the condition 1 is met and whether the condition 2 is met. The terminal device may first determine whether the condition 1 is met, or may first determine whether the condition 2 is met, or may simultaneously determine both conditions. This is not specifically limited herein.

It should be noted that the condition 1 or the condition 2 may be used as an implicit condition. In other words, no explicit determining is performed.

Condition 3: The first SCS corresponding to the first BWP is the same as the second SCS corresponding to the second BWP.

Optionally, if the condition 1, the condition 2, and the condition 3 are met, the terminal device operates on the first BWP and the second BWP.

If the first SCS corresponding to the first BWP is the same as the second SCS corresponding to the second BWP, and the channel bandwidth supported by the terminal device is greater than or equal to the bandwidth formed by the outer boundary of the first BWP and the outer boundary of the second BWP and is less than or equal to the carrier bandwidth, the terminal device operates on the first BWP and the second BWP.

For example, the first BWP and the second BWP are downlink BWPs. The downlink channel bandwidth supported by the terminal device is 100 MHz, 80 MHz, 40 MHz, or 20 MHz. The carrier bandwidth of 15 kHz is 90 MHz. The first SCS corresponding to the first BWP is 15 kHz. The second SCS corresponding to the second BWP is 15 kHz. The bandwidth formed by the outer boundary of the first BWP and the outer boundary of the second BWP is 40 MHz. If the first SCS (15 kHz) corresponding to the first BWP is the same as the second SCS (15 kHz) corresponding to the second BWP, and the downlink channel bandwidth (for example, 40 MHz or 80 MHz) supported by the terminal device is greater than or equal to the bandwidth (40 MHz) formed by the outer boundary of the first BWP and the outer boundary of the second BWP, and is less than or equal to the carrier bandwidth (90 MHz), the terminal device operates on the first BWP and the second BWP.

It should be noted that another combination of the condition 1, the condition 2, and the condition 3 is similar to the foregoing case. Details are not described herein again.

Optionally, this application further includes: When a first preset condition is met or a first condition and a first preset condition are met, the terminal device operates on the first BWP and the second BWP.

The first preset condition may include any one or more of the following:

Condition 4: The terminal device has a capability of operating on two and/or more BWPs.

Optionally, the condition 4 may include: The terminal device has a capability of operating on the first BWP and the second BWP.

Condition 5: The terminal device receives first indication information from the network device, where the first indication information indicates that the terminal device can operate on two and/or more BWPs, and/or the first indication information indicates that the network device grants/configures/allows/requests the terminal device to operate on two and/or more BWPs.

Optionally, "the terminal device can operate on two and/or more BWPs" in the condition 5 may include: The terminal device can operate on the first BWP and the second BWP.

Condition 6: The terminal device receives second indication information from the terminal device (for example, an upper layer), where the second indication information indicates that the terminal device can operate on two and/or more BWPs, and/or the second indication information indicates that the terminal device (for example, the upper layer) grants/configures/allows/requests the terminal device to operate on two and/or more BWPs.

Optionally, "the terminal device can operate on two and/or more BWPs" in the condition 6 may include: The terminal device can operate on the first BWP and the second BWP.

For example, in this application, the upper layer may be an RRC layer, a NAS layer, or an APP layer. This is not limited in this application.

In a possible implementation, before determining whether the first condition is met, the terminal device may first determine whether the first preset condition is met.

For example, if the first preset condition is met, whether the first condition is met may be further determined, to determine whether the terminal device can operate on the first BWP and the second BWP.

For example, if the first preset condition is not met, it may be determined that the terminal device cannot operate on the first BWP and the second BWP without further determining whether the first condition is met.

It should be noted that the terminal device determines, based on no time sequence, whether the first condition is met and whether the first preset condition is met in this application. The terminal device may first determine whether the first condition is met, or may first determine whether the first preset condition is met, or may simultaneously determine the first condition and the first preset condition. This is not specifically limited herein.

Optionally, "the terminal device operates on the first BWP and the second BWP" may be understood as follows: The terminal device communicates with the network device on the first BWP, and the terminal device communicates with the network device on the second BWP, or the terminal device communicates with the network device on the first BWP and the second BWP.

It may be further understood that communication between the terminal device and the network device on the first BWP may be specifically data transmission or signaling exchange. This is not limited in this application.

It may be further understood that communication between the terminal device and the network device on the second BWP may be specifically data transmission or signaling exchange. This is not limited in this application.

Optionally, "the terminal device operates on the first BWP and the second BWP" includes any one or more of the following:

1. The terminal device activates the first BWP and/or the second BWP.

For example, if the terminal device previously operates on the first BWP, or the first BWP is previously active, and the first condition is met, or the first condition and the first preset condition are met, the terminal device activates the second BWP. In other words, the terminal device operates on the first BWP and the second BWP.

For example, if the terminal device previously operates on the second BWP or the second BWP is previously active, and the first condition is met, or the first condition and the first preset condition are met, the terminal device activates the first BWP. In other words, the terminal device operates on the first BWP and the second BWP.

For example, if the terminal device previously operates on a third BWP, or a third BWP is previously active, and the first condition is met, or the first condition and the first preset condition are met, the terminal device activates the first BWP and the second BWP. In other words, the terminal device operates on the first BWP and the second BWP. Optionally, the terminal device deactivates the third BWP.

Optionally, that the terminal device activates the first BWP may be understood as switching to the first BWP.

Optionally, that the terminal device activates the second BWP may be understood as switching to the second BWP.

Optionally, that the terminal device activates the first BWP and the second BWP may be understood as switching to the first BWP and the second BWP.

2. The terminal device receives data and/or control signals from the network device on the first BWP and the second BWP, or the terminal device sends data and/or control signals to the network device on the first BWP and the second BWP.

3. The terminal device determines and/or uses a first bandwidth.

That the terminal device uses a first bandwidth includes: The terminal device uses the first bandwidth to communicate with the network device. Optionally, the terminal device performs data and signaling transmission with the network device on the first bandwidth.

The first bandwidth meets a third condition. The third condition includes a condition 7 and/or a condition 8.

That the first bandwidth meets the third condition may be understood as follows: The first bandwidth is a first bandwidth that meets the third condition.

Condition 7: The bandwidth formed by the outer boundary of the first BWP and the outer boundary of the second BWP is less than or equal to the first bandwidth. Optionally, when determining the first bandwidth, the terminal device needs to consider a constraint of operating on both the first BWP and the second BWP, and a range of a finally determined operating bandwidth needs to cover a widest portion of the first BWP and the second BWP in a frequency domain range.

Optionally, the first bandwidth may include any one or more of the following: a downlink first bandwidth or an uplink first bandwidth.

For example, the first BWP and the second BWP are downlink BWPs, and the condition 7 is that the bandwidth formed by the outer boundary of the first BWP and the outer boundary of the second BWP is less than or equal to the downlink first bandwidth.

For example, the first BWP and the second BWP are uplink BWPs, and the condition 7 is that the bandwidth formed by the outer boundary of the first BWP and the outer boundary of the second BWP is less than or equal to the uplink first bandwidth.

Optionally, the first bandwidth may include any one or more of the following: a maximum transmission bandwidth configuration of the first bandwidth, a transmission bandwidth configuration of the first bandwidth, a maximum transmission bandwidth of the first bandwidth, or a transmission bandwidth of the first bandwidth.

Optionally, the downlink first bandwidth may include any one or more of the following: a maximum transmission bandwidth configuration of the downlink first bandwidth, a transmission bandwidth configuration of the downlink first bandwidth, a maximum transmission bandwidth of the downlink first bandwidth, or a transmission bandwidth of the downlink first bandwidth.

Optionally, the uplink first bandwidth may include any one or more of the following: a maximum transmission bandwidth configuration of the uplink first bandwidth, a transmission bandwidth configuration of the uplink first bandwidth, a maximum transmission bandwidth of the uplink first bandwidth, or a transmission bandwidth of the uplink first bandwidth.

For example, the first BWP and the second BWP are downlink BWPs, and the condition 7 is that the bandwidth formed by the outer boundary of the first BWP and the outer boundary of the second BWP is less than or equal to the maximum transmission bandwidth of the downlink first bandwidth.

For example, the first BWP and the second BWP are uplink BWPs, and the condition 7 is that the bandwidth formed by the outer boundary of the first BWP and the outer boundary of the second BWP is less than or equal to the maximum transmission bandwidth of the uplink first bandwidth.

For example, the first BWP and the second BWP are downlink BWPs. The downlink channel bandwidth supported by the terminal device is 100 MHz, 80 MHz, 40 MHz, or 20 MHz. The carrier bandwidth is 90 MHz. The bandwidth formed by the outer boundary of the first BWP and the outer boundary of the second BWP is 40 MHz. If the downlink channel bandwidth (for example, 40 MHz or 80 MHz) supported by the terminal device is greater than or equal to the bandwidth (40 MHz) formed by the outer boundary of the first BWP and the outer boundary of the second BWP, and is less than or equal to the carrier bandwidth (90 MHz), the terminal device operates on the first BWP and the second BWP. The terminal device uses the first bandwidth (for example, 40 MHz, 80 MHz, or 100 MHz). The bandwidth (40 MHz) formed by the outer boundary of the first BWP and the outer boundary of the second BWP is less than or equal to the first bandwidth (for example, 40 MHz, 80 MHz, or 100 MHz).

Optionally, "the bandwidth formed by the outer boundary of the first BWP and the outer boundary of the second BWP is less than or equal to the first bandwidth" may include: The first bandwidth includes the bandwidth formed by the outer boundary of the first BWP and the outer boundary of the second BWP.

The boundary of the first bandwidth is a fifth boundary and a sixth boundary. The fifth boundary is less than the sixth boundary.

Figure 6:
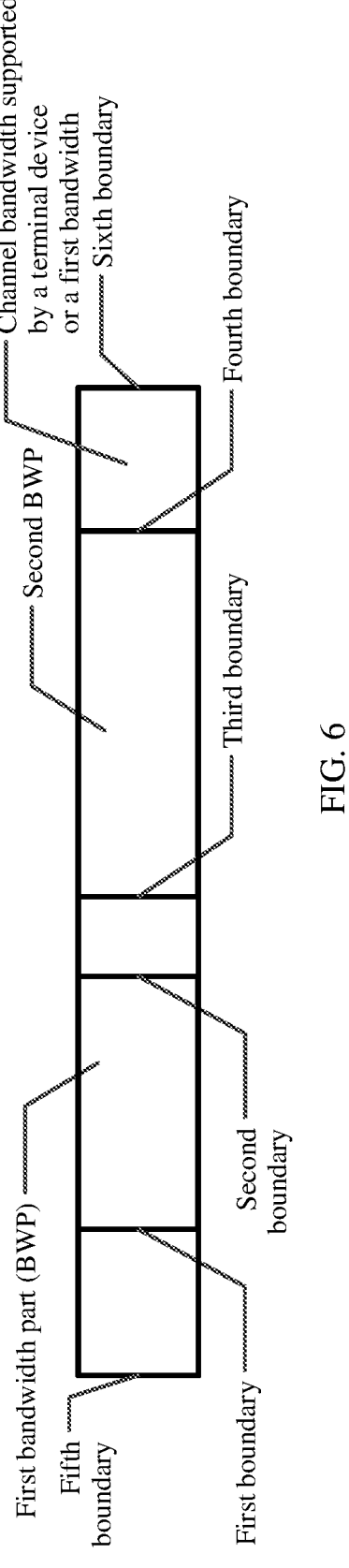
FIG. 6 is a schematic diagram of another embodiment of a BWP determining method

For example, FIG. 6 illustrates an example in which the first BWP does not intersect the second BWP. The terminal device obtains the first information and the second information. The boundary of the first BWP is the first boundary and the second boundary (the second boundary is greater than the first boundary). The boundary of the second BWP is the third boundary and the fourth boundary (the fourth boundary is greater than the third boundary). The outer boundary of the first BWP and the outer boundary of the second BWP are the first boundary and the fourth boundary (the fourth boundary is greater than the first boundary). The bandwidth formed by the outer boundary of the first BWP and the outer boundary of the second BWP is obtained by subtracting the first boundary from the fourth boundary. If the channel bandwidth supported by the terminal device is greater than or equal to the bandwidth formed by the outer boundary of the first BWP and the outer boundary of the second BWP, and is less than or equal to the carrier bandwidth, the terminal device operates on the first BWP and the second BWP. The terminal device uses the first bandwidth. The first bandwidth includes the bandwidth formed by the outer boundary of the first BWP and the outer boundary of the second BWP. The fifth boundary is less than or equal to the first boundary. The sixth boundary is greater than or equal to the fourth boundary.

For example, the first BWP and the second BWP are downlink BWPs. The downlink channel bandwidth supported by the terminal device is 100 MHz, 80 MHz, 40 MHz, or 20 MHz. The carrier bandwidth is 90 MHz. The bandwidth formed by the outer boundary of the first BWP and the outer boundary of the second BWP is 40 MHz. If the downlink channel bandwidth (for example, 40 MHz or 80 MHz) supported by the terminal device is greater than or equal to the bandwidth (40 MHz) formed by the outer boundary of the first BWP and the outer boundary of the second BWP, and is less than or equal to the carrier bandwidth (90 MHz), the terminal device operates on the first BWP and the second BWP. UE uses the first bandwidth (for example, 40 MHz or 80 MHz). The first bandwidth (for example, 40 MHz or 80 MHz) includes the bandwidth (40 MHz) formed by the outer boundary of the first BWP and the outer boundary of the second BWP.

It may be understood that "the first bandwidth includes the bandwidth formed by the outer boundary of the first BWP and the outer boundary of the second BWP" limits a location of the first bandwidth.

Condition 8: The first bandwidth is less than or equal to the carrier bandwidth.

Optionally, the terminal device determines and/or uses the first bandwidth, where the first bandwidth meets the condition 7 and the condition 8.

For example, the first BWP and the second BWP are downlink BWPs. The downlink channel bandwidth supported by the terminal device is 100 MHz, 80 MHz, 40 MHz, or 20 MHz. The carrier bandwidth is 90 MHz. The bandwidth formed by the outer boundary of the first BWP and the outer boundary of the second BWP is 40 MHz. If the downlink channel bandwidth (for example, 40 MHz or 80 MHz) supported by the terminal device is greater than or equal to the bandwidth (40 MHz) formed by the outer boundary of the first BWP and the outer boundary of the second BWP, and is less than or equal to the carrier bandwidth (90 MHz), the terminal device operates on the first BWP and the second BWP. The terminal device uses the first bandwidth (for example, 40 MHz or 80 MHz). The first bandwidth (for example, 40 MHz or 80 MHz) is greater than or equal to the bandwidth (40 MHz) formed by the outer boundary of the first BWP and the outer boundary of the second BWP, and is less than or equal to the carrier bandwidth (90 MHz).

Optionally, "the first bandwidth is less than or equal to the carrier bandwidth" may include: The carrier bandwidth includes the first bandwidth.

The boundary of the first bandwidth is the fifth boundary and the sixth boundary. The fifth boundary is less than the sixth boundary.

A boundary of the carrier bandwidth is a seventh boundary and an eighth boundary. The seventh boundary is less than the eighth boundary.

Figure 7:
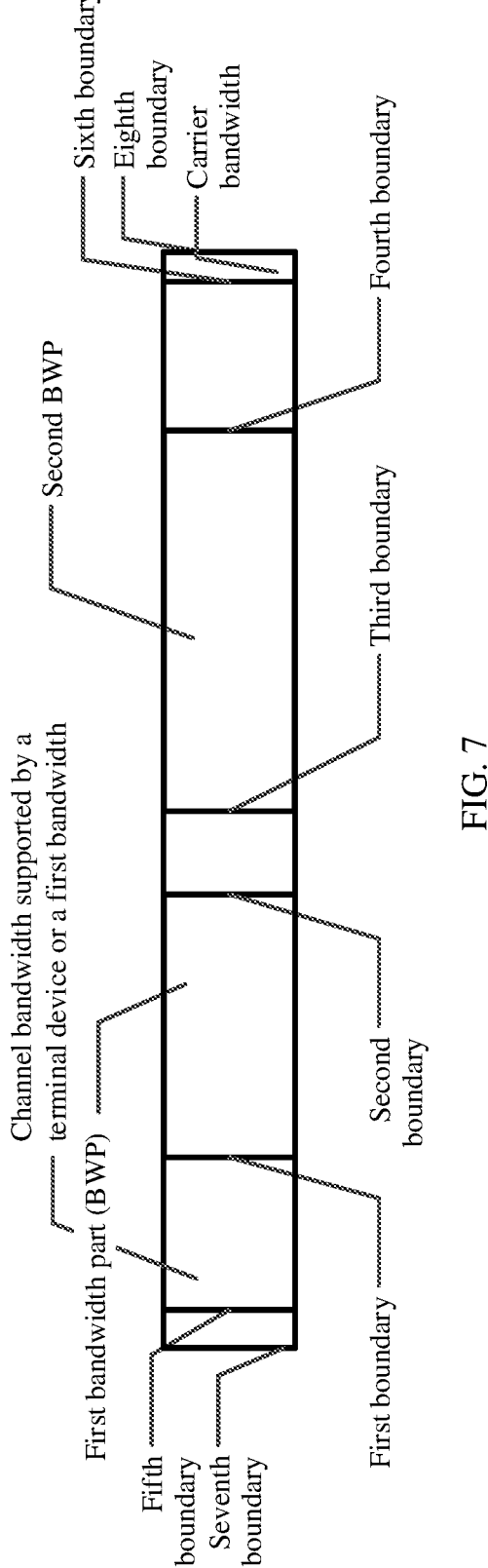
FIG. 7 is a schematic diagram of another embodiment of a BWP determining method

For example, FIG. 7 illustrates an example in which the first BWP does not intersect the second BWP. The terminal device obtains the first information and the second information. The boundary of the first BWP is the first boundary and the second boundary (the second boundary is greater than the first boundary). The boundary of the second BWP is the third boundary and the fourth boundary (the fourth boundary is greater than the third boundary). The outer boundary of the first BWP and the outer boundary of the second BWP are the first boundary and the fourth boundary (the fourth boundary is greater than the first boundary). The bandwidth formed by the outer boundary of the first BWP and the outer boundary of the second BWP is obtained by subtracting the first boundary from the fourth boundary. If the channel bandwidth supported by the terminal device is greater than or equal to the bandwidth formed by the outer boundary of the first BWP and the outer boundary of the second BWP, and is less than or equal to the carrier bandwidth, the terminal device operates on the first BWP and the second BWP. The terminal device uses the first bandwidth. The first bandwidth is greater than or equal to the bandwidth formed by the outer boundary of the first BWP and the outer boundary of the second BWP. The first bandwidth is less than or equal to the carrier bandwidth. The fifth boundary is less than or equal to the first boundary. The sixth boundary is greater than or equal to the fourth boundary. The seventh boundary is less than or equal to the fifth boundary. The eighth boundary is greater than or equal to the sixth boundary.

For example, the first BWP and the second BWP are downlink BWPs. The downlink channel bandwidth supported by the terminal device is 100 MHz, 80 MHz, 40 MHz, or 20 MHz. The carrier bandwidth is 90 MHz. The bandwidth formed by the outer boundary of the first BWP and the outer boundary of the second BWP is 40 MHz. If the downlink channel bandwidth (for example, 40 MHz or 80 MHz) supported by the terminal device is greater than or equal to the bandwidth (40 MHz) formed by the outer boundary of the first BWP and the outer boundary of the second BWP, and is less than or equal to the carrier bandwidth (90 MHz), the terminal device operates on the first BWP and the second BWP. The UE uses the first bandwidth (for example, 40 MHz or 80 MHz). The first bandwidth includes the bandwidth formed by the outer boundary of the first BWP and the outer boundary of the second BWP. The carrier bandwidth includes the first bandwidth.

Optionally, it may be understood that "the carrier bandwidth includes the first bandwidth" limits the location of the first bandwidth.

Optionally, it may be understood that "the first bandwidth includes the bandwidth formed by the outer boundary of the first BWP and the outer boundary of the second BWP" and "the carrier bandwidth includes the first bandwidth" limit the location of the first bandwidth.

In a possible implementation, the first bandwidth meets the following condition, or the third condition includes: The first bandwidth includes the bandwidth formed by the outer boundary of the first BWP and the outer boundary of the second BWP, and the carrier bandwidth includes the first bandwidth.

In another possible implementation, the first bandwidth meets the following condition, or the third condition includes: The first bandwidth includes the bandwidth formed by the outer boundary of the first BWP and the outer boundary of the second BWP, and the first bandwidth is less than or equal to the carrier bandwidth.

In another possible implementation, the first bandwidth meets the following condition, or the third condition includes: The bandwidth formed by the outer boundary of the first BWP and the outer boundary of the second BWP is less than or equal to the first bandwidth, and the carrier bandwidth includes the first bandwidth.

In another possible implementation, the first bandwidth meets the following condition, or the third condition includes: The bandwidth formed by the outer boundary of the first BWP and the outer boundary of the second BWP is less than or equal to the first bandwidth, and the first bandwidth is less than or equal to the carrier bandwidth.

Optionally, the first bandwidth may be understood as the channel bandwidth supported by the terminal device or a channel bandwidth supported by the terminal device (for example, the first channel bandwidth supported by the terminal device or the second channel bandwidth supported by the terminal device).

For example, that the terminal device determines and/or uses the first bandwidth is: The terminal device determines and/or uses the channel bandwidth supported by the terminal device. That the first bandwidth meets the third condition is: The channel bandwidth supported by the terminal device meets the third condition.

For example, the condition 7 is that the bandwidth formed by the outer boundary of the first BWP and the outer boundary of the second BWP is less than or equal to the channel bandwidth supported by the terminal device.

For example, the first BWP and the second BWP are downlink BWPs, and the condition 7 is that the bandwidth formed by the outer boundary of the first BWP and the outer boundary of the second BWP is less than or equal to the downlink channel bandwidth supported by the terminal device.

For example, the first BWP and the second BWP are uplink BWPs, and the condition 7 is that the bandwidth formed by the outer boundary of the first BWP and the outer boundary of the second BWP is less than or equal to the uplink channel bandwidth supported by the terminal device.

For example, the condition 7 is that the bandwidth formed by the outer boundary of the first BWP and the outer boundary of the second BWP is less than or equal to the maximum transmission bandwidth of the channel bandwidth supported by the terminal device.

For example, the first BWP and the second BWP are downlink BWPs, and the condition 7 is that the bandwidth formed by the outer boundary of the first BWP and the outer boundary of the second BWP is less than or equal to the maximum transmission bandwidth of the downlink channel bandwidth supported by the terminal device.

For example, the first BWP and the second BWP are uplink BWPs, and the condition 7 is that the bandwidth formed by the outer boundary of the first BWP and the outer boundary of the second BWP is less than or equal to the maximum transmission bandwidth of the uplink channel bandwidth supported by the terminal device.

For example, the condition 8 is that the channel bandwidth supported by the terminal device is less than or equal to the carrier bandwidth.

For example, the first BWP and the second BWP are downlink BWPs, and the condition 8 is that the downlink channel bandwidth supported by the terminal device is less than or equal to the carrier bandwidth.

For example, the first BWP and the second BWP are uplink BWPs, and the condition 8 is that the uplink channel bandwidth supported by the terminal device is less than or equal to the carrier bandwidth.

For example, the condition 8 is that the maximum transmission bandwidth of the channel bandwidth supported by the terminal device is less than or equal to the carrier bandwidth.

For example, the first BWP and the second BWP are downlink BWPs, and the condition 8 is that the maximum transmission bandwidth of the downlink channel bandwidth supported by the terminal device is less than or equal to the carrier bandwidth.

For example, the first BWP and the second BWP are uplink BWPs, and the condition 8 is that the maximum transmission bandwidth of the uplink channel bandwidth supported by the terminal device is less than or equal to the carrier bandwidth.

Optionally, this application further includes: The terminal device determines and/or uses the first bandwidth.

"The terminal device determines, based on the first information and the second information, that the terminal device does not operate on the first BWP and the second BWP" may include: Regardless of whether a second condition related to the first information and the second information is met, the terminal device does not operate on the first BWP and the second BWP.

The second condition related to the first information and the second information may be referred to as a second condition.

The second condition may include any one or more of the following:

Condition A: The bandwidth formed by the outer boundary of the first BWP and the outer boundary of the second BWP is greater than the channel bandwidth supported by the terminal device.

Condition B: The channel bandwidth supported by the terminal device is greater than the carrier bandwidth.

Condition C: The first SCS corresponding to the first BWP is different from the second SCS corresponding to the second BWP.

Optionally, this application further includes: When a second preset condition is met or the second condition and a second preset condition are met, the terminal device does not operate on the first BWP and the second BWP.

Condition D: The terminal device does not have a capability of operating on two and/or more BWPs.

Optionally, the condition D may include: The terminal device does not have a capability of operating on the first BWP and the second BWP.

Condition E: The terminal device receives third indication information from the network device, where the third indication information indicates that the terminal device cannot operate on two and/or more BWPs, and/or the third indication information indicates that the network device authorizes/configures/allows/requests the terminal device to operate on two and/or more BWPs.

Optionally, "the terminal device cannot operate on two and/or more BWPs" in the condition E may include: The terminal device cannot operate on the first BWP and the second BWP.

Condition F: The terminal device receives fourth indication information from the terminal device (for example, an upper layer), where the fourth indication information indicates that the terminal device cannot operate on two and/or more BWPs, and/or the fourth indication information indicates that the terminal device (for example, the upper layer) grants/configures/allows/requests the terminal device to operate on two and/or more BWPs.

Optionally, "the terminal device cannot operate on two and/or more BWPs" in the condition F may include: The terminal device cannot operate on the first BWP and the second BWP.

It may be understood that, in this application, that the second condition is met may include/be equal to that the first condition is not met.

It may be understood that, in this application, that the second preset condition is met may include/be equal to that the first preset condition is not met.

It may be understood that, in this application, that the first condition is met may include/be equal to that the second condition is not met.

It may be understood that, in this application, that the first preset condition is met may include/be equal to that the second preset condition is not met.

In a possible implementation, before determining whether the second condition is met, the terminal device may first determine whether the second preset condition is met.

For example, if the second preset condition is not met, it may be further determined whether the second condition is met, to determine whether the terminal device can operate on the first BWP and the second BWP.

For example, if the second preset condition is met, it may be determined that the terminal device cannot operate on the first BWP and the second BWP without further determining whether the second condition is met.

It should be noted that the terminal device determines, based on no time sequence, whether the second condition is met and whether the second preset condition is met in this application. The terminal device may first determine whether the second condition is met, or may first determine whether the second preset condition is met, or may simultaneously determine the second condition and the second preset condition. This is not specifically limited herein.

Optionally, this application further includes: The terminal device determines that the terminal device has or does not have a capability of operating on two and/or more BWPs.

For example, a first communication apparatus determines, based on the first preset condition and/or the second preset condition, that the first communication apparatus does not have or has the capability of operating on two and/or more BWPs.

For example, if the first preset condition is met and/or the second preset condition is not met, the terminal device determines that the terminal device has the capability of operating on two and/or more BWPs.

For example, if the first preset condition is not met and/or the second preset condition is met, the terminal device determines that the terminal device does not have the capability of operating on two and/or more BWPs.

Optionally, "the terminal device does not operate on the first BWP and the second BWP" may include: The terminal device communicates with the network device on the first BWP, or the terminal device communicates with the network device on the second BWP.

Optionally, "the terminal device does not operate on the first BWP and the second BWP" includes any one or more of the following:

(1) If a fourth condition is met, the terminal device operates on the first BWP.

(2) If a sixth condition is met, the terminal device operates on the second BWP.

The fourth condition includes at least one of the following:

Condition a: A bandwidth of the first BWP is less than or equal to the channel bandwidth supported by the terminal device.

Condition b: The channel bandwidth supported by the terminal device is less than or equal to the carrier bandwidth.

Optionally, if the condition a and the condition b are met, the terminal device operates on the first BWP.

For example, the first BWP is a downlink BWP. The downlink channel bandwidth supported by the terminal device is 100 MHz, 80 MHz, 40 MHz, or 20 MHz. The carrier bandwidth is 90 MHz. The bandwidth of the first BWP is 40 MHz. If the downlink channel bandwidth (for example, 40 MHz or 80 MHz) supported by the terminal device is greater than or equal to the bandwidth (40 MHz) of the first BWP, and is less than or equal to the carrier bandwidth (90 MHz), the terminal device operates on the first BWP.

Condition c: The terminal device receives second control information from the network device, where the second control information includes sixth information, and the sixth information indicates the first BWP.

Optionally, "the second control information includes sixth information, and the sixth information indicates the first BWP" may be understood as: BWP switching is indicated in the second control information.

Optionally, the second control information may be second DCI. Optionally, the terminal device receives the second DCI on the second BWP.

It should be noted that the sixth information may implicitly or explicitly indicate the first BWP. This is not limited in this application.

It should be noted that the second control information may implicitly or explicitly indicate BWP switching. This is not limited in this application.

Condition d: The terminal device is interested in groupcast.

That the terminal device is interested in groupcast includes any one or more of the following: The terminal device is receiving groupcast; the terminal device is interested in receiving groupcast; and the terminal device sets up a bearer corresponding to groupcast.

The first BWP is associated with groupcast. For example, groupcast is first groupcast.

Condition e: The terminal device receives/monitors the fourth message or before the terminal device receives/monitors the fourth message.

For related descriptions of the fourth message, refer to content in embodiments shown in FIG. 8, FIG. 9, FIG. 10, and FIG. 11. Details are not described herein again.

That the terminal device receives/monitors the fourth message or before the terminal device receives/monitors the fourth message may include any one or more of the following:

(1) The terminal device receives/monitors the fourth message on the first BWP, or before the terminal device receives/monitors the fourth message on the first BWP.

(2) Condition related to a first moment: The first moment or before the first moment. For example, current time is the first moment or before the first moment.

(3) Condition related to the first communication moment and the first duration: The first duration before the first communication moment ends. For example, current time is the first duration before the first communication moment ends.

(4) Condition related to the first communication moment: The first communication moment or before the first communication moment. For example, current time is the first communication moment or before the first communication moment.

(5) Condition related to the first communication time and the first duration: The first duration before a start moment of the first communication time ends. For example, current time is the first duration before the start moment of the first communication time ends.

(6) Condition 1 related to the first communication time: The first communication time (for example, the start moment of the first communication time), or before the first communication time (for example, the start moment of the first communication time), or before the first communication time. For example, current time is the first communication time (for example, the start moment of the first communication time), or before the first communication time (for example, the start moment of the first communication time), or before the first communication time.

For content related to the first moment, the first communication moment, the first duration, the first communication time, and/or the condition e, refer to content in embodiments shown in FIG. 8, FIG. 9, FIG. 10, and FIG. 11. Details are not described herein again.

It may be understood that, the terminal device operates on the first BWP, and is receiving or is going to receive the fourth message. The terminal device receives the first control information including fifth information, where the fifth information indicates the second BWP. The terminal ignores BWP switching indicated by the first control information.

Condition f: The terminal device does not perform random access, or the terminal device successfully performs random access.

The terminal device does not perform random access on the second BWP, or the terminal device successfully performs random access on the second BWP.

Condition g: A priority of traffic related to the first BWP is higher than a priority of traffic related to the second BWP.

The condition g may include any one or more of the following:

(1) A priority of a paging is higher than a priority of groupcast.

The traffic related to the first BWP may be the paging, and the traffic related to the second BWP is groupcast.

(2) A priority of system information is higher than the priority of groupcast.

The traffic related to the first BWP may be the system information, and the traffic related to the second BWP is groupcast.

(3) A priority of random access is higher than the priority of groupcast.

The traffic related to the first BWP may be the random access, and the traffic related to the second BWP is groupcast.

(4) A priority of the first groupcast is higher than a priority of second groupcast.

The traffic related to the first BWP may be the first groupcast, and the traffic related to the second BWP is the second groupcast.

(5) A priority of unicast is higher than the priority of groupcast.

The traffic related to the first BWP may be unicast, and the traffic related to the second BWP is groupcast.

That a priority of the traffic related to the first BWP is higher than a priority of the traffic related to the second BWP may be configured by the network device, preconfigured, or defined in a protocol. This is not limited in this application.

It should be noted that the priority of the traffic may include a priority of receiving traffic, for example, a paging receiving priority, a system information receiving priority, a unicast receiving priority, and a groupcast receiving priority.

For example, the terminal device operates on the second BWP, and the second BWP is a BWP corresponding to groupcast. The first BWP is an initial BWP. The first communication apparatus receives a paging. If the channel bandwidth supported by the terminal device is greater than or equal to the bandwidth of the first BWP and is less than or equal to the carrier bandwidth, and the priority of the paging is higher than the priority of groupcast, the terminal device operates on the first BWP.

Figure 12:
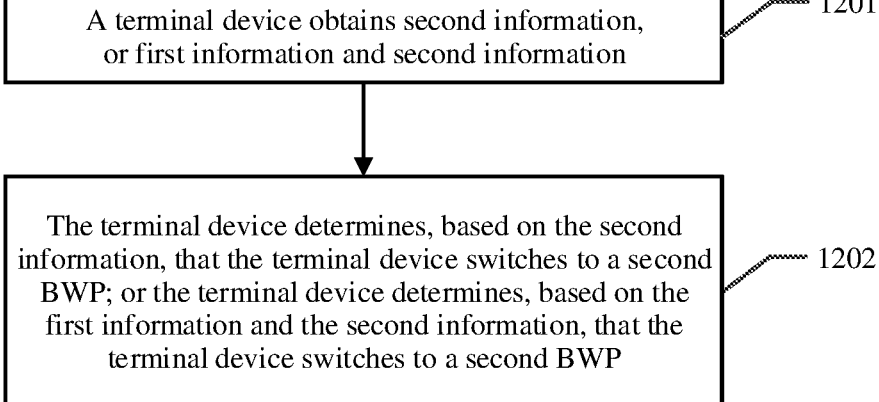
FIG. 12 is a schematic diagram of another embodiment of a communication method according to an embodiment of this application.

For content related to the sixth condition, refer to the descriptions in the embodiment shown in FIG. 12. Details are not described herein again.

It may be understood that, in this application, that the sixth condition is met may include that the fourth condition is not met.

It may be understood that, in this application, that the fourth condition is met may include that the sixth condition is not met.

That the terminal device operates on the first BWP includes any one or more of the following:

(1) The terminal device switches to the first BWP.

(2) The terminal device activates the first BWP.

(3) The terminal device deactivates the second BWP.

(4) The terminal device switches from the second BWP to the first BWP.

(5) The terminal device switches from the third BWP to the first BWP.

(6) The terminal device deactivates the third BWP.

(7) The terminal device receives data and/or control signals from a first network device on the first BWP, or the terminal device sends data and/or control signals to a first network device on the first BWP.

The third BWP is a BWP on which the terminal device operates.

That the terminal device operates on the second BWP includes any one or more of the following:

(1) The terminal device switches to the second BWP.

(2) The terminal device activates the second BWP.

(3) The terminal device deactivates the first BWP.

(4) The terminal device switches from the first BWP to the second BWP.

(5) The terminal device switches from the third BWP to the second BWP.

(6) The terminal device deactivates the third BWP.

(7) The terminal device receives data and/or control signals from the first network device on the second BWP, or the terminal device sends data and/or control signals to the first network device on the second BWP.

The third BWP is the BWP on which the terminal device operates.

Optionally, this application further includes: The terminal device sends eighth information to the network device, where the eighth information indicates information about the BWP on which the terminal device operates, or information of a BWP activated by the terminal device, or information of a BWP to which the terminal device switches. Optionally, when the terminal device is in a connected state, the terminal device sends the eighth information to the network device. The information of the BWP may include any one or more of the following: a bandwidth of the BWP, a location of the BWP, an SCS corresponding to the BWP, an ID of the BWP, and a transmission mode (for example, unicast, groupcast, or idle/inactive transmission) corresponding to the BWP. For example, the eighth information may be any one or more of the following: an RRC message (for example, RRC dedicated signaling), an RLC message (for example, an RLC PDU), a MAC message (for example, a MAC CE), and a PHY message (for example, a PUCCH). It should be noted that the eighth information may implicitly or explicitly indicate information of the BWP on which the terminal device operates, information of the BWP activated by the terminal device, or information of the BWP to which the terminal device switches. It should be noted that, content related to the eighth information sent by the terminal device to the network device may be used as an independent embodiment.

In this application, the first BWP and the second BWP may be the first possible case, the second possible case, or the third possible case. However, the first BWP and the second BWP are not limited to the three cases in this application.

In a first possible case, the first BWP is a BWP corresponding to unicast, and the second BWP is a BWP corresponding to groupcast.

In a second possible case, the first BWP is an initial BWP, and the second BWP is a BWP corresponding to groupcast.

In a third possible case, the first BWP is a BWP corresponding to first groupcast, and the second BWP is a BWP corresponding to second groupcast.

It may be understood that the BWP corresponding to groupcast may include an initial BWP corresponding to groupcast and/or a BWP corresponding to groupcast.

It may be understood that the BWP corresponding to unicast may include an initial BWP and/or a BWP corresponding to unicast.

Optionally, it may be understood that the initial BWP is an initial BWP corresponding to unicast.

It should be noted that, in this application, an example in which the first BWP and the second BWP are downlink BWPs is used for description. A case in which the first BWP and the second BWP are uplink BWPs is similar to a case in which the first BWP and the second BWP are downlink BWPs. Downlink is replaced with uplink for understanding. Details are not described in this application.

It should be noted that, in this application, the first BWP and the second BWP are downlink BWPs or uplink BWPs for description. Alternatively, the first BWP and the second BWP may be SL BWPs. Downlink is replaced with SL, the terminal device is replaced with the first terminal device, and the network device is replaced with the second terminal device for understanding. Details are not described in this application.

It may be understood that the technical solutions provided in this application may be further applicable to a scenario with a plurality of BWPs (for example, three BWPs), and "the first BWP and the second BWP" may be replaced with "a plurality of BWPs" for understanding. The terminal device obtains information of a plurality of BWPs, and determines, based on the information of the plurality of BWPs, whether the terminal device operates on the plurality of BWPs or does not operate on the plurality of BWPs. For example, the plurality of BWPs may include any one or more of the following: an initial BWP, a BWP corresponding to unicast, and a BWP corresponding to groupcast. The BWP corresponding to groupcast may be one or more BWPs.

The three BWPs are used as an example for description in this embodiment of this application.

**201*a*:** The terminal device receives first information, second information, and third information.

In this embodiment of this application, the first information includes a parameter of a first BWP. The second information corresponds to a parameter of a second BWP. The third information corresponds to a parameter of a third BWP. The parameter of the first BWP, the parameter of the second BWP, and the parameter of the third BWP are similar to the parameter of the first BWP and the parameter of the second BWP that are mentioned in the foregoing embodiment. Details are not described herein again.

In a possible design, **202*a*: The terminal device determines, based on a channel bandwidth supported by the terminal device and a carrier bandwidth, a maximum bandwidth in which the terminal device can operate. Optionally, before this step, the method further includes: The terminal device determines, based on the first information, the second information, and the third information, that the terminal device does not operate on the three BWPs. Related content is similar to related content in step 202**. Details are not described herein again.

The terminal device determines, based on the first information, the second information, and the third information, that the terminal device does not operate on the three BWPs. For example, if the channel bandwidth supported by the terminal device cannot be greater than or equal to a bandwidth formed by outer boundaries of the three BWPs and less than or equal to the carrier bandwidth (90 MHz), the terminal device does not operate on the three BWPs.

The terminal device may determine, based on the following possible implementations, a BWP or BWPs on which the terminal device operates.

In a possible implementation, the terminal device determines, based on a maximum quantity of BWPs that can be included in the maximum bandwidth in which the terminal device can operate, the BWP on which the terminal device operates.

Figure 7A:
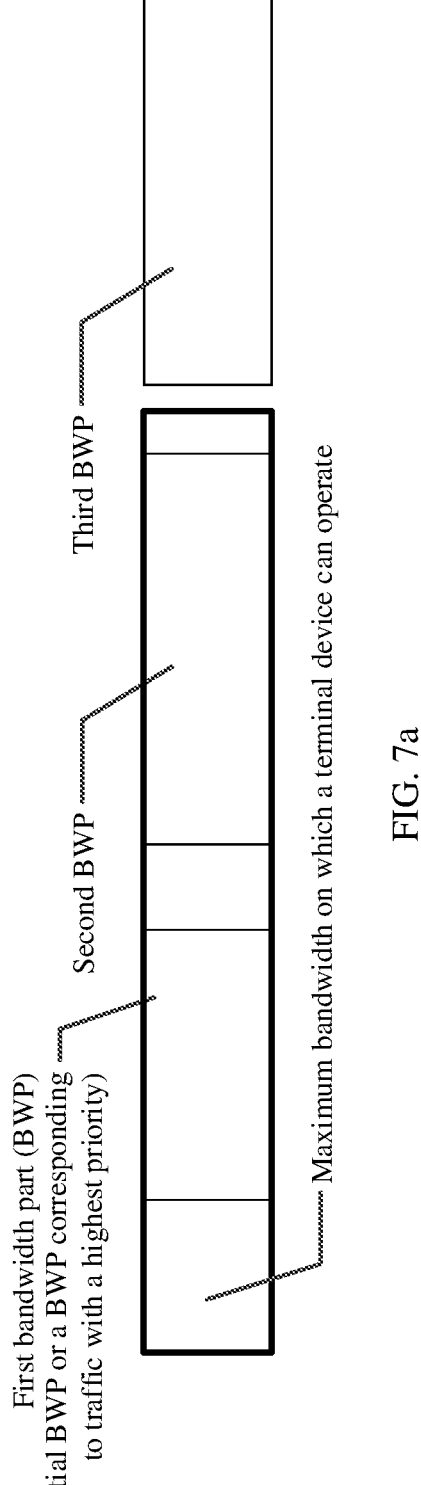
FIG. 7a is a schematic diagram of another embodiment of a BWP determining method according to an embodiment of this application.

For example, as shown in FIG. 7a, the maximum bandwidth in which the terminal device can operate can include a maximum of two BWPs (namely, the first BWP and the second BWP), and the terminal device operates on the first BWP and the second BWP.

In another possible implementation, the initial BWP is used as a reference, and the terminal device determines, based on and a BWP that can be included in the maximum bandwidth in which the terminal device can operate, the BWP on which the terminal device operates.

Figure 7B:
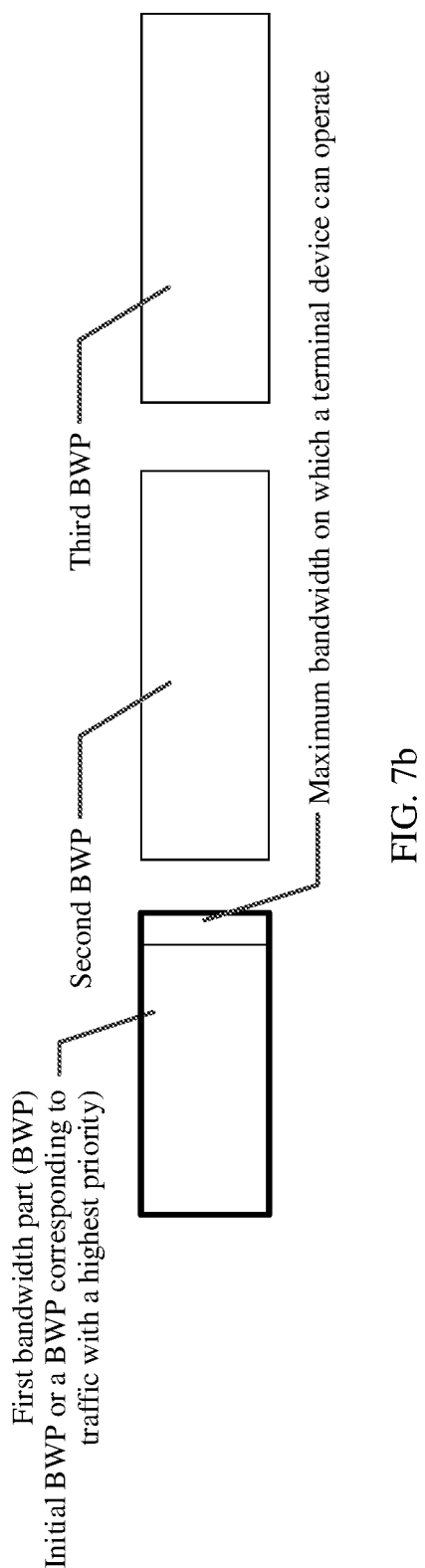
FIG. 7b is a schematic diagram of another embodiment of a BWP determining method according to an embodiment of this application.

For example, as shown in FIG. 7b, the initial BWP is used as a reference, the maximum bandwidth in which the terminal device can operate can include the first BWP, and the terminal device operates on the first BWP. The first BWP is the initial BWP.

Figure 7C:
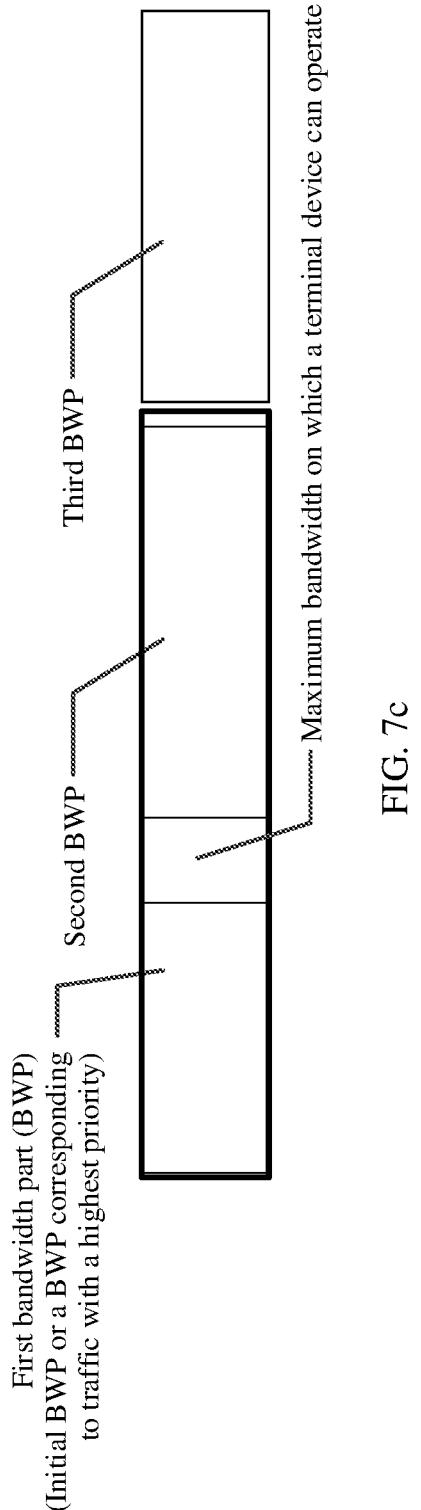
FIG. 7c is a schematic diagram of another embodiment of a BWP determining method according to an embodiment of this application.

For example, as shown in FIG. 7c, the initial BWP is used as a reference, the maximum bandwidth in which the terminal device can operate can include the first BWP and the second BWP, and the terminal device operates on the first BWP and the second BWP. The first BWP is the initial BWP.

This possible implementation may be applicable to the terminal device in an idle/inactive state.

In another possible implementation, a BWP corresponding to traffic with a highest priority is used as a reference, and the terminal device determines, based on the BWP that can be included in the maximum bandwidth in which the terminal device can operate, the BWP on which the terminal device operates.

For example, as shown in FIG. 7b, a BWP corresponding to traffic with a highest priority is used as a reference, the maximum bandwidth in which the terminal device can operate can include the first BWP, and the terminal device operates on the first BWP. The first BWP is the BWP corresponding to the traffic with the highest priority.

For example, as shown in FIG. 7c, a BWP corresponding to traffic with a highest priority is used as a reference, the maximum bandwidth in which the terminal device can operate can include the first BWP and the second BWP, and the terminal device operates on the first BWP and the second BWP. The first BWP is the BWP corresponding to the traffic with the highest priority.

This possible implementation may be applicable to the terminal device in a connected state.

In another possible design, 202a: The terminal device operates on the first BWP. Optionally, before this step, the method further includes: The terminal device determines, based on the first information, the second information, and the third information, that the terminal device does not operate on the three BWPs. Related content is similar to related content in step 202. Details are not described herein again.

An embodiment of this application provides a communication method. A terminal device obtains first information and second information. The terminal device determines, based on the first information and the second information, that the terminal device operates on a first BWP and a second BWP, or the terminal device determines, based on the first information and the second information, that the terminal device does not operate on the first BWP and the second BWP. In solutions provided in embodiments of this application, the terminal device may operate on two or more BWPs. This improves efficiency of communication between the terminal device and a network device. For example, the terminal device may operate on two or more BWPs (for example, a BWP corresponding to unicast and a BWP corresponding to groupcast, a BWP corresponding to first groupcast and a BWP corresponding to second groupcast, or an initial BWP and a BWP corresponding to groupcast), and may perform transmission in two or more transmission modes (for example, unicast and groupcast transmission, first groupcast and second groupcast transmission, or transmission and groupcast transmission on the initial BWP). For example, the terminal device may operate on a BWP corresponding to unicast and a BWP corresponding to groupcast. The terminal device may receive both unicast and groupcast, or the terminal device may send both unicast and groupcast. This avoids a case in which the terminal device can operate only on one BWP (or can perform transmission in only one transmission mode) and cannot receive data and/or control signals transmitted on another BWP (or cannot learn of a transmission status of the another BWP), and cannot receive data. This helps improve data transmission reliability. This also avoids a case in which the terminal device misses data receiving or increases a data receiving delay because the terminal device cannot learn of a transmission status of another BWP. This helps shorten a transmission delay. This avoids frequent switching between different BWPs by the terminal device to perform transmission in different transmission modes. This helps save energy of the terminal device. A condition for determining whether the terminal device can operate on two or more BWPs is defined, so that the terminal device and/or the network device can determine, based on the determining condition, whether the terminal device can operate on the two or more BWPs. In addition, when the terminal device cannot operate on two or more BWPs, a condition for determining a BWP or BWPs on which the terminal device operates is defined. This helps the terminal device and the network device align the BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability.

The BWP corresponding to groupcast may be different from an initial BWP/a BWP corresponding to unicast. In a conventional solution, UE in an idle/inactive state operates on an initial BWP, and UE in a connected state operates on an initial BWP and/or a BWP corresponding to unicast. The terminal device cannot receive groupcast, or the terminal device cannot receive data on the initial BWP and/or the BWP corresponding to unicast.

As shown in FIG. 8, an embodiment of the communication method in this embodiment of this application includes step 801, step 802, step 803, and step 804.

801: The terminal device determines a first communication moment and first duration.

Optionally, the first communication moment is associated with any one or more of the following: a paging, a paging message, system information, a PDCCH monitoring occasion, a paging occasion, a paging received by the terminal device, a paging message received by the terminal device, system information received by the terminal device, a PDCCH monitoring occasion of the terminal device, a paging occasion of the terminal device, a monitoring occasion of monitoring a PDCCH by the terminal device, and a paging monitoring occasion of the terminal device.

The PDCCH monitoring occasion includes any one or more of the following: a PDCCH monitoring occasion for a paging, a PDCCH monitoring occasion for system information, a PDCCH monitoring occasion for a SIB1, and a PDCCH monitoring occasion for an SI message.

The PDCCH monitoring occasion for the SI message may be understood as a PDCCH monitoring occasion for obtaining/receiving the SI message.

The terminal device may determine the first communication moment based on any one or more of the following: NAS signaling, an RRC message (for example, RRC dedicated signaling), an RLC message (for example, an RLC PDU), a MAC message (for example, a MAC CE), a PHY message (for example, DCI or a PDCCH, DCI for scheduling a paging message, or DCI for scheduling system information), a broadcast/groupcast message (for example, system information, a SIB 1, RRC broadcast/groupcast information, an MCCH message or a message similar to an MCCH message, and an SC-MCCH message or a message similar to an MCCH message), a preset algorithm (for example, a formula), and second duration.

"The terminal device receives" may be understood as: The terminal device needs to or may receive.

"The terminal device monitors" may be understood as: The terminal device needs to or may monitor.

For example, the first communication moment may be/include any one or more of the following: a start moment of a PDCCH monitoring occasion for a paging, a start moment of a PDCCH monitoring occasion for system information, a start moment of a PDCCH monitoring occasion for a SIB 1, a start moment of a PDCCH monitoring occasion for an SI message, a start moment of a resource for transmitting a paging message, a start moment of a resource for transmitting system information, and a start moment of a paging occasion.

For example, the first communication moment is the start moment of the PDCCH monitoring occasion for the paging, and the terminal device may determine the first communication moment based on a configuration in the SIB 1.

For example, the first communication moment is the start moment of the resource for transmitting the paging message, and the terminal device may determine the first communication moment based on the DCI for scheduling the paging message.

The terminal device may determine the first duration in the following manners:

(1) the terminal device receives information of the first duration from a network device, and/or (2) the terminal device determines the information of the first duration based on a preconfiguration, definition in a protocol, or information stored in the terminal device before delivery.

For example, if the information of the first duration is specified in a protocol or a standard, an apparatus vendor may store the information of the first duration in the terminal device before the terminal device is delivered from a factory, or the network device pre-configures the information of the first duration in the terminal device when the terminal device accesses a network, or the protocol or the standard specifies an algorithm for determining the first duration. The terminal device may determine the information of the first duration according to the algorithm. For example, the terminal device may determine the information of the first duration based on subcarrier spacing information and/or a capability of UE. In this way, the network device does not need to send the information of the first duration to the terminal device.

802: The terminal device determines a first moment based on the first communication moment and the first duration, and switches to a first BWP based on the first moment, or the terminal device switches to a first BWP based on the first communication moment and the first duration.

For example, a relationship among the first communication moment, the first duration, and the first moment is shown in FIG. 8*a*. The first communication moment minus the first moment equals to the first duration.

Optionally, that the terminal device switches to a first BWP based on the first moment includes any one or more of the following: The terminal device switches to the first BWP at the first moment or before the first moment; the terminal device switches to the first BWP before receiving/monitoring (or going to receive/monitor) a fourth message; and the terminal device switches to the first BWP when a condition related to the first moment is met.

Condition related to the first moment: The first moment or before the first moment.

That the terminal device switches to a first BWP based on the first communication moment and the first duration includes any one or more of the following: The terminal device switches to the first BWP the first duration before the first communication moment ends; and/or the terminal device switches to the first BWP before receiving/monitoring (or going to receive/monitor) the fourth message; and the terminal device switches to the first BWP when a condition related to the first communication moment and the first duration is met.

Condition related to the first communication moment and the first duration: The first duration before the first communication moment ends.

The first duration before the first communication moment ends may include: The first moment or before the first moment.

Optionally, that the terminal device switches to a first BWP includes: The terminal device switches to the first BWP when a fourth condition is met, or when a fourth condition and the condition related to the first moment are met, or when a fourth condition and the condition related to the first communication moment and the first duration are met.

For content related to the fourth condition, refer to the descriptions in the embodiment shown in FIG. 2. Details are not described herein again.

Optionally, this application further includes: The terminal device receives/monitors the fourth message at the first communication moment or after the first communication moment.

The fourth message includes any one or more of the following: DCI scrambled by a first RNTI, DCI scrambled by a second RNTI, a paging, a paging message, system information, a system information change notification, a public warning system (Public Warning System, PWS) notification, or a short message.

A PWS may include an earthquake and tsunami warning system (Earthquake and Tsunami Warning System, ETWS) and/or a public mobile warning service (Commercial Mobile Alert Service, CMAS).

The first RNTI is used for scheduling/used for any one or more of the following: a paging, a system information change notification, and a PWS notification.

For example, the first RNTI is a P-RNTI.

The second RNTI is used for scheduling/used to broadcast system information.

For example, the second RNTI is an SI-RNTI.

That the terminal device switches to a first BWP includes any one or more of the following:

(1) The terminal device operates on the first BWP. Alternatively, the terminal device communicates with the network device on the first BWP.

(2) The terminal device activates the first BWP.

(3) The terminal device deactivates the second BWP.

(4) The terminal device switches from the second BWP to the first BWP.

(5) The terminal device switches from the third BWP to the first BWP.

(6) The terminal device deactivates the third BWP.

(7) The terminal device receives data and/or control signals from a first network device on the first BWP, or the terminal device sends data and/or control signals to a first network device on the first BWP.

The third BWP is the BWP on which the terminal device operates.

803: The terminal device determines the second communication moment and the third duration.

Step 803 is optional.

Optionally, the second communication moment is associated with any one or more of the following: a paging, a paging message, system information, a PDCCH monitoring occasion, a paging occasion, a paging received by the terminal device, a paging message received by the terminal device, system information received by the terminal device, a PDCCH monitoring occasion of the terminal device, a paging occasion of the terminal device, a monitoring occasion of monitoring a PDCCH by the terminal device, and a paging monitoring occasion of the terminal device.

The terminal device may determine the second communication moment based on any one or more of the following: NAS signaling, an RRC message (for example, RRC dedicated signaling), an RLC message (for example, an RLC PDU), a MAC message (for example, a MAC CE), a PHY message (for example, DCI or a PDCCH, DCI for scheduling a paging message, or DCI for scheduling system information), a broadcast/groupcast message (for example, system information, a SIB 1, RRC broadcast/groupcast information, an MCCH message or a message similar to an MCCH message, and an SC-MCCH message or a message similar to an MCCH message), a preset algorithm (for example, a formula), the first communication moment, and the second duration.

For example, the second communication moment may be/include any one or more of the following: an end moment of the PDCCH monitoring occasion for the paging, an end moment of the PDCCH monitoring occasion for the system information, an end moment of the PDCCH monitoring occasion for the SIB1, an end moment of the PDCCH monitoring occasion for the SI message, an end moment of the resource for transmitting the paging message, an end moment of the resource for transmitting the system information, and an end moment of the paging occasion.

For example, the terminal device may determine the second communication moment based on the first communication moment and the second duration.

Optionally, this application further includes: The terminal device determines the second duration.

The terminal device may determine the second duration based on any one or more of the following: NAS signaling, an RRC message (for example, RRC dedicated signaling), an RLC message (for example, an RLC PDU), a MAC message (for example, a MAC CE), a PHY message (for example, DCI or a PDCCH, DCI for scheduling a paging message, or DCI for scheduling system information), a broadcast/groupcast message (for example, system information, a SIB 1, RRC broadcast/groupcast information, an MCCH message or a message similar to an MCCH message, and an SC-MCCH message or a message similar to an MCCH message), and a preset algorithm (for example, a formula).

For example, the second communication moment is the end moment of the PDCCH monitoring occasion for the paging, and the terminal device may determine the second communication moment based on a configuration in the SIB 1.

For example, the second communication moment is the end moment of the resource for transmitting the paging message, and the terminal device may determine the second communication moment based on the DCI for scheduling the paging message.

It may be understood that the terminal device receives/monitors the fourth message in the second duration starting from the first communication moment, or the terminal device receives/monitors the fourth message between the first communication moment and the second communication moment, or the terminal device receives/monitors the fourth message before the second communication moment.

Figure 8B:
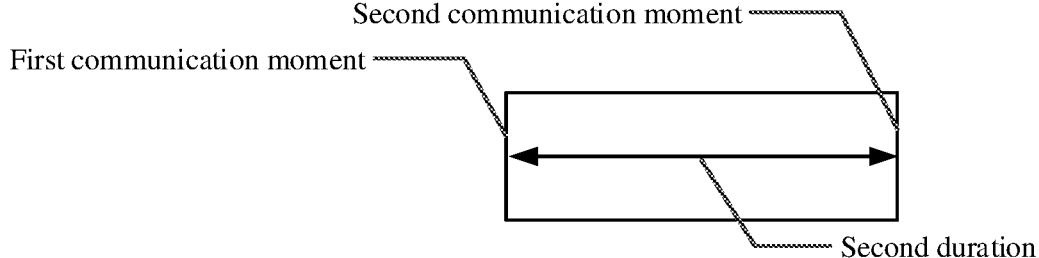
FIG. 8b is a schematic diagram of another embodiment of a communication method according to an embodiment of this application.

For example, a relationship among the first communication moment, the second duration, and the second communication moment is shown in FIG. 8b. The second communication moment minus the first communication moment equals to the second duration.

Optionally, this application further includes: The terminal device determines the third duration.

The terminal device may determine the third duration in the following manners:

(1) the terminal device receives information of the third duration from the network device, and/or (2) the terminal device determines the information based on a preconfiguration, definition in a protocol, or information stored in the terminal device before delivery.

For example, if the information of the third duration is specified in a protocol or a standard, an apparatus vendor may store the information of the third duration in the terminal device before the terminal device is delivered from a factory, or the network device pre-configures the information of the third duration in the terminal device when the terminal device accesses a network, or the protocol or the standard specifies an algorithm for determining the third duration. The terminal device may determine the information of the third duration according to the algorithm. For example, the terminal device may determine the information of the third duration based on subcarrier spacing information and/or a capability of UE. In this way, the network device does not need to send the information of the third duration to the terminal device.

Optionally, this application further includes: The terminal device determines the second moment.

For example, the terminal device determines the second moment based on the second communication moment and the third duration.

Figure 8C:
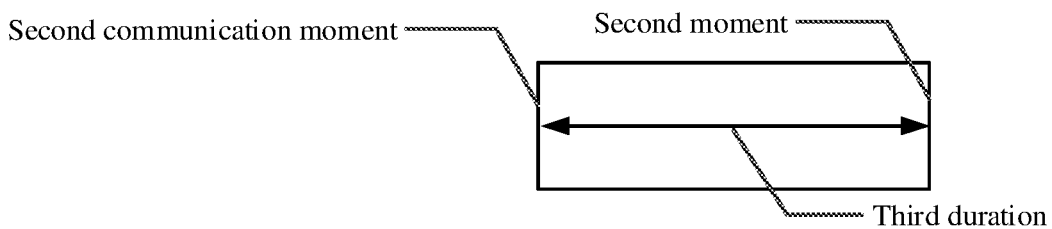
FIG. 8c is a schematic diagram of another embodiment of a communication method according to an embodiment of this application.

For example, a relationship among the second moment, the third duration, and the second communication moment is shown in FIG. 8c. The second moment minus the second communication moment equals to the third duration.

804: The terminal device switches to the second BWP based on the second moment, or the terminal device switches to the second BWP based on the second communication moment and the third duration.

Step 804 is optional.

Optionally, that the terminal device switches to the second BWP based on the second moment includes any one or more of the following: The terminal device switches to the second BWP at the second moment or after the second moment; the terminal device switches to the second BWP when a condition related to the second moment is met; and the terminal device switches to the second BWP after receiving the fourth message.

Condition related to the second moment: The second moment or after the second moment.

Optionally, that the terminal device based on the second communication moment and the third duration includes any one or more of the following: The terminal device switches to the second BWP after the third duration starting from the second communication moment; the terminal device switches to the second BWP when a condition related to the second communication moment and the third duration is met; and the terminal device switches to the second BWP after receiving the fourth message.

Condition related to the second communication moment and the third duration: After the third duration starting from the second communication moment.

After the third duration starting from the second communication moment may include: The second moment or after the second moment.

It may be understood that the terminal device switches to the second BWP after receiving/monitoring the fourth message.

For example, the terminal device may immediately switch to the second BWP after receiving/monitoring the fourth message, or may switch to the second BWP after receiving/monitoring the paging message/system information scheduled by the fourth message (for example, DCI scrambled by a P-RNTI/SI-RNTI), or may switch to the second BWP after another condition is met. This is not limited in this application. It should be noted that this example is also applicable to embodiments shown in FIG. 9, FIG. 10, and FIG. 11. To avoid repetition, details are not described again.

It should be noted that the first BWP and the second BWP may be downlink BWPs, or may be uplink BWPs.

In this application, the first BWP and the second BWP may be the second possible case. However, this application does not limit the first BWP and the second BWP to be only this case.

In a second possible case, the first BWP is an initial BWP, and the second BWP is a BWP corresponding to groupcast.

It may be understood that the initial BWP is an initial downlink BWP or an initial uplink BWP.

It may be understood that the BWP corresponding to groupcast may include any one or more of the following: an initial downlink BWP corresponding to groupcast, a down-link BWP corresponding to groupcast, an initial uplink BWP corresponding to groupcast, and an uplink BWP corresponding to groupcast.

For example, the terminal device switches to the initial BWP before the PDCCH monitoring occasion for the paging, and the terminal device monitors the PDCCH monitoring occasion for the paging on the initial BWP. If the terminal device does not receive the PDCCH/DCI scrambled by the P-RNTI, the terminal device may switch to the BWP corresponding to groupcast after the PDCCH monitoring occasion for the paging. It should be noted that this example is also applicable to the following embodiments shown in FIG. 9, FIG. 10, and FIG. 11. To avoid repetition, details are not described again.

For example, the terminal device switches to the initial BWP before the PDCCH monitoring occasion for the paging, and the terminal device monitors the PDCCH monitoring occasion for the paging on the initial BWP. The terminal device receives the PDCCH/DCI scrambled by the P-RNTI, and the PDCCH/DCI is used to schedule the paging message. The terminal device may continue to receive the paging message on the initial BWP. After receiving the paging message, the terminal device may switch to the BWP corresponding to groupcast. It should be noted that this example is also applicable to embodiments shown in FIG. 9, FIG. 10, and FIG. 11. To avoid repetition, details are not described again.

Optionally, that the terminal device switches to the second BWP includes: The terminal device switches to the second BWP when a sixth condition is met, or when a sixth condition and the condition related to the second moment are met, or when a sixth condition and the condition related to the second communication moment and the third duration are met.

For content related to the sixth condition, refer to the descriptions in the embodiment shown in FIG. 12. Details are not described herein again.

Optionally, this application further includes: The terminal device sends eighth information to the network device. For content related to the eighth information, refer to the embodiment in FIG. 2. Details are not described herein again.

That the terminal device switches to the second BWP includes any one or more of the following:

(1) The terminal device operates on the second BWP, or the terminal device communicates with the network device on the second BWP.

(2) The terminal device activates the second BWP.

(3) The terminal device deactivates the first BWP.

(4) The terminal device switches from the first BWP to the second BWP.

(5) The terminal device switches from the third BWP to the second BWP.

(6) The terminal device deactivates the third BWP.

(7) The terminal device receives data and/or control signals from the first network device on the second BWP, or the terminal device sends data and/or control signals to the first network device on the second BWP.

The third BWP is the BWP on which the terminal device operates.

It should be noted that the first duration may be 0, or may be a value greater than 0. This is not limited in this application.

It should be noted that the third duration may be 0, or may be a value greater than 0. This is not limited in this application.

The first duration is 0, and the first moment is the first communication moment. Step 801 may be replaced with: The terminal device determines a first communication moment. Step 802 may be replaced with: The terminal device switches to a first BWP based on the first communication moment. The first moment is replaced with the first communication moment, for understanding. Details are not described herein again.

The third duration is 0, and the second moment is the second communication moment. Step 803 may be replaced with: The terminal device determines the second communication moment. Step 804 may be replaced with: The terminal device switches to the first BWP based on the second communication moment. The second moment is replaced with the second communication moment, for understanding. Details are not described herein again.

Figure 8D:
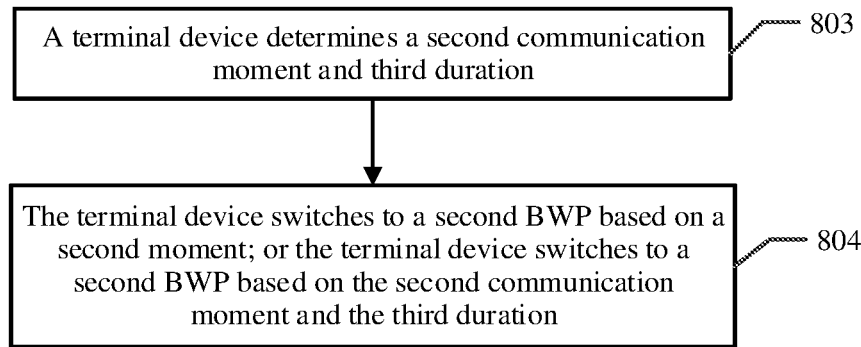
FIG. 8d is a schematic diagram of another embodiment of a communication method according to an embodiment of this application.

It should be noted that steps 803 and 804 may be used as separate embodiments. This is not limited in this application. For example, FIG. 8d shows another embodiment of this application.

An embodiment of this application provides a communication method. A terminal device determines a first communication moment and first duration; and the terminal device determines a first moment based on the first communication moment and the first duration, and switches to a first BWP based on the first moment; or the terminal device switches to a first BWP based on the first communication moment and the first duration. In the solution provided in this embodiment of this application, the terminal device may switch to the first BWP at the first moment or before the first moment, and the terminal device may receive/monitor a fourth message. This improves data transmission reliability. This helps the terminal device and a network device align a BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability. This avoids a case in which the network device sends a BWP switching indication to the terminal device, and also avoids a case in which the terminal device receives the BWP switching indication sent by the network device. This facilitates energy saving of the terminal device.

An embodiment of this application provides a communication method. A terminal device determines a second communication moment and third duration; and the terminal device switches to a second BWP based on a second moment; or the terminal device switches to a second BWP based on the second communication moment and the third duration. In the solution provided in this embodiment of this application, the terminal device may switch to the second BWP at the second moment or after the second moment, and the terminal device may receive data and/or control signals on the second BWP. This improves data transmission reliability. This helps the terminal device and a network device align a BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability. This avoids a case in which the network device sends a BWP switching indication to the terminal device, and also avoids a case in which the terminal device receives the BWP switching indication sent by the network device. This facilitates energy saving of the terminal device.

Figures 9, 9A:
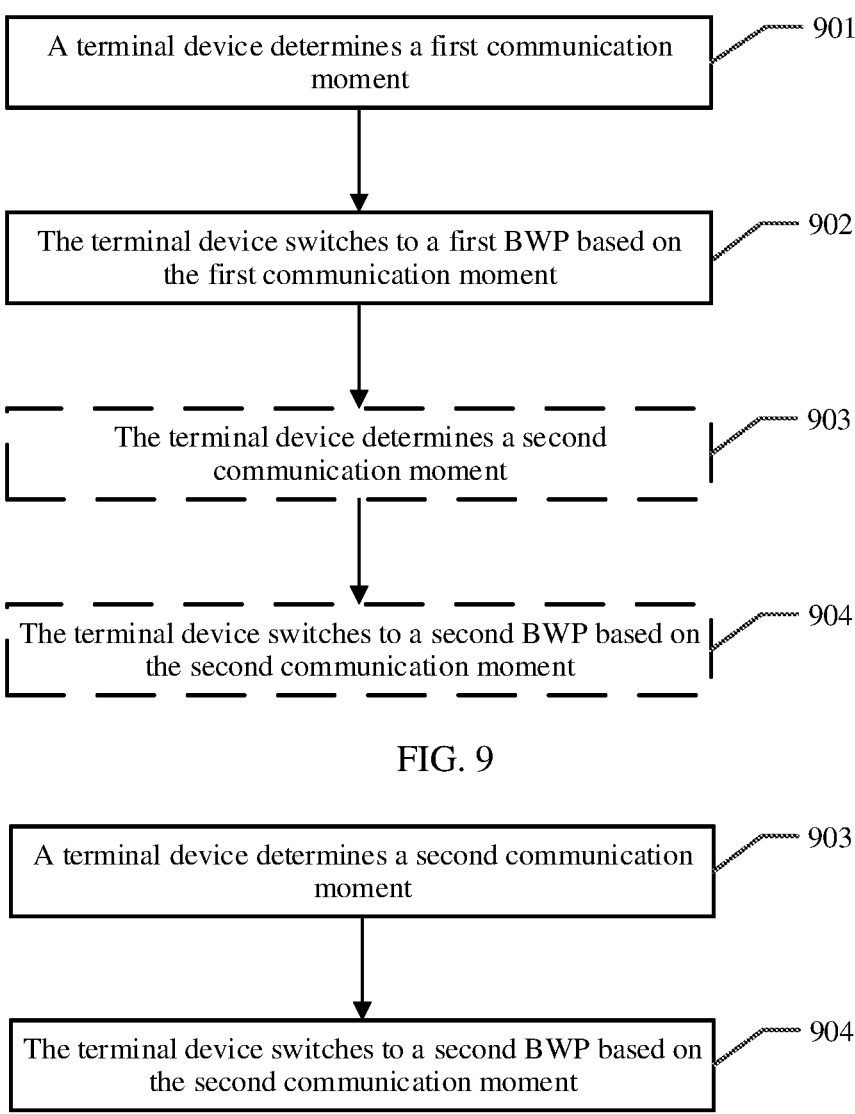
FIG. 9 is a schematic diagram of another embodiment of a communication method according to an embodiment of this application.
FIG. 9a is a schematic diagram of another embodiment of a communication method according to an embodiment of this application.

As shown in FIG. 9, an embodiment of the communication method in this embodiment of this application includes step 901, step 902, step 903, and step 904.

901: A terminal device determines a first communication moment.

For content related to the first communication moment, refer to the content in the embodiment in FIG. 8. Details are not described herein again.

902: The terminal device switches to a first BWP based on the first communication moment.

Optionally, that the terminal device switches to a first BWP based on the first communication moment includes any one or more of the following: The terminal device switches to the first BWP at the first communication moment or before the first communication moment; the terminal device switches to the first BWP before receiving/monitoring (or going to receive/monitor) a fourth message; and the terminal device switches to the first BWP when a condition related to the first communication moment is met.

Condition related to the first communication moment: The first communication moment or before the first communication moment.

Optionally, that the terminal device switches to a first BWP includes: The terminal device switches to the first BWP when a fourth condition is met, or when a fourth condition and the condition related to the first communication moment are met.

For content related to the fourth condition, refer to the descriptions in the embodiment shown in FIG. 2. Details are not described herein again.

Optionally, this application further includes: The terminal device receives/monitors the fourth message at the first communication moment or after the first communication moment.

For content related to the fourth message, refer to the content in the embodiment in FIG. 8. Details are not described herein again.

For content related to that the terminal device switches to a first BWP, refer to the content in the embodiment in FIG. 8. Details are not described herein again.

903: The terminal device determines a second communication moment.

Step 903 is optional.

For content related to the second communication moment, refer to the content in the embodiment in FIG. 8. Details are not described herein again.

904: The terminal device switches to a second BWP based on the second communication moment.

Step 904 is optional.

Optionally, that the terminal device switches to a second BWP based on the second communication moment includes any one or more of the following: The terminal device switches to the second BWP at the second communication moment or after the second communication moment; the terminal device switches to the second BWP when a condition related to the second communication moment is met; and the terminal device switches to the second BWP after receiving the fourth message.

Condition related to the second communication moment: The second communication moment or after the second communication moment.

Optionally, that the terminal device switches to a second BWP further includes: The terminal device switches to the second BWP when a sixth condition is met, or when a sixth condition and the condition related to the second communication moment are met.

For content related to the sixth condition, refer to the descriptions in the embodiment shown in FIG. 12. Details are not described herein again. For content related to "switching to a second BWP", refer to the content in the embodiment in FIG. 8. Details are not described herein again. For content related to that the terminal device switches to a second BWP, refer to the content in the embodiment in FIG. 8. Details are not described herein again.

Optionally, this application further includes: The terminal device sends eighth information to a network device. For content related to the eighth information, refer to the embodiment in FIG. 2. Details are not described herein again.

For content related to the first BWP and the second BWP, refer to the embodiment shown in FIG. 8. Details are not described herein again.

It should be noted that steps 903 and 904 may be used as separate embodiments. This is not limited in this application. For example, FIG. 9a shows another embodiment of this application.

For content related to FIG. 9, refer to FIG. 8. The "first moment" is replaced with the "first communication moment", and the "second moment" is replaced with the "second communication moment" for understanding. Details are not described herein again.

An embodiment of this application provides a communication method. A terminal device determines a first communication moment, and the terminal device switches to a first BWP based on the first communication moment. In the solution provided in this embodiment of this application, the terminal device may switch to the first BWP at the first communication moment or before the first communication moment, and the terminal device may receive/monitor a fourth message. This improves data transmission reliability. This helps the terminal device and the network device align a BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability. This avoids a case in which the network device sends a BWP switching indication to the terminal device, and also avoids a case in which the terminal device receives the BWP switching indication sent by the network device. This facilitates energy saving of the terminal device. An embodiment of this application provides a communication method. A terminal device determines a second communication moment, and the terminal device switches to a second BWP based on the second communication moment. In the solution provided in this embodiment of this application, the terminal device may switch to the second BWP at the second communication moment or after the second communication moment, and the terminal device may receive data and/or control signals on the second BWP. This improves data transmission reliability. This helps the terminal device and a network device align a BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability. This avoids a case in which the network device sends a BWP switching indication to the terminal device, and also avoids a case in which the terminal device receives the BWP switching indication sent by the network device. This facilitates energy saving of the terminal device.

Figure 10:
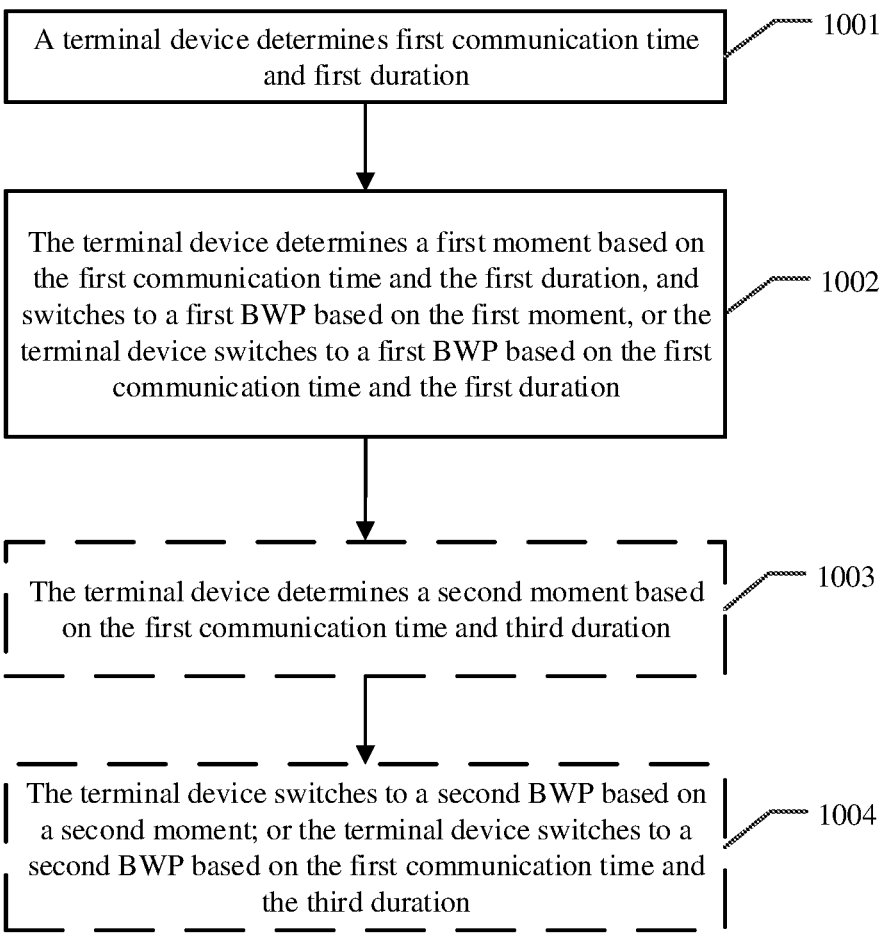
FIG. 10 is a schematic diagram of another embodiment of a communication method according to an embodiment of this application.

As shown in FIG. 10, an embodiment of the communication method in this embodiment of this application includes step 1001, step 1002, step 1003, and step 1004.

1001: A terminal device determines first communication time and first duration.

For content related to the first communication time, refer to the content in embodiments in FIG. 11 and/or FIG. 8. Details are not described herein again.

For content related to the first duration, refer to the content in the embodiment in FIG. 8. Details are not described herein again.

1002: The terminal device determines a first moment based on the first communication time and the first duration, and switches to a first BWP based on the first moment, or the terminal device switches to a first BWP based on the first communication time and the first duration.

Figure 10A:
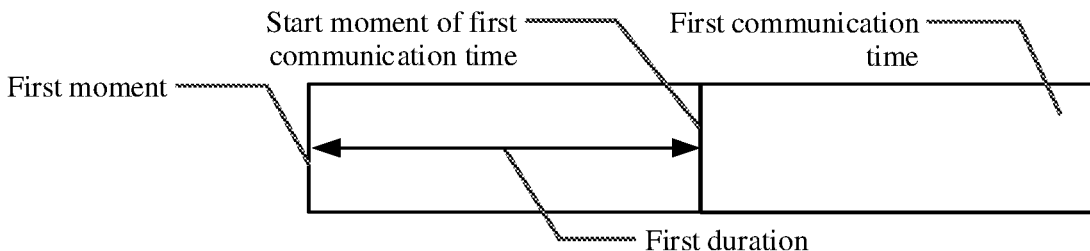
FIG. 10a is a schematic diagram of another embodiment of a communication method according to an embodiment of this application.

For example, a relationship among the first communication time, the first duration, and the first moment is shown in FIG. 10a. A start moment of the first communication time minus the first moment equals to the first duration.

Optionally, that the terminal device switches to a first BWP based on the first moment includes any one or more of the following: The terminal device switches to the first BWP at the first moment or before the first moment; the terminal device switches to the first BWP before receiving/monitoring (or going to receive/monitor) a fourth message; and the terminal device switches to the first BWP when a condition related to the first moment is met.

Condition related to the first moment: The first moment or before the first moment.

That the terminal device switches to a first BWP based on the first communication time and the first duration includes any one or more of the following: The terminal device switches to the first BWP the first duration before a start moment of the first communication time ends; and/or the terminal device switches to the first BWP before receiving/monitoring (or going to receive/monitor) the fourth message; and the terminal device switches to the first BWP when a condition related to the first communication time and the first duration is met.

Condition related to the first communication time and the first duration: The first duration before the start moment of the first communication time ends. The first duration before the start moment of the first communication time ends may include: The first moment or before the first moment.

Optionally, that the terminal device switches to a first BWP includes: The terminal device switches to the first BWP when a fourth condition is met, or when a fourth condition and the condition related to the first moment are met, or when a fourth condition and the condition related to the first communication time and the first duration are met.

For content related to the fourth condition, refer to the descriptions in the embodiment shown in FIG. 2. Details are not described herein again.

Optionally, this application further includes: The terminal device receives/monitors the fourth message at the first communication time.

For content related to the fourth message, refer to the content in the embodiment in FIG. 8. Details are not described herein again. For content related to that the terminal device switches to a first BWP, refer to the content in the embodiment in FIG. 8. Details are not described herein again.

1003: The terminal device determines a second moment based on the first communication time and third duration.

Step 1003 is optional.

For content related to the first communication time, refer to the content in embodiments in FIG. 11 and/or FIG. 8. Details are not described herein again.

For example, a relationship among the first communication time, the third duration, and the second moment is shown in FIG. 10*b*. The second moment minus the end moment of the first communication time equals to the third duration.

For content related to the third duration, refer to the content in the embodiment in FIG. 8. Details are not described herein again.

1004: The terminal device switches to a second BWP based on the second moment, or the terminal device switches to a second BWP based on the first communication time and the third duration.

Step 1004 is optional.

Optionally, that the terminal device switches to a second BWP based on the second moment includes any one or more of the following: The terminal device switches to the second BWP at the second moment or after the second moment; the terminal device switches to the second BWP when a condition related to the second moment is met; and the terminal device switches to the second BWP after receiving the fourth message.

Condition related to the second moment: The second moment or after the second moment.

Optionally, that the terminal device based on the first communication time and the third duration includes any one or more of the following: The terminal device switches to the second BWP after the third duration starting from the end moment of the first communication time; the terminal device switches to the second BWP when a condition related to the first communication time and the third duration is met; and the terminal device switches to the second BWP after receiving the fourth message.

Condition related to the first communication time and the third duration: After the third duration starting from the end moment of the first communication time. After the third duration starting from the end moment of the first communication time may include: The second moment or after the second moment.

It may be understood that the terminal device switches to the second BWP after receiving/monitoring the fourth message.

Optionally, that the terminal device switches to a second BWP includes: The terminal device switches to the second BWP when a sixth condition is met, or when a sixth condition and the condition related to the second moment are met, or when a sixth condition and the condition related to the first communication time and the third duration are met.

For content related to the sixth condition, refer to the descriptions in the embodiment shown in FIG. 12. Details are not described herein again. For content related to "switching to a second BWP", refer to the content in the embodiment in FIG. 8. Details are not described herein again. For content related to the first BWP and the second BWP, refer to the embodiment shown in FIG. 8. Details are not described herein again. For content related to that the terminal device switches to a second BWP, refer to the content in the embodiment in FIG. 8. Details are not described herein again.

Optionally, this application further includes: The terminal device sends eighth information to a network device. For content related to the eighth information, refer to the embodiment in FIG. 2. Details are not described herein again.

It should be noted that the first duration may be 0, or may be a value greater than 0. This is not limited in this application.

It should be noted that the third duration may be 0, or may be a value greater than 0. This is not limited in this application.

The first duration is 0, and the first moment is the start moment of the first communication time. Step 1001 may be replaced with: The terminal device determines first communication time. Step 1002 may be replaced with: The terminal device switches to a first BWP based on the first communication time. The first moment is replaced with the first communication time or the start moment of the first communication time, for understanding. Details are not described herein again.

The third duration is 0, and the second moment is the end moment of the first communication time. Step 1003 may be replaced with: The terminal device determines the first communication time. Step 1004 may be replaced with: The terminal device switches to the first BWP based on the first communication time. The second moment is replaced with the first communication time or the end moment of the first communication time, for understanding. Details are not described herein again.

It should be noted that steps 1003 and 1004 may be used as separate embodiments. This is not limited in this application. For example, FIG. 10*c* shows another embodiment of this application.

An embodiment of this application provides a communication method. A terminal device determines first communication time and first duration, and the terminal device determines a first moment based on the first communication time and the first duration, and switches to a first BWP based on the first moment, or the terminal device switches to a first BWP based on the first communication time and the first duration. In the solution provided in this embodiment of this application, the terminal device may switch to the first BWP at the first moment or before the first moment, and the terminal device may receive/monitor a fourth message. This improves data transmission reliability. This helps the terminal device and a network device align a BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability. This avoids a case in which the network device sends a BWP switching indication to the terminal device, and also avoids a case in which the terminal device receives the BWP switching indication sent by the network device. This facilitates energy saving of the terminal device. An embodiment of this application provides a communication method. A terminal device determines a second moment based on first communication time and third duration; and the terminal device switches to a second BWP based on the second moment; or the terminal device switches to the second BWP based on the first communication time and the third duration. In the solution provided in this embodiment of this application, the terminal device may switch to the second BWP at the second moment or after the second moment, and the terminal device may receive data and/or control signals on the second BWP. This improves data transmission reliability. This helps the terminal device and a network device align a BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability. This avoids a case in which the network device sends a BWP switching indication to the terminal device, and also avoids a case in which the terminal device receives the BWP switching indication sent by the network device. This facilitates energy saving of the terminal device.

As shown in FIG. 11, an embodiment of the communication method in this embodiment of this application includes step 1101, step 1102, step 1103, and step 1104.

1101: A terminal device determines first communication time.

That a terminal device determines first communication time includes any one or more of the following: The terminal device determines a start moment of the first communication time, the terminal device determines an end moment of the first communication time, and the terminal device determines duration of the first communication time.

Figure 11A:
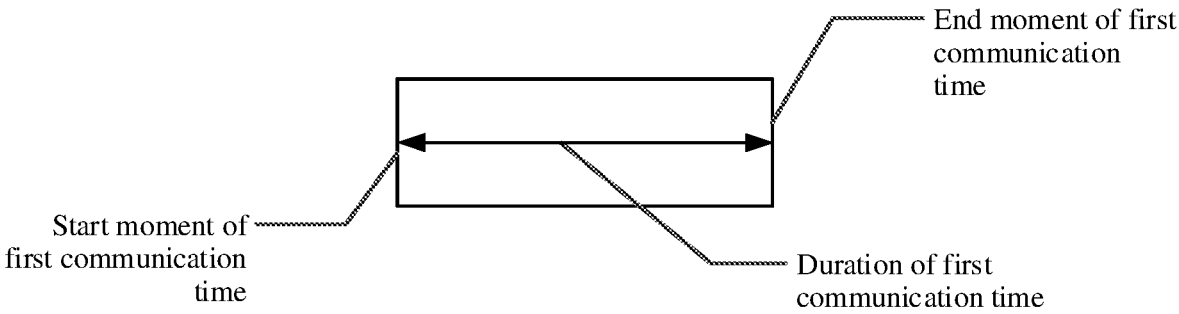
FIG. 11a is a schematic diagram of another embodiment of a communication method according to an embodiment of this application.

For example, a relationship among the start moment of the first communication time, the end moment of the first communication time, and the duration of the first communication time is shown in FIG. 11a. The end moment of the first communication time minus the start moment of the first communication time equals to the duration of the first communication time.

Optionally, the first communication time is associated with any one or more of the following: a paging, a paging message, system information, a PDCCH monitoring occasion, a paging occasion, a paging received by the terminal device, a paging message received by the terminal device, system information received by the terminal device, a PDCCH monitoring occasion of the terminal device, a paging occasion of the terminal device, a monitoring occasion of monitoring a PDCCH by the terminal device, and a paging monitoring occasion of the terminal device.

For content related to the PDCCH monitoring occasion, refer to the descriptions in the embodiment shown in FIG. 8. Details are not described herein again.

The terminal device may determine the first communication time based on any one or more of the following: NAS signaling, an RRC message (for example, RRC dedicated signaling), an RLC message (for example, an RLC PDU), a MAC message (for example, a MAC CE), a PHY message (for example, DCI or a PDCCH, DCI for scheduling a paging message, or DCI for scheduling system information), a broadcast/groupcast message (for example, system information, a SIB1, RRC broadcast/groupcast information, an MCCH message or a message similar to an MCCH message, and an SC-MCCH message or a message similar to an MCCH message), a preset algorithm (for example, a formula), and second duration.

For example, the first communication time may be/include any one or more of the following: a PDCCH monitoring occasion for a paging, a PDCCH monitoring occasion for system information, a PDCCH monitoring occasion for a SIB 1, a PDCCH monitoring occasion for an SI message, a time domain location of a resource for transmitting a paging message, a time domain location of a resource for transmitting system information, and a paging occasion.

For example, the first communication time is the PDCCH monitoring occasion for the paging, and the terminal device may determine the first communication time based on a configuration in the SIB 1.

For example, the first communication time is the resource for transmitting the paging message, and the terminal device may determine the first communication time based on the DCI for scheduling the paging message.

1102: The terminal device switches to a first BWP based on the first communication time.

Optionally, that the terminal device switches to a first BWP based on the first communication time includes any one or more of the following: The terminal device switches to the first BWP at the first communication time (for example, the start moment of the first communication time), or before the first communication time (for example, the start moment of the first communication time), or before the first communication time; and/or the terminal device switches to the first BWP before receiving/monitoring (or going to receive/monitor) a fourth message; and the terminal device switches to the first BWP when a condition 1 related to the first communication time is met.

Condition 1 related to the first communication time: The first communication time (for example, the start moment of the first communication time), or before the first communication time (for example, the start moment of the first communication time), or before the first communication time.

Optionally, that the terminal device switches to a first BWP includes: The terminal device switches to the first BWP when a fourth condition is met, or when a fourth condition and the condition 1 related to the first communication time are met.

For content related to the fourth condition, refer to the descriptions in the embodiment shown in FIG. 2. Details are not described herein again.

Optionally, this application further includes: The terminal device receives/monitors the fourth message at the first communication time.

For content related to the fourth message, refer to the content in the embodiment in FIG. 8. Details are not described herein again. For content related to that the terminal device switches to a first BWP, refer to the content in the embodiment in FIG. 8. Details are not described herein again.

1103: The terminal device determines the first communication time.

That the terminal device determines the first communication time includes any one or more of the following: The terminal device determines the start moment of the first communication time, the terminal device determines the end moment of the first communication time, and the terminal device determines the duration of the first communication time.

Step 1103 is optional.

1104: The terminal device switches to a second BWP based on the first communication time.

Step 1104 is optional.

Optionally, that the terminal device switches to a second BWP based on the first communication time includes any one or more of the following: The terminal device switches to the second BWP at the first communication time (for example, the end moment of the first communication time), or after the first communication time (for example, the end moment of the first communication time), or after the first communication time; the terminal device switches to the second BWP when a condition 2 related to the first communication time is met; and the terminal device switches to the second BWP after receiving the fourth message.

Condition 2 related to the first communication time: The first communication time (for example, the end moment of the first communication time), or after the first communication time (for example, the end moment of the first communication time), or after the first communication time.

It may be understood that the terminal device switches to the second BWP after receiving/monitoring the fourth message.

Optionally, that the terminal device switches to a second BWP includes: The terminal device switches to the second BWP when a sixth condition is met, or when a sixth condition and the condition 2 related to the first communication time are met.

For content related to the sixth condition, refer to the descriptions in the embodiment shown in FIG. 12. Details are not described herein again. For content related to "switching to a second BWP", refer to the content in the embodiment in FIG. 8. Details are not described herein again. For content related to that the terminal device switches to a second BWP, refer to the content in the embodiment in FIG. 8. Details are not described herein again.

For content related to the first BWP and the second BWP, refer to the embodiment shown in FIG. 8. Details are not described herein again.

Optionally, this application further includes: The terminal device sends eighth information to a network device. For content related to the eighth information, refer to the embodiment in FIG. 2. Details are not described herein again.

It should be noted that the first communication time may be understood as a time period (for example, first communication duration). For example, the first communication time is n symbols, slots, subframes, or frames, where n may be a positive integer.

Figure 11B:
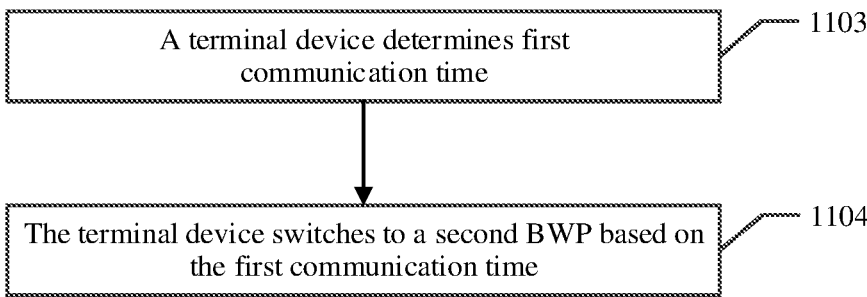
FIG. 11b is a schematic diagram of another embodiment of a communication method

It should be noted that steps 1101 and 1104 may be used as separate embodiments, or steps 1103 and 1104 may be used as separate embodiments. This is not limited in this application. For example, FIG. 11b shows another embodiment of this application.

It may be understood that the start moment of the first communication time, the end moment of the first communication time, and the duration of the first communication time in embodiments in FIG. 11 and FIG. 10 may be respectively understood as the first communication moment, the second communication moment, and the second duration in embodiments in FIG. 8 and FIG. 9. Any two or more of embodiments shown in FIG. 8, FIG. 9, FIG. 11, and FIG. 10 may be combined with each other, and related descriptions are also universal.

An embodiment of this application provides a communication method. A terminal device determines first communication time, and the terminal device switches to a first BWP based on the first communication time. In the solution provided in this embodiment of this application, the terminal device may switch to the first BWP at the first communication time or before the first communication time, and the terminal device may receive/monitor a fourth message. This improves data transmission reliability. This helps the terminal device and a network device align a BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability. This avoids a case in which the network device sends a BWP switching indication to the terminal device, and also avoids a case in which the terminal device receives the BWP switching indication sent by the network device. This facilitates energy saving of the terminal device. An embodiment of this application provides a communication method. A terminal device determines first communication time, and the terminal device switches to a second BWP based on the first communication time. In the solution provided in this embodiment of this application, the terminal device may switch to the second BWP at the first communication time or after the first communication time, and the terminal device may receive data and/or control signals on the second BWP. This improves data transmission reliability. This helps the terminal device and a network device align a BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability. This avoids a case in which the network device sends a BWP switching indication to the terminal device, and also avoids a case in which the terminal device receives the BWP switching indication sent by the network device. This facilitates energy saving of the terminal device.

A BWP corresponding to groupcast may be different from an initial BWP/a BWP corresponding to unicast. The BWP corresponding to groupcast may be configured at a cell granularity, instead of being separately configured for each terminal device. The terminal device may not operate on the BWP corresponding to groupcast.

As shown in FIG. 12, an embodiment of the communication method in this embodiment of this application includes step 1201 and step 1202.

1201: A terminal device obtains second information, or first information and second information In this embodiment of this application, the first information indicates information about a first BWP. The second information indicates information about a second BWP. For content related to the first information and the second information, refer to content in the embodiment shown in FIG. 2. Details are not described herein again.

1202: The terminal device determines, based on the second information, that the terminal device switches to the second BWP; or the terminal device determines, based on the first information and the second information, that the terminal device switches to the second BWP "The terminal device determines, based on the second information, that the terminal device switches to the second BWP" may include: The terminal device switches to the second BWP when a sixth condition is met.

Optionally, the terminal device is in an idle state, an inactive state, or a connected state.

That the terminal device switches to the second BWP may include any one or more of the following:

(1) The terminal device activates the second BWP.

(2) The terminal device deactivates the first BWP.

(3) The terminal device communicates with a network device on the second BWP.

For example, the terminal device receives data from the network device on the second BWP, or the terminal device sends data to the network device on the second BWP.

(4) The terminal device switches from the first BWP to the second BWP.

It should be noted that the second BWP may be a downlink BWP, or may be an uplink BWP.

The sixth condition includes a sixth condition related to the second information, or a sixth condition related to the second information and a sixth preset condition.

The sixth condition related to the second information may include any one or more of the following:

Condition 1: A bandwidth of the second BWP is less than or equal to a channel bandwidth supported by the terminal device.

For content related to the channel bandwidth supported by the terminal device, refer to the content in the embodiment shown in FIG. 2. Details are not described herein again.

For example, the second BWP is a downlink BWP. A downlink channel bandwidth supported by the terminal device is 100 MHz, 80 MHz, 40 MHz, or 20 MHz. The bandwidth of the second BWP is 40 MHz. If the downlink channel bandwidth (for example, 40 MHz, 80 MHz, or 100 MHz) supported by the terminal device is greater than or equal to the bandwidth (40 MHz) of the second BWP, the terminal device switches to the second BWP.

Condition 2: The channel bandwidth supported by the terminal device is less than or equal to a carrier bandwidth.

For content related to the carrier bandwidth, refer to content in the embodiment shown in FIG. 2. Details are not described herein again.

For example, the second BWP is a downlink BWP. The downlink channel bandwidth supported by the terminal device is 100 MHz, 80 MHz, 40 MHz, or 20 MHz. The carrier bandwidth is 90 MHz. If the downlink channel bandwidth (for example, 20 MHz, 40 MHz, or 80 MHz) supported by the terminal device is less than or equal to the carrier bandwidth (90 MHz), the terminal device switches to the second BWP.

Optionally, when the condition 1 and the condition 2 are met, the terminal device switches to the second BWP.

For example, the second BWP is a downlink BWP. The downlink channel bandwidth supported by the terminal device is 100 MHz, 80 MHz, 40 MHz, or 20 MHz. The carrier bandwidth is 90 MHz. The bandwidth of the second BWP is 40 MHz. If the downlink channel bandwidth (for example, 40 MHz or 80 MHz) supported by the terminal device is greater than or equal to the bandwidth (40 MHz) of the second BWP, and is less than or equal to the carrier bandwidth (90 MHz), the terminal device switches to the second BWP.

For example, the second BWP is a downlink BWP. The downlink channel bandwidth supported by the terminal device is 100 MHz, 80 MHz, 40 MHz, or 20 MHz. The carrier bandwidth is 90 MHz. The bandwidth of the second BWP is 90 MHz. If the downlink channel bandwidth supported by the terminal device cannot be greater than or equal to the bandwidth (90 MHz) of the second BWP and less than or equal to the carrier bandwidth (90 MHz), the terminal device does not switch to the second BWP.

In this embodiment of this application, the terminal device determines, in no time sequence, whether the condition 1 is met and whether the condition 2 is met. The terminal device may first determine whether the condition 1 is met, or may first determine whether the condition 2 is met, or may simultaneously determine both conditions. This is not specifically limited herein.

The sixth preset condition may include any one or more of the following:

Condition 3: The terminal device receives first control information from the network device, where the first control information includes fifth information, and the fifth information indicates the second BWP.

Optionally, the second BWP is a BWP corresponding to groupcast.

Optionally, "the first control information includes fifth information, and the fifth information indicates the second BWP" may be understood as: The first control information indicates BWP switching.

Optionally, the first control information may be first DCI. Optionally, the terminal device receives the first DCI on the first BWP.

It should be noted that the fifth information may implicitly or explicitly indicate the second BWP. This is not limited in this application.

It should be noted that the first control information may implicitly or explicitly indicate BWP switching. This is not limited in this application.

Condition 4: The terminal device is interested in groupcast.

That the terminal device is interested in groupcast includes any one or more of the following: The terminal device is receiving groupcast; the terminal device is interested in receiving groupcast; and the terminal device sets up a bearer corresponding to groupcast.

The second BWP is associated with groupcast. For example, the groupcast is second groupcast.

Condition 5: The terminal device does not receive/monitor a fourth message, or after the terminal device receives/monitors a fourth message.

For related descriptions of the fourth message, refer to content in embodiments shown in FIG. 8, FIG. 9, FIG. 10, and FIG. 11. Details are not described herein again.

That the terminal device does not receive/monitor a fourth message or after the terminal device receives/monitors a fourth message may include any one or more of the following:

(1) The terminal device does not receive/monitor the fourth message on the first BWP, or after the terminal device receives/monitors the fourth message on the first BWP.

(2) Not in first communication time. For example, current time is not in the first communication time.

(3) Not in first duration and the first communication time. For example, the current time is not in the first duration and the first communication time.

(4) Not in the first communication time and third duration. For example, the current time is not in the first communication time and the third duration.

(5) Not in the first duration, the first communication time, and the third duration. For example, the current time is not in the first duration, the first communication time, and the third duration.

(6) Condition related to a second communication moment: The second communication moment or after the second communication moment. For example, the current time is the second communication moment or after the second communication moment.

(7) Condition related to a second moment: The second moment or after the second moment. For example, the current time is the second moment or after the second moment.

(8) Condition related to the second communication moment and the third duration: After the third duration starting from the second communication moment. For example, the current time is after the third duration starting from the second communication moment.

(9) Condition related to the first communication time and the third duration: after the third duration starting from an end moment of the first communication time. For example, the current time is after the third duration starting from the end moment of the first communication time.

(10) Condition 2 related to the first communication time: The first communication time (for example, the end moment of the first communication time), or after the first communication time (for example, the end moment of the first communication time), or after the first communication time. For example, the current time is the first communication time (for example, the end moment of the first communication time), or after the first communication time (for example, the end moment of the first communication time), or after the first communication time.

For content related to the first communication time, the first duration, the third duration, the second communication moment, the second moment, and/or the condition 5, refer to content in embodiments shown in FIG. 8, FIG. 9, FIG. 10, and FIG. 11. Details are not described herein again.

Condition 6: The terminal device does not perform random access, or the terminal device successfully performs random access.

The terminal device does not perform random access on the first BWP, or the terminal device successfully performs random access on the first BWP.

Condition 7: A priority of traffic related to the first BWP is lower than a priority of traffic related to the second BWP.

The condition 7 may include any one or more of the following:

(1) A priority of a paging is lower than a priority of groupcast.

The traffic related to the first BWP may be the paging, and the traffic related to the second BWP is groupcast.

(2) A priority of system information is lower than the priority of groupcast.

The traffic related to the first BWP may be the system information, and the traffic related to the second BWP is groupcast.

(3) A priority of random access is lower than the priority of groupcast.

The traffic related to the first BWP may be the random access, and the traffic related to the second BWP is groupcast.

(4) A priority of first groupcast is lower than a priority of the second groupcast.

The traffic related to the first BWP may be the first groupcast, and the traffic related to the second BWP is the second groupcast.

(5) A priority of unicast is lower than the priority of groupcast.

The traffic related to the first BWP may be unicast, and the traffic related to the second BWP is groupcast.

That a priority of the traffic related to the first BWP is lower than a priority of the traffic related to the second BWP may be configured by the network device, preconfigured, or defined in a protocol. This is not limited in this application.

It should be noted that the priority of the traffic may include a priority of receiving traffic, for example, a paging receiving priority, a system information receiving priority, a unicast receiving priority, and a groupcast receiving priority.

For example, the terminal device operates on the first BWP. The first BWP is a BWP corresponding to unicast. The first communication apparatus is interested in groupcast. Groupcast corresponds to the second BWP. The channel bandwidth supported by the terminal device is greater than or equal to the bandwidth of the second BWP and less than or equal to the carrier bandwidth. The priority of unicast is lower than the priority of groupcast. The terminal device switches to the second BWP.

"The terminal device determines, based on the first information and the second information, that the terminal device switches to the second BWP" further includes: When a first condition related to the first information and the second information is met, the terminal device switches to the second BWP.

"The first condition related to the first information and the second information" may be referred to as a first condition.

Optionally, this application further includes: When a first preset condition is met or a first condition and a first preset condition are met, the terminal device switches to the second BWP.

For content related to the first condition and the first preset condition, refer to the embodiment in FIG. 2. Details are not described herein again. "The terminal device operates on the first BWP and the second BWP" is replaced with "the terminal device switches to the second BWP" for understanding.

For content related to that the terminal device switches to a second BWP, refer to the content in the embodiment in FIG. 8. Details are not described herein again.

Optionally, this application further includes: The terminal device may send a fifth message to the network device, where the fifth message indicates that the terminal device switches to or is going to switch to the second BWP, or the terminal device activates or is going to activate the second BWP, or the terminal device operates or is going to operate on the second BWP.

For example, before, when, or after the terminal device switches to the second BWP, the terminal device may send the fifth message to the network device.

Optionally, before step 1202, the method further includes step 1202a: The terminal device operates on the first BWP.

That the terminal device operates on the first BWP may include any one or more of the following:

(1) The terminal device activates the first BWP.

(2) The terminal device communicates with the network device on the first BWP.

For example, the terminal device receives data from the network device on the first BWP, or the terminal device sends data to the network device on the first BWP.

It should be noted that a time sequence relationship between step 1201 and step 1202a is not limited in this application.

Optionally, this application further includes: The terminal device sends eighth information to the network device. For content related to the eighth information, refer to the embodiment in FIG. 2. Details are not described herein again.

For content related to the first BWP and the second BWP, refer to the content in embodiments in FIG. 2 and/or FIG. 8. Details are not described herein again.

It may be understood that the technical solutions provided in this application may be further applicable to a scenario with a plurality of BWPs (for example, three BWPs), and "the first BWP and the second BWP" may be replaced with "a plurality of BWPs" for understanding. The terminal device obtains information of the plurality of BWPs, and determines, based on the information of the plurality of BWPs, that the terminal device switches to the second BWP. For example, the plurality of BWPs may include any one or more of the following: an initial BWP, a BWP corresponding to unicast, and a BWP corresponding to groupcast. The BWP corresponding to groupcast may be one or more BWPs.

An embodiment of this application provides a communication method. A terminal device obtains second information, or first information and second information; and the terminal device determines, based on the second information, that the terminal device switches to a second BWP; or the terminal device determines, based on the first information and the second information, that the terminal device switches to a second BWP. In the solution provided in this embodiment of this application, the terminal device may determine that the terminal device can receive groupcast, and switch to the second BWP. This avoids a case in which the terminal device cannot receive groupcast after switching to the second BWP, and also avoids a case in which the terminal device cannot receive groupcast after switching to the second BWP and misses data transmission on another BWP. This improves data transmission reliability. This also avoids a case in which the terminal device frequently switches a BWP (for example, the terminal device cannot receive groupcast after switching to the second BWP and then switches to another BWP). This facilitates energy saving of the terminal device, improves communication efficiency, and shortens a transmission delay. This helps the terminal device and a network device align a BWP on which the terminal device operates, so that the terminal device and the network device can communicate with each other on the BWP on which the terminal device operates. This avoids a case in which the network device communicates with the terminal device on a BWP on which the terminal device does not operate, and avoids a case in which the terminal device cannot receive data and/or control signals sent by the network device. This improves communication efficiency and data transmission reliability. This avoids a case in which the network device sends a BWP switching indication to the terminal device, and also avoids a case in which the terminal device receives the BWP switching indication sent by the network device. This facilitates energy saving of the terminal device.

Figures 13, 14, 15:
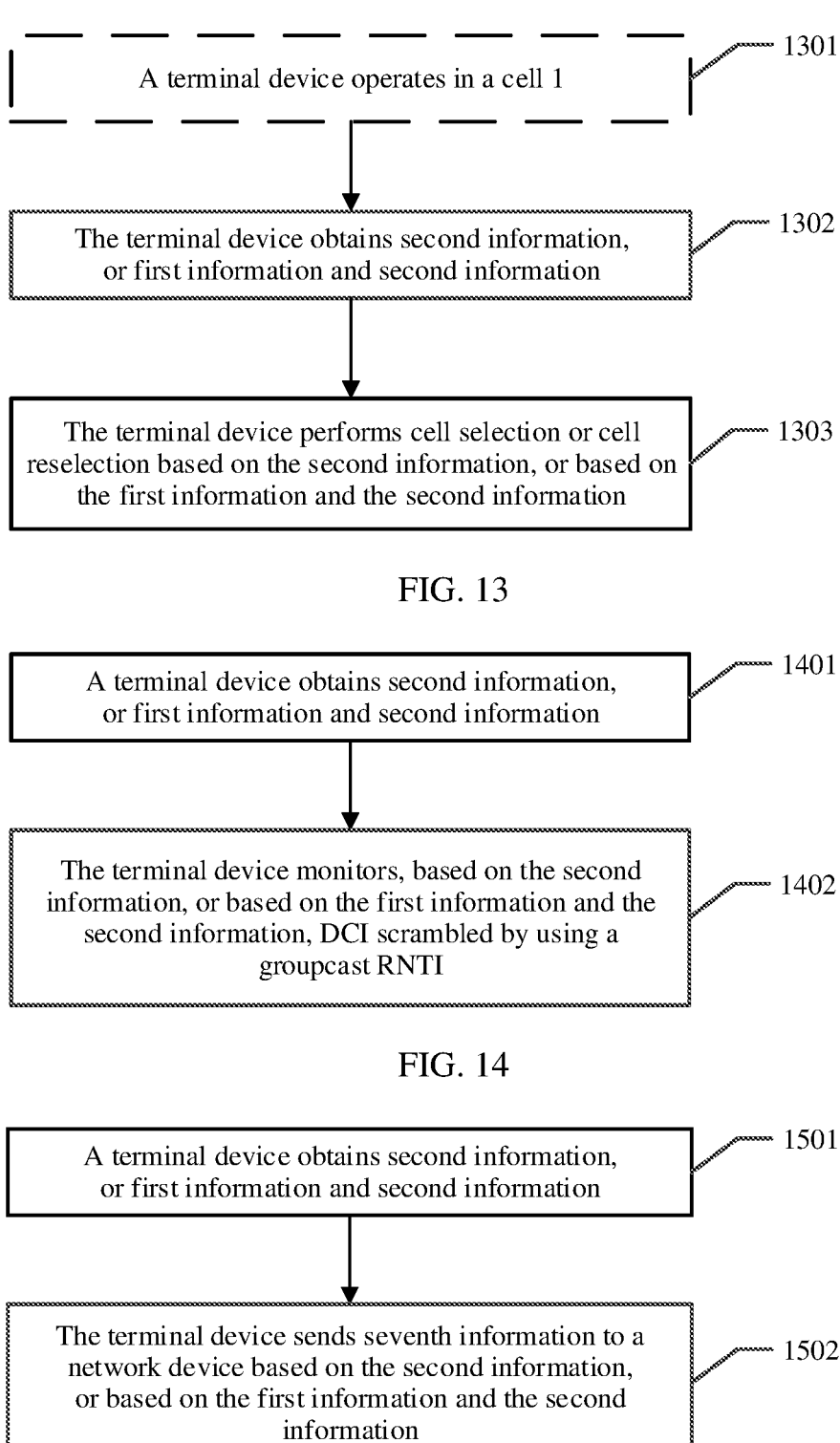
FIG. 13 is a schematic diagram of another embodiment of a communication method according to an embodiment of this application.
FIG. 14 is a schematic diagram of another embodiment of a communication method according to an embodiment of this application.
FIG. 15 is a schematic diagram of another embodiment of a communication method according to an embodiment of this application.

As shown in FIG. 13, an embodiment of the communication method in this embodiment of this application includes step 1301, step 1302, and step 1303.

1301: A terminal device operates in a cell 1.

Step 1301 is optional.

It may be understood that the cell 1 is a serving cell of the terminal device, a cell on which the terminal device camps, or a cell in which the terminal device is currently located. Optionally, the terminal device may operate on one or two or more BWPs before cell selection/reselection.

Optionally, the terminal device is in an idle state or an inactive state.

1302: The terminal device obtains second information, or first information and second information.

The first information indicates information about a first BWP. The second information indicates information about a second BWP.

The second BWP may be a BWP corresponding to second groupcast in a cell 2. The second groupcast is groupcast that the terminal device is receiving and/or is interested in receiving.

The first BWP may be a BWP corresponding to first groupcast in the cell 2 or an initial BWP in the cell 2. The first groupcast is groupcast that the terminal device is receiving and/or is interested in receiving.

It may be understood that the cell 2 is a neighbor cell or a neighboring cell.

For content related to the first information and the second information, refer to content in the embodiment shown in FIG. 2. Details are not described herein again.

In this embodiment of this application, a manner in which the terminal device obtains the first information may include any one or more of the following:

(1) The terminal device receives a first message sent by a network device, where the first message includes the first information.

(2) The terminal device determines the first information based on a preconfiguration, definition in a protocol, or information stored in the terminal device before delivery.

(3) The terminal device determines the first information based on a first correspondence.

In this embodiment of this application, a manner in which the terminal device obtains the second information may include any one or more of the following:

(1) The terminal device receives a second message sent by the network device, where the second message includes the second information.

(2) The terminal device determines the second information based on a preconfiguration, definition in a protocol, or information stored in the terminal device before delivery.

(3) The terminal device determines the second information based on the first correspondence.

The first correspondence includes a correspondence between a groupcast (for example, a groupcast identifier) in the cell 2 and a BWP (for example, an ID of the BWP). The groupcast identifier may include any one or more of the following: a groupcast RNTI; a temporary mobile group identity (for example, temporary mobile group identity, TMGI); and a session identifier (for example, a groupcast session identifier).

For example, all groupcasts correspond to one group of BWPs (for example, one or more BWPs). For another example, each groupcast corresponds to one group of BWPs (for example, one or more BWPs). For another example, a plurality of groupcasts correspond to one group of BWPs (for example, one or more BWPs).

For content related to the first message and the second message, refer to the content in the embodiment shown in FIG. 2. Details are not described herein again.

Optionally, this application further includes: The terminal device obtains the first correspondence.

In this embodiment of this application, a manner in which the terminal device obtains the first correspondence may include any one or more of the following:

(1) The terminal device receives a sixth message sent by the network device, where the sixth message includes the first correspondence.

For example, the sixth message may be any one or more of the following: an RRC message (for example, RRC dedicated signaling), an RLC message (for example, an RLC PDU), a MAC message (for example, a MAC CE), a PHY message (for example, DCI or a PDCCH), and a broadcast/groupcast message (for example, system information, a SIB1, a SIB2, a SIB3, a SIB4, a SIB5, RRC broadcast/groupcast information, an MCCH message, or a message similar to an MCCH message, an SC-MCCH message, or a message similar to an MCCH message).

(2) The terminal device determines the first correspondence based on a preconfiguration, definition in a protocol, or information stored in the terminal device before delivery.

For example, the terminal device receives the system information (for example, a SIB2, a SIB3, a SIB4, or a SIB5) in the cell 1, to obtain the correspondence between the groupcast in the cell 2 and the BWP.

It may be understood that the terminal device may further obtain a correspondence between groupcast of another neighboring cell (for example, the cell 3 or the cell 4) and a BWP.

1303: The terminal device performs cell selection or cell reselection based on the second information, or based on the first information and the second information.

That the terminal device performs cell selection or cell reselection based on the second information may include: When a sixth condition related to the second information is met, the cell 2 is a suitable cell (for example, a suitable cell), an acceptable cell (for example, an acceptable cell), a candidate cell, or a serving cell, or the terminal device selects the cell 2, or the terminal device reselects the cell 2, or the terminal device uses/considers the cell 2 as a suitable cell, an acceptable cell, a candidate cell, or a serving cell, or the terminal device camps on the cell 2.

For content related to the sixth condition related to the second information, refer to content in the embodiment shown in FIG. 12. Details are not described herein again.

For example, the neighboring cell meets the following conditions: A channel bandwidth supported by the terminal device is greater than or equal to a bandwidth of a BWP corresponding to groupcast that the terminal device is interested in, and the channel bandwidth supported by the terminal device is less than a carrier bandwidth; or an operating/determining/application bandwidth (for example, a first bandwidth and two or more BWPs) of the terminal device is greater than or equal to (or included in) a bandwidth of a BWP corresponding to groupcast that the terminal device is interested in, and is less than or equal to the carrier bandwidth (or included in the carrier bandwidth); and the terminal device may select/reselect the neighboring cell, or use the neighboring cell as a suitable cell, or camp on the cell.

For example, the terminal device is receiving groupcast 2 in the cell 1. The terminal device determines that a bandwidth of a BWP 2 corresponding to the groupcast 2 in the cell 2 is 40 MHz. A carrier bandwidth of the cell 2 is 80 MHz. A downlink channel bandwidth supported by the terminal device is 100 MHz, 80 MHz, 40 MHz, or 20 MHz.

The downlink channel bandwidth (for example, 40 MHz or 80 MHz) supported by the terminal device is greater than or equal to the bandwidth (40 MHz) of the BWP 2 corresponding to the groupcast 2 that the terminal device is receiving, and is less than or equal to the carrier bandwidth (80 MHz) of the cell 2. The terminal device may select/reselect the cell 2, or camp on the cell 2, or may use the cell 2 as a suitable cell.

That the terminal device performs cell selection or cell reselection based on the first information and the second information may include: When a first condition related to the first information and the second information is met, the cell 2 is a suitable cell, an acceptable cell, a candidate cell, or a serving cell, or the terminal device selects the cell 2, or the terminal device reselects the cell 2, or the terminal device uses/considers the cell 2 as a suitable cell, an acceptable cell, a candidate cell, or a serving cell, or the terminal device camps on the cell 2.

For content related to the first condition related to the first information and the second information, refer to content in the embodiment shown in FIG. 2. Details are not described herein again.

For example, the terminal device is receiving groupcast 2 in the cell 1. The terminal device determines that a bandwidth formed by the initial BWP and a BWP 2 corresponding to the groupcast 2 in the cell 2 is 40 MHz. A carrier bandwidth of the cell 2 is 80 MHz. A downlink channel bandwidth supported by the terminal device is 100 MHz, 80 MHz, 40 MHz, or 20 MHz. The downlink channel bandwidth (for example, 40 MHz or 80 MHz) supported by the terminal device is greater than or equal to the bandwidth (40 MHz) formed by the initial BWP and the BWP 2 corresponding to the groupcast 2 that the terminal device is receiving, and is less than or equal to the carrier bandwidth (80 MHz) of the cell 2. The terminal device may select/reselect the cell 2, or camp on the cell 2, or may use the cell 2 as a suitable cell.

In the foregoing steps, a sequence of the steps is not limited.

For content related to the first BWP and the second BWP, refer to the content in embodiments in FIG. 2 and/or FIG. 8. Details are not described herein again.

It may be understood that the technical solutions provided in this application may be further applicable to a scenario with a plurality of BWPs (for example, three BWPs), and "the first BWP and the second BWP" may be replaced with "a plurality of BWPs" for understanding. The terminal device obtains information of a plurality of BWPs, and performs cell selection or cell reselection based on the information of the plurality of BWPs. For example, the plurality of BWPs may include any one or more of the following: an initial BWP, a BWP corresponding to unicast, and a BWP corresponding to groupcast. The BWP corresponding to groupcast may be one or more BWPs.

An embodiment of this application provides a communication method. A terminal device operates in a cell 1, and the terminal device obtains second information, or first information and second information; and the terminal device performs cell selection or cell reselection based on the second information, or based on the first information and the second information. In the solution provided in this embodiment of this application, the terminal device may determine a cell in which groupcast can be received. This ensures reliability and continuity of data transmission. This avoids a case in which the terminal device cannot receive data after selecting a cell in which groupcast cannot be received. This ensures reliability and continuity of data transmission. This also avoids a case in which the terminal device performs cell selection or reselection after selecting a cell in which groupcast cannot be received and increases load of the terminal device. This helps shorten a communication delay, facilitates energy saving of the terminal device, helps reduce load of the terminal device, and improves communication efficiency.

As shown in FIG. 14, an embodiment of the communication method in this embodiment of this application includes step 1401 and step 1402.

1401: A terminal device obtains second information, or first information and second information.

The first information indicates information about a first BWP. The second information indicates information about a second BWP.

The second BWP may be a BWP corresponding to second groupcast. The second groupcast is groupcast that the terminal device is receiving and/or is interested in receiving.

The first BWP may be a BWP corresponding to first groupcast or an initial BWP. The first groupcast is groupcast that the terminal device is receiving and/or is interested in receiving.

For content related to the first information and the second information, refer to content in the embodiment shown in FIG. 2. Details are not described herein again.

1402: The terminal device monitors, based on the second information, or based on the first information and the second information, DCI scrambled by a groupcast RNTI.

The groupcast RNTI may be understood as an RNTI corresponding to the second groupcast, and the second groupcast corresponds to the second BWP.

That the terminal device monitors, based on the second information, DCI scrambled by a G-RNTI may include: The terminal device monitors the DCI scrambled by the groupcast RNTI when a sixth condition related to the second information is met.

Optionally, the terminal device is in an idle state, an inactive state, or a connected state.

For content related to the sixth condition related to the second information, refer to content in the embodiment shown in FIG. 12. Details are not described herein again.

For example, the following conditions are met: A channel bandwidth supported by the terminal device is greater than or equal to a bandwidth of a BWP corresponding to groupcast, and the channel bandwidth supported by the terminal device is less than a carrier bandwidth; or an operating/determining/application bandwidth (for example, a first bandwidth, two or more BWPs) of the terminal device is greater than or equal to (included in) a bandwidth of a BWP corresponding to groupcast, and is less than or equal to a carrier bandwidth (or included in the carrier bandwidth); and the terminal device monitors DCI scrambled by a groupcast RNTI corresponding to groupcast.

For example, if the downlink channel bandwidth supported by the terminal device is 100 MHz, 80 MHz, 40 MHz, or 20 MHz, a bandwidth of a BWP 2 corresponding to groupcast 2 is 40 MHz, the carrier bandwidth is 80 MHz, and the downlink channel bandwidth (for example, 40 MHz or 80 MHz) supported by the terminal device is greater than or equal to the bandwidth (40 MHz) of the BWP 2 corresponding to the groupcast 2 and is less than or equal to the carrier bandwidth (80 MHz), the terminal device monitors DCI scrambled by a groupcast RNTI corresponding to the groupcast 2.

That the terminal device monitors, based on the first information and the second information, DCI scrambled by a groupcast RNTI may include: The terminal device monitors the DCI scrambled by the groupcast RNTI when a first condition related to the first information and the second information is met.

For content related to the first condition related to the first information and the second information, refer to content in the embodiment shown in FIG. 2. Details are not described herein again.

For example, if the downlink channel bandwidth supported by the terminal device is 100 MHz, 80 MHz, 40 MHz, or 20 MHz, a bandwidth formed by the first BWP and the BWP 2 corresponding to the groupcast 2 is 40 MHz, the carrier bandwidth is 80 MHz, and the downlink channel bandwidth (for example, 40 MHz or 80 MHz) supported by the terminal device is greater than or equal to the bandwidth (40 MHz) formed by the first BWP and the BWP 2 corresponding to the groupcast 2, and is less than or equal to the carrier bandwidth (80 MHz), the terminal device monitors DCI scrambled by the groupcast RNTI corresponding to the groupcast 2.

In the foregoing steps, a sequence of the steps is not limited.

In this embodiment of this application, the bandwidth condition is used as a basis for the terminal device to retrieve the DCI.

For content related to the first BWP and the second BWP, refer to the content in embodiments in FIG. 2 and/or FIG. 8. Details are not described herein again.

It may be understood that the technical solutions provided in this application may be further applicable to a scenario with a plurality of BWPs (for example, three BWPs), and "the first BWP and the second BWP" may be replaced with "a plurality of BWPs" for understanding. The terminal device obtains information of a plurality of BWPs, and monitors, based on the information of the plurality of BWPs, DCI scrambled by the groupcast RNTI. For example, the plurality of BWPs may include any one or more of the following: an initial BWP, a BWP corresponding to unicast, and a BWP corresponding to groupcast. The BWP corresponding to groupcast may be one or more BWPs.

An embodiment of this application provides a communication method. A terminal device obtains second information, or first information and second information; and the terminal device monitors, based on the second information, or based on the first information and the second information, DCI scrambled by a groupcast RNTI. In the solution provided in this embodiment of this application, the terminal device may determine that the groupcast can be received, and monitor DCI scrambled by a groupcast RNTI corresponding to the groupcast. This avoids a case in which the terminal device monitors DCI scrambled by a groupcast RNTI corresponding to the groupcast but cannot receive the groupcast. This facilitates energy saving of the terminal device.

As shown in FIG. 15, an embodiment of the communication method in this embodiment of this application includes step 1501 and step 1502.

1501: A terminal device obtains second information, or first information and second information.

The first information indicates information about a first BWP. The second information indicates information about a second BWP.

The second BWP may be a BWP corresponding to second groupcast. The second groupcast is groupcast that the terminal device is receiving and/or is interested in receiving.

The first BWP may be a BWP corresponding to first groupcast or an initial BWP. The first groupcast is groupcast that the terminal device is receiving and/or is interested in receiving.

For content related to the first information and the second information, refer to content in the embodiment shown in FIG. 2. Details are not described herein again.

1502: The terminal device sends seventh information to a network device based on the second information, or based on the first information and the second information.

In this embodiment of this application, the seventh information indicates groupcast (for example, second groupcast).

Optionally, the terminal device is in a connected state.

Optionally, the seventh information may include a groupcast identifier. The groupcast identifier may include any one or more of the following: a groupcast RNTI, a TMGI, and a session identifier (for example, a groupcast session identifier).

The seventh information may be included in a seventh message.

In a possible implementation, the seventh message is used for any one or more of the following: indicating groupcast/groupcast traffic that the terminal device is receiving and/or is interested in receiving; and indicating groupcast/groupcast traffic that the terminal device is no longer receiving and/or is no longer interested in. For example, the seventh message is an interest indication (for example, MBMSInterestIndication).

In a possible implementation, the seventh message is used for any one or more of the following: responding to a counting request sent by the network device. For example, the seventh message is a counting response (for example, MBMSCountingResponse).

That the terminal device sends the seventh information to the network device based on the second information may include: The terminal device sends the seventh information to the network device when a sixth condition related to the second information is met.

For content related to the sixth condition related to the second information, refer to content in the embodiment shown in FIG. 12. Details are not described herein again.

For example, the following conditions are met: A downlink channel bandwidth supported by the terminal device is greater than or equal to a bandwidth of a BWP corresponding to groupcast, and is less than or equal to a carrier bandwidth; or an operating/determining/application bandwidth (for example, a first bandwidth or two or more BWPs) of the terminal device is greater than or equal to (included in) a bandwidth of a BWP corresponding to groupcast, and is less than or equal to a carrier bandwidth (or included in a carrier bandwidth); and the terminal device sends groupcast information (for example, a groupcast identifier) to the network device.

For example, if the downlink channel bandwidth supported by the terminal device is 100 MHz, 80 MHz, 40 MHz, or 20 MHz, a bandwidth of a BWP 2 corresponding to groupcast 2 is 40 MHz, a carrier bandwidth is 80 MHz, and the downlink channel bandwidth (for example, 40 MHz or 80 MHz) supported by the terminal device is greater than or equal to the bandwidth (40 MHz) of the BWP 2 corresponding to the groupcast 2 and is less than or equal to the carrier bandwidth (80 MHz), the terminal device sends information (for example, a groupcast identifier) of the groupcast 2 to the network device.

That the terminal device sends the seventh information to the network device based on the first information and the second information may include: The terminal device sends the seventh information to the network device when a first condition related to the first information and the second information is met.

For content related to the first condition related to the first information and the second information, refer to content in the embodiment shown in FIG. 2. Details are not described herein again.

For example, if the downlink channel bandwidth supported by the terminal device is 100 MHz, 80 MHz, 40 MHz, or 20 MHz, a bandwidth formed by the first BWP and the BWP 2 corresponding to the groupcast 2 is 40 MHz, the carrier bandwidth is 80 MHz, and the downlink channel bandwidth (for example, 40 MHz or 80 MHz) supported by the terminal device is greater than or equal to the bandwidth (40 MHz) formed by the first BWP and the BWP 2 corresponding to the groupcast 2, and is less than or equal to the carrier bandwidth (80 MHz), the terminal device sends the information (for example, the groupcast identifier) of the groupcast 2.

In the foregoing steps, a sequence of the steps is not limited.

For content related to the first BWP and the second BWP, refer to the content in embodiments in FIG. 2 and/or FIG. 8. Details are not described herein again.

It may be understood that the technical solutions provided in this application may be further applicable to a scenario with a plurality of BWPs (for example, three BWPs), and "the first BWP and the second BWP" may be replaced with "a plurality of BWPs" for understanding. The terminal device obtains the information of the plurality of BWPs, and sends the seventh information to the network device based on the information of the plurality of BWPs. For example, the plurality of BWPs may include any one or more of the following: an initial BWP, a BWP corresponding to unicast, and a BWP corresponding to groupcast. The BWP corresponding to groupcast may be one or more BWPs.

An embodiment of this application provides a communication method. A terminal device obtains second information, or first information and second information; and the terminal device sends seventh information to a network device based on the second information, or the first information and the second information. In the solution provided in this embodiment of this application, the terminal device may determine that groupcast can be received, and send groupcast information (for example, a groupcast identifier) to the network device. This avoids a case in which the terminal device sends groupcast information (for example, a groupcast identifier) to the network device but cannot receive the groupcast. This facilitates energy saving of the terminal device. This also helps the network device adjust a communication policy based on information reported by the terminal device, and helps improve communication efficiency. For example, if a large quantity of terminal devices that are interested in the groupcast 1 are sent to the network device, the network device may send data corresponding to the groupcast 1 in a groupcast manner; or if a small quantity of terminal devices that are interested in the groupcast 1 are sent to the network device, the network device may send data corresponding to the groupcast 1 in a unicast manner. This avoids a case in which the terminal device that cannot receive the groupcast sends the groupcast information to the network device and affects the communication policy of the network device.

Figure 16:
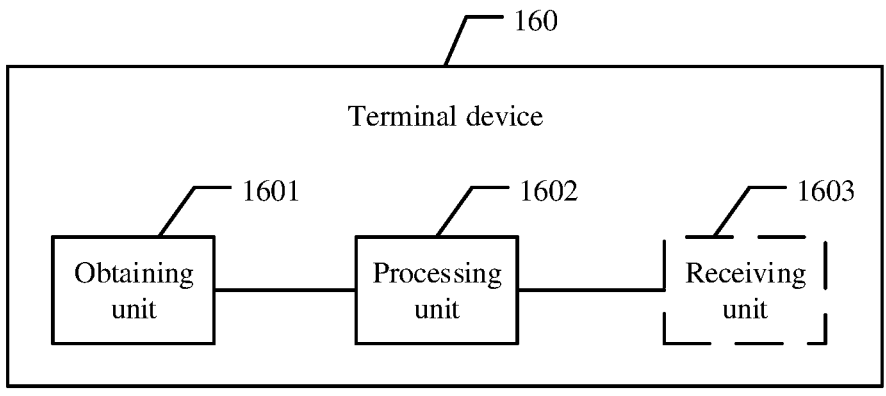
FIG. 16 is a schematic diagram of a structure of a terminal device according to an embodiment of this application.

The foregoing embodiment provides different implementations of the communication method. The following provides a terminal device 160. As shown in FIG. 16, the terminal device 160 is configured to perform the steps performed by the terminal device in the foregoing embodiments. For details about the execution steps and corresponding beneficial effects, refer to the foregoing corresponding embodiments for understanding. Details are not described herein again. The terminal device 160 includes:

an obtaining unit 1601, configured to obtain first information and second information, where the first information indicates information about a first bandwidth part BWP, and the second information indicates information about a second BWP; and a processing unit 1602, configured to determine, based on the first information and the second information, that the terminal device operates on the first BWP and the second BWP.

In a possible implementation, a bandwidth formed by an outer boundary of the first BWP and an outer boundary of the second BWP is less than or equal to a channel bandwidth supported by the terminal device.

In a possible implementation, the channel bandwidth supported by the terminal device is less than or equal to a carrier bandwidth.

In a possible implementation, a first subcarrier spacing SCS corresponding to the first BWP is the same as a second SCS corresponding to the second BWP.

In a possible implementation, the processing unit 1602 is configured to determine a first bandwidth, where the first bandwidth is greater than or equal to the bandwidth formed by the outer boundary of the first BWP and the outer boundary of the second BWP.

In a possible implementation, the first bandwidth is less than or equal to the carrier bandwidth.

In a possible implementation, the processing unit 1602 is configured to activate the first BWP and/or the second BWP.

In a possible implementation, the receiving unit 1603 is configured to receive, on the first BWP and the second BWP, data from a network device.

The foregoing embodiment provides different implementations of the communication method. The following provides a terminal device 160. As shown in FIG. 16, the terminal device 160 is configured to perform the steps performed by the terminal device in the foregoing embodiments. For details about the execution steps and corresponding beneficial effects, refer to the foregoing corresponding embodiments for understanding. Details are not described herein again. The terminal device 160 includes:

an obtaining unit 1601, configured to obtain first information and second information, where the first information indicates information about a first bandwidth part BWP, and the second information indicates information about a second BWP; and a processing unit 1602, configured to determine, based on the first information and the second information, that the terminal device operates on the first BWP and the second BWP.

In a possible implementation, a bandwidth formed by an outer boundary of the first BWP and an outer boundary of the second BWP is less than or equal to a channel bandwidth supported by the terminal device.

In a possible implementation, the channel bandwidth supported by the terminal device is less than or equal to a carrier bandwidth.

In a possible implementation, a first subcarrier spacing SCS corresponding to the first BWP is the same as a second SCS corresponding to the second BWP.

In a possible implementation, the processing unit 1602 is configured to determine a first bandwidth, where the first bandwidth is greater than or equal to the bandwidth formed by the outer boundary of the first BWP and the outer boundary of the second BWP.

In a possible implementation, the first bandwidth is less than or equal to the carrier bandwidth.

In a possible implementation, the processing unit 1602 is configured to activate the first BWP and/or the second BWP.

In a possible implementation, the receiving unit 1603 is configured to receive, on the first BWP and the second BWP, data from a network device.

The terminal device 160 includes the processing unit 1602 and a transceiver unit. The transceiver unit may include the obtaining unit 1601 and the receiving unit 1603. For example, when the terminal device 160 is the terminal device, the transceiver unit may be a transceiver. The transceiver may include an antenna, a radio frequency circuit, and the like. The processing unit 1602 may be a processor (or a processing circuit), for example, a baseband processor. The baseband processor may include one or more central processing units (central processing units, CPUs). When the terminal device 160 is the component that has the functions of the terminal device, the transceiver unit may be a radio frequency unit, and the processing unit 1602 may be a processor (or a processing circuit), for example, a baseband processor. When the terminal device 160 is a chip system, the transceiver unit may be an input/output interface of a chip (for example, a baseband chip), and the processing unit 1602 may be a processor (or a processing circuit) of the chip system, and may include one or more central processing units. It should be understood that the processing unit 1602 in this embodiment of this application may be implemented by a processor or a processor-related circuit component (or a processing circuit), and the transceiver unit may be implemented by a transceiver or a transceiver-related circuit component.

For example, the processing unit 1602 may be configured to perform all operations performed by the terminal device in the embodiment shown in FIG. 2 except a receiving and sending operation, for example, 201 and 202.

In addition, the transceiver unit may be one functional module. The functional module can implement both a sending operation and a receiving operation. For example, the transceiver unit may be configured to perform all sending operations and all receiving operations performed by the terminal device in any one of embodiments shown in FIG. 2 to FIG. 15. For example, when a sending operation is performed, it may be considered that the transceiver unit is a sending module, or when a receiving operation is performed, it may be considered that the transceiver unit is a receiving module. Alternatively, the transceiver unit may be two functional modules. The transceiver unit may be considered as a general term of the two functional modules. The two functional modules are the obtaining unit 1601 and the receiving unit 1603. The obtaining unit 1601 is configured to implement a sending operation. For example, the sending module may be configured to perform all sending operations performed by the terminal device in any one of embodiments shown in FIG. 2 to FIG. 15. The receiving module is configured to implement a receiving operation. For example, the receiving unit 1603 may be configured to perform all receiving operations performed by the terminal device in any one of embodiments shown in FIG. 2 to FIG. 15.

It should be noted that content such as information exchange between the modules of the terminal device 160 and the execution processes thereof is based on a same concept as the method embodiments of this application, and achieves same technical effects as the method embodiments of the present invention. For specific content, refer to the foregoing descriptions in the method embodiments of this application. Details are not described herein again.

Figure 17:
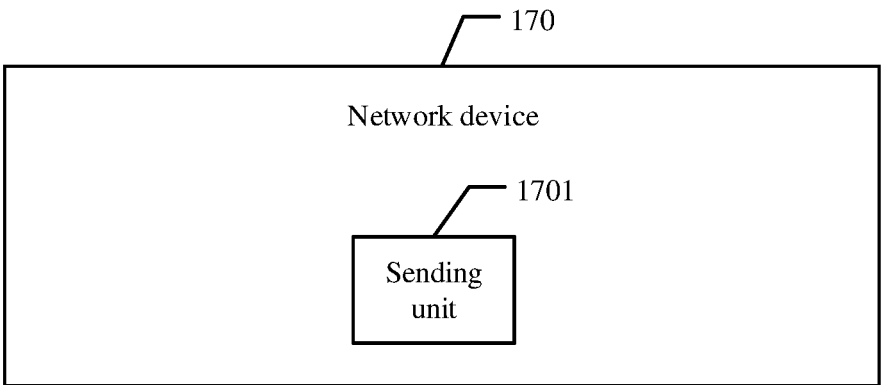
FIG. 17 is a schematic diagram of a structure of a network device according to an embodiment of this application.

The foregoing embodiment provides different implementations of the terminal device 160. The following provides a network device 170. As shown in FIG. 17, the network device is configured to perform the steps performed by the network device in the foregoing embodiments. For details about the execution steps and corresponding beneficial effects, refer to the foregoing corresponding embodiments for understanding. Details are not described herein again. The network device 170 includes:

a sending unit 1701, configured to send first information and second information to a terminal device, where the first information indicates information about a first bandwidth part BWP, and the second information indicates information about a second BWP.

The first information and the second information indicate the terminal device to determine, based on the first information and the second information, that the terminal device operates on the first BWP and the second BWP.

In a possible implementation, a bandwidth formed by an outer boundary of the first BWP and an outer boundary of the second BWP is less than or equal to a channel bandwidth supported by the terminal device.

In a possible implementation, the channel bandwidth supported by the terminal device is less than or equal to a carrier bandwidth.

In a possible implementation, a first subcarrier spacing SCS corresponding to the first BWP is the same as a second SCS corresponding to the second BWP.

It should be noted that content such as information exchange between the modules of the network device 170 and the execution processes thereof is based on a same concept as the method embodiments of this application, and achieves same technical effects as the method embodiments of the present invention. For specific content, refer to the foregoing descriptions in the method embodiments of this application. Details are not described herein again.

The network device 170 includes a processing unit and a transceiver unit. The transceiver unit may include a sending unit 1701 and a receiving unit. For example, the transceiver unit may be a transceiver. The transceiver may include an antenna, a radio frequency circuit, and the like. The processing unit may be a processor (or a processing circuit), for example, a baseband processor. The baseband processor may include one or more central processing units (central processing units, CPUs). When the network device 170 is the component that has the functions of the network device, the transceiver unit may be a radio frequency unit, and the processing unit may be a processor (or a processing circuit), for example, a baseband processor. When the network device 170 is a chip system, the transceiver unit may be an input/output interface of a chip (for example, a baseband chip), and the processing unit may be a processor (or a processing circuit) of the chip system, and may include one or more central processing units. It should be understood that the processing unit in this embodiment of this application may be implemented by a processor or a processor-related circuit component (or a processing circuit), and the transceiver unit may be implemented by a transceiver or a transceiver-related circuit component.

In addition, the transceiver unit may be one functional module. The functional module can implement both a sending operation and a receiving operation. For example, the transceiver unit may be configured to perform all sending operations and all receiving operations performed by the network device in any one of embodiments shown in FIG. 2 to FIG. 17. For example, when a sending operation is performed, it may be considered that the transceiver unit is a sending module, or when a receiving operation is performed, it may be considered that the transceiver unit is a receiving module. Alternatively, the transceiver unit may be two functional modules. The transceiver unit may be considered as a general term of the two functional modules. The two functional modules are the sending unit and the receiving unit. The sending unit 1701 is configured to implement a sending operation. For example, the sending module may be configured to perform all sending operations performed by the network device in any one of embodiments shown in FIG. 2 to FIG. 15. The receiving module is configured to implement a receiving operation. For example, the receiving unit may be configured to perform all receiving operations performed by the network device in any one of embodiments shown in FIG. 2 to FIG. 15.

Figure 18:
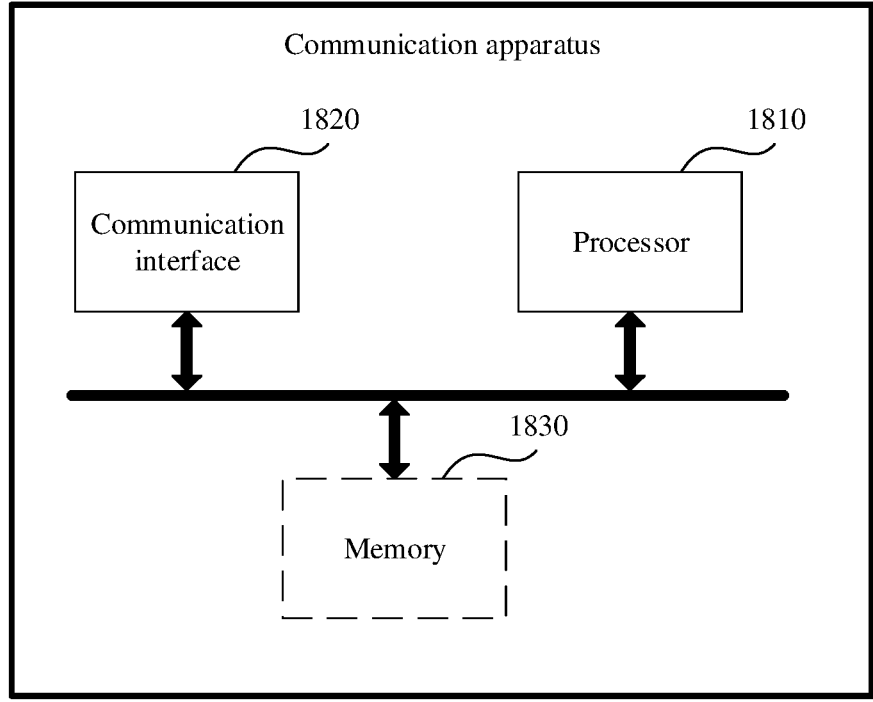
FIG. 18 is a schematic diagram of a structure of a communication apparatus according to an embodiment of this application.

FIG. 18 is a schematic diagram of still another communication apparatus according to an embodiment of this application. The communication apparatus is configured to implement operations of the network device and the terminal device in the foregoing embodiments. The communication apparatus includes a processor 1810 and a communication interface 1820. Optionally, the communication apparatus further includes a memory 1820. The interface 1830 is configured to communicate with another device.

The method performed by the network device or the terminal device in the foregoing embodiments may be implemented by the processor 1810 by invoking a program stored in a memory (which may be the memory 1820 in the network device or the terminal device, or may be an external memory). In other words, the apparatus used in the network device or the terminal device may include the processor 1810. The processor 1810 invokes a program in the memory to perform the method performed by the terminal device and the network device in the foregoing method embodiments. The processor herein may be an integrated circuit having a signal processing capability, for example, a CPU. The apparatus used in the terminal device and the network device may be implemented by one or more integrated circuits configured to implement the foregoing methods, for example, one or more ASICs, one or more microprocessors DSPs, one or more FPGAs, or a combination of at least two of the integrated circuit forms. Alternatively, the foregoing implementations may be combined.

For example, functions/implementation processes of the processing modules in FIG. 16 and FIG. 17 may be implemented by the processor 1810 in the communication apparatus 1800 shown in FIG. 18 by invoking computer executable instructions stored in the memory 1820, and functions/implementation processes of the transceiver units in FIG. 16 and FIG. 17 may be implemented by the interface 1830 in the communication apparatus 1800 shown in FIG. 18.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM, read-only memory), a random access memory (RAM, random access memory), a magnetic disk, or an optical disc.

The methods performed by the terminal device and the network device in the foregoing embodiments may be implemented by the processor 1810 by invoking a program stored in a memory (which may be the memory 1820 in the terminal device and the network device, or may be an external memory). In other words, the apparatus used for the terminal device and the network device may include the processor 1810. The processor 1810 invokes a program in the memory to perform the method performed by the terminal device and the network device in the foregoing method embodiments. The processor herein may be an integrated circuit having a signal processing capability, for example, a CPU. The apparatus used in the terminal device and the network device may be implemented by one or more integrated circuits configured to implement the foregoing methods, for example, one or more ASICs, one or more microprocessors DSPs, one or more FPGAs, or a combination of at least two of the integrated circuit forms. Alternatively, the foregoing implementations may be combined.

For example, functions/implementation processes of the processing units in FIG. 16 and FIG. 17 may be implemented by the processor 1810 in the communication apparatus 1800 shown in FIG. 18 by invoking computer executable instructions stored in the memory 1820, and functions/implementation processes of the transceiver units in FIG. 16 and FIG. 17 may be implemented by the interface 1830 in the communication apparatus 1800 shown in FIG. 18.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM, read-only memory), a random access memory (RAM, random access memory), a magnetic disk, or an optical disc.

It should be noted that descriptions in this application are applicable to all embodiments. To avoid repetition, details are not described in each embodiment. It should be understood that the "embodiment" mentioned throughout the specification means a particular feature, structure, or feature related to the embodiment, and the particular feature, structure, or feature may be combined in one or more embodiments in any proper manner. It should be understood that sequence numbers of the foregoing processes do not mean execution sequences in embodiments of the present invention. The execution sequences of the processes should be determined according to functions and internal logic of the processes, and should not be construed as any limitation on the implementation processes of embodiments of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM, read-only memory), a random access memory (RAM, random access memory), a magnetic disk, or an optical disc.

What is claimed is:

1. A method, comprising:
   obtaining first information and second information, wherein the first information indicates information about a first bandwidth part, and the second information indicates information about a second bandwidth part, wherein the first bandwidth part corresponds to unicast, the second bandwidth part corresponds to broadcast, and the first bandwidth part includes the second bandwidth part, the information about a first bandwidth part includes a first subcarrier spacing (SCS) corresponding to the first bandwidth part, the information about a second bandwidth part includes a second SCS corresponding to the second bandwidth part; and
   in a case that the first SCS corresponding to the first bandwidth part is the same as the second SCS corresponding to the second bandwidth part, monitoring downlink control information (DCI) scrambled by a broadcast radio network temporary identifier (RNTI).

2. The method according to claim 1, wherein the information about the second bandwidth part further comprises a bandwidth of the second bandwidth part, and/or a frequency domain location of the second bandwidth part.

3. The method according to claim 1, wherein the broadcast RNTI is for scheduling broadcast transmission dynamically.

4. The method according to claim 1, wherein the information about the first bandwidth part further comprises a bandwidth of the first bandwidth part, and/or a frequency domain location of the first bandwidth part.

5. The method according to claim 1, wherein the method further includes:
   receiving on the first bandwidth part and the second bandwidth part, data from a network device.

6. The method according to claim 1, wherein the broadcast radio network temporary identifier (RNTI) comprises group-RNTI (G-RNTI).

7. A method, comprising:
   sending first information and second information to a terminal device, wherein the first information indicates information about a first bandwidth part, and the second information indicates information about a second bandwidth part, wherein the first bandwidth part corresponds to unicast, the second bandwidth part corresponds to broadcast, and the first bandwidth part includes the second bandwidth part, the information about a first bandwidth part includes a first subcarrier spacing (SCS) corresponding to the first bandwidth part, the information about a second bandwidth part includes a second SCS corresponding to the second bandwidth part; and
   sending downlink control information (DCI), scrambled by a broadcast radio network temporary identifier (RNTI), to the terminal device, wherein the first SCS corresponding to the first bandwidth part is the same as the second SCS corresponding to the second bandwidth part.

8. The method according to claim 7, wherein the information about the second bandwidth part further includes a bandwidth of the second bandwidth part, and/or a frequency domain location of the second bandwidth part.

9. The method according to claim 7, wherein the broadcast RNTI is for scheduling broadcast transmission dynamically.

10. The method according to claim 7, wherein the information about the first bandwidth part further includes a bandwidth of the first bandwidth part, and/or a frequency domain location of the first bandwidth part.

11. The method according to claim 7, wherein the broadcast radio network temporary identifier (RNTI) comprises group-RNTI (G-RNTI).

12. A communication apparatus, comprising:
   a non-transitory computer-readable storage medium storing a program; and
   one or more processors connected to the non-transitory computer-readable storage medium, wherein the processor is configured to execute the program to:
      obtain first information and second information, wherein the first information indicates information about a first bandwidth part, and the second information indicates information about a second bandwidth part, wherein the first bandwidth part corresponds to unicast, the second bandwidth part corresponds to broadcast, and the first bandwidth part includes the second bandwidth part, the information about a first bandwidth part includes a first subcarrier spacing (SCS) corresponding to the first bandwidth part, the information about a second bandwidth part includes a second SCS corresponding to the second bandwidth part; and in a case that the first SCS corresponding to the first bandwidth part is the same as the second SCS corresponding to the second bandwidth part, monitor downlink control information (DCI) scrambled by a broadcast radio network temporary identifier (RNTI).

13. The communication apparatus according to claim 12, wherein the information about the second bandwidth part further includes a bandwidth of the second bandwidth part, and/or a frequency domain location of the second bandwidth part.

14. The communication apparatus according to claim 12, wherein the broadcast RNTI is useable for scheduling broadcast transmission dynamically.

15. The communication apparatus according to claim 12, wherein the information about the first bandwidth part further includes a bandwidth of the first bandwidth part, and/or a frequency domain location of the first bandwidth part.

16. The communication apparatus according to claim 12, wherein the one or more processors are further configured to:

receive on the first bandwidth part and the second bandwidth part, data from a network device.

17. The communication apparatus according to claim 12, wherein the broadcast radio network temporary identifier (RNTI) comprises group-RNTI (G-RNTI).

18. A communication apparatus, comprising:

a non-transitory computer-readable storage medium storing a program; and one or more processors connected to the non-transitory computer-readable storage medium, wherein the processor is configured to execute the program to:

send first information and second information to a terminal device, wherein the first information indicates information about a first bandwidth part, and the second information indicates information about a second bandwidth part, wherein the first bandwidth part corresponds to unicast, the second bandwidth part corresponds to broadcast, and the first bandwidth part includes the second bandwidth part, the information about a first bandwidth part includes a first subcarrier spacing (SCS) corresponding to the first bandwidth part, the information about a second bandwidth part includes a second SCS corresponding to the second bandwidth part; and send downlink control information (DCI) scrambled by a broadcast radio network temporary identifier (RNTI) to the terminal device, wherein the first SCS corresponding to the first bandwidth part is the same as the second SCS corresponding to the second bandwidth part.

19. The communication apparatus according to claim 18, wherein the information about the second bandwidth part further includes a bandwidth of the second bandwidth part, and/or a frequency domain location of the second bandwidth part.

20. The communication apparatus according to claim 18, wherein the broadcast RNTI is usable for scheduling broadcast transmission dynamically.

21. The communication apparatus according to claim 18, wherein the information about the first bandwidth part further includes a bandwidth of the first bandwidth part, and/or a frequency domain location of the first bandwidth part.

22. The communication apparatus according to claim 18, wherein the broadcast radio network temporary identifier (RNTI) comprises group-RNTI (G-RNTI).

\* \* \* \* \*